US008455597B2

(12) United States Patent
Crowther et al.

(10) Patent No.: US 8,455,597 B2
(45) Date of Patent: Jun. 4, 2013

(54) CATALYSTS AND METHODS OF USE THEREOF TO PRODUCE VINYL TERMINATED POLYMERS

(75) Inventors: Donna J. Crowther, Seabrook, TX (US); Patrick Brant, Seabrook, TX (US); Carlos U. De Gracia, Laporte, TX (US); Jacqueline A. Lovell, Houston, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 0 days.

(21) Appl. No.: 13/072,280

(22) Filed: Mar. 25, 2011

(65) Prior Publication Data

US 2012/0245311 A1  Sep. 27, 2012

(51) Int. Cl.
*C08F 4/6592* (2006.01)
*C08F 4/643* (2006.01)
*C08F 110/06* (2006.01)
*B01J 31/22* (2006.01)

(52) U.S. Cl.
USPC ........... 526/160; 502/103; 502/152; 526/126; 526/133; 526/134; 526/351; 526/943

(58) Field of Classification Search
USPC .................. 502/103, 152; 526/126, 133, 134, 526/160, 351, 943
See application file for complete search history.

(56) References Cited

U.S. PATENT DOCUMENTS

| | | | |
|---|---|---|---|
| 3,022,305 A | 2/1962 | Carboni | |
| 3,235,484 A | 2/1966 | Colfer | |
| 4,069,023 A | 1/1978 | Brois et al. | |
| 4,110,377 A | 8/1978 | Clerici et al. | |
| 4,197,398 A | 4/1980 | Floyd et al. | |
| 4,619,756 A | 10/1986 | Dickakian | |
| 4,814,540 A | 3/1989 | Watanabe et al. | |
| 4,973,414 A | 11/1990 | Nerger et al. | |
| 4,988,764 A | 1/1991 | Nishio et al. | |
| 5,026,948 A | 6/1991 | Forbus | |
| 5,049,535 A | 9/1991 | Resconi et al. | |
| 5,211,834 A | 5/1993 | Forester | |
| 5,229,022 A | 7/1993 | Song et al. | |
| 5,252,677 A | 10/1993 | Tomita et al. | |
| 5,266,186 A | 11/1993 | Kaplan | |
| 5,382,634 A | 1/1995 | Koyama et al. | |
| 5,439,607 A | 8/1995 | Patil | |
| 5,444,125 A | 8/1995 | Tomita et al. | |
| 5,498,809 A | 3/1996 | Emert et al. | |
| 5,504,172 A | 4/1996 | Imuta et al. | |
| 5,705,577 A | 1/1998 | Rossi et al. | |
| 5,741,946 A | 4/1998 | Wei | |
| 5,744,541 A | 4/1998 | Sawaguchi et al. | |
| 5,750,815 A | 5/1998 | Grubbs et al. | |
| 5,756,428 A | 5/1998 | Emert et al. | |

(Continued)

FOREIGN PATENT DOCUMENTS

| | | |
|---|---|---|
| CN | 101011062 | 8/2007 |
| EP | 0 767 182 | 4/1997 |

(Continued)

OTHER PUBLICATIONS

Amin et al., "*Versatile Pathways for In Situ Polyolefin Functionalization with Heteroatoms: Catalytic Chain Transfer*", Angewandte Chemie International Edition, 2008, vol. 47, pp. 2006-2025.
Ayinla et al., "Chiral Tantalum and Zironium Biphenyl Amidate Complexes: New Catalysts for the Assymetric Synthesis of Amines", Abstracts of Papers, 238th ACS National Meeting, Washington DC, United States, Aug. 16-20, 2009, INOR-252.
Babu et al., "*Microstructure of Poly(1-hexene) Produced by ansa-Zirconocenium Catalysis*", Macromolecules, 1994, vol. 27, pp. 3383-3388.
Baldwin et al., "*Cationic Alkylaluminum-Complexed Zirconocene Hydrides as Participants in Olefin Polymerization Catalysis*", JACS, 2010, vol. 132, pp. 13969-13971.

(Continued)

*Primary Examiner* — Caixia Lu
(74) *Attorney, Agent, or Firm* — Catherine L. Bell

(57) ABSTRACT

This invention relates to a homogenous process for making a vinyl terminated propylene polymer, wherein the process comprises: contacting, propylene, under polymerization conditions, with a catalyst system comprising an activator and at least one metallocene compound, where the metallocene compound is represented by the formula:

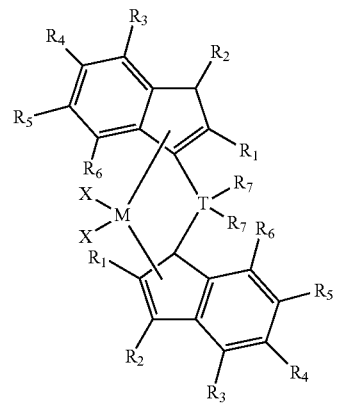

where: M is hafnium or zirconium; each X is, independently, selected from the group consisting of hydrocarbyl radicals having from 1 to 20 carbon atoms, hydrides, amides, alkoxides, sulfides, phosphides, halides, dienes, amines, phosphines, ethers, and a combination thereof, (two X's may form a part of a fused ring or a ring system); each $R_1$ is, independently, a $C_1$ to $C_{10}$ alkyl group; each $R_2$ is, independently, a $C_1$ to $C_{10}$ alkyl group; each $R_3$ is, independently, hydrogen; each $R_4$, $R_5$, and $R_6$, is, independently, hydrogen or a substituted or unsubstituted hydrocarbyl group, a heteroatom or heteroatom containing group; T is a bridging group; each $R_7$ is, independently, hydrogen, halogen, or a $C_1$ to $C_{20}$ hydrocarbyl, and two $R_7$ can form a cyclic structure including aromatic, partially saturated, or saturated cyclic or fused ring system; and further provided that any of adjacent $R_4$, $R_5$, and $R_6$ groups may form a fused ring or multicenter fused ring system where the rings may be aromatic, partially saturated or saturated.

33 Claims, 1 Drawing Sheet

U.S. PATENT DOCUMENTS

| | | | |
|---|---|---|---|
| 5,811,379 | A | 9/1998 | Rossi et al. |
| 5,859,159 | A | 1/1999 | Rossi et al. |
| 5,936,041 | A | 8/1999 | Diana et al. |
| 6,017,859 | A | 1/2000 | Rossi et al. |
| 6,114,445 | A | 9/2000 | Tzoganakis et al. |
| 6,117,962 | A | 9/2000 | Weng et al. |
| 6,143,686 | A | 11/2000 | Vizzini et al. |
| 6,197,910 | B1 | 3/2001 | Weng et al. |
| 6,225,432 | B1 | 5/2001 | Weng et al. |
| 6,255,426 | B1 | 7/2001 | Lue et al. |
| 6,268,518 | B1 | 7/2001 | Resconi et al. |
| 6,410,666 | B1 | 6/2002 | Grubbs et al. |
| 6,444,773 | B1 | 9/2002 | Markel |
| 6,448,350 | B1 * | 9/2002 | Dall'Occo et al. ............ 526/160 |
| 6,476,167 | B2 | 11/2002 | Peters |
| 6,525,157 | B2 | 2/2003 | Cozewith et al. |
| 6,703,457 | B2 | 3/2004 | Van Baar et al. |
| 6,750,307 | B2 | 6/2004 | Weng et al. |
| 6,897,261 | B1 | 5/2005 | Machida et al. |
| 6,939,930 | B2 | 9/2005 | Reinking et al. |
| 7,126,031 | B2 | 10/2006 | Boussie et al. |
| 7,247,385 | B1 | 7/2007 | Tzoganakis et al. |
| 7,276,567 | B2 | 10/2007 | Voskoboynikov et al. |
| 7,294,681 | B2 | 11/2007 | Jiang et al. |
| 2,261,292 | A1 | 12/2007 | Jiang et al. |
| 7,524,910 | B2 | 4/2009 | Jiang et al. |
| 7,541,413 | B2 | 6/2009 | Crowther et al. |
| 7,589,160 | B2 | 9/2009 | Resconi et al. |
| 7,790,810 | B2 | 9/2010 | Coates et al. |
| 7,820,607 | B2 | 10/2010 | Matsuda et al. |
| 7,897,679 | B2 | 3/2011 | Stevens et al. |
| 7,943,716 | B2 | 5/2011 | Resconi et al. |
| 7,960,487 | B2 | 6/2011 | Yang et al. |
| 7,985,816 | B2 * | 7/2011 | Crowther et al. ............ 526/160 |
| 8,058,351 | B2 | 11/2011 | Pawlow et al. |
| 2002/0137978 | A1 | 9/2002 | Grubbs et al. |
| 2003/0060583 | A1 * | 3/2003 | Markel et al. ................ 526/160 |
| 2003/0161752 | A1 | 8/2003 | Luk et al. |
| 2004/0054086 | A1 | 3/2004 | Schauder et al. |
| 2004/0127649 | A1 | 7/2004 | Arjunan |
| 2004/0214953 | A1 | 10/2004 | Yamada et al. |
| 2004/0249046 | A1 | 12/2004 | Abhari et al. |
| 2005/0054793 | A1 | 3/2005 | Reinking et al. |
| 2005/0159299 | A1 | 7/2005 | Rodriguez et al. |
| 2005/0261440 | A1 | 11/2005 | Dickakian et al. |
| 2006/0052553 | A1 | 3/2006 | Resconi et al. |
| 2006/0270814 | A1 | 11/2006 | Mako et al. |
| 2008/0228017 | A1 | 9/2008 | Burdett et al. |
| 2008/0234451 | A1 | 9/2008 | Kenwright et al. |
| 2009/0198089 | A1 | 8/2009 | Burton et al. |
| 2009/0221750 | A1 | 9/2009 | Tsunogae et al. |
| 2009/0247441 | A1 | 10/2009 | Baum |
| 2009/0318640 | A1 | 12/2009 | Brant et al. |
| 2009/0318644 | A1 | 12/2009 | Brant et al. |
| 2009/0318646 | A1 | 12/2009 | Brant et al. |
| 2009/0318647 | A1 | 12/2009 | Hagadorn et al. |
| 2010/0069573 | A1 | 3/2010 | Arriola et al. |
| 2010/0152387 | A1 | 6/2010 | Steininger et al. |
| 2010/0152388 | A1 | 6/2010 | Jiang et al. |
| 2010/0170829 | A1 | 7/2010 | Ng et al. |

FOREIGN PATENT DOCUMENTS

| | | |
|---|---|---|
| EP | 0 802 216 | 10/1997 |
| EP | 0 958 309 | 11/1999 |
| EP | 1 361 232 | 11/2003 |
| EP | 1 849 757 | 10/2007 |
| EP | 1 862 491 | 12/2007 |
| GB | 1 310 847 | 3/1973 |
| JP | 02-064115 | 3/1990 |
| JP | 02/064115 | 3/1990 |
| JP | 1993/320260 | 3/1993 |
| JP | 2000/038420 | 2/2000 |
| JP | 2005/139284 | 6/2005 |
| JP | 2005-336092 | 12/2005 |
| JP | 2007/169340 | 7/2007 |
| JP | 2007/246433 | 9/2007 |
| JP | 2008/050278 | 3/2008 |
| JP | 2009-299046 | 12/2009 |
| JP | 2010/037555 | 2/2010 |
| JP | 2010-202628 | 9/2010 |
| JP | 2011/026448 | 2/2011 |
| JP | 2012/051859 | 3/2012 |
| JP | 2012/052062 | 3/2012 |
| WO | WO 95/27717 | 10/1995 |
| WO | WO 97/47665 | 12/1997 |
| WO | WO 99/05182 | 2/1999 |
| WO | WO 99/46270 | 9/1999 |
| WO | WO 00/00576 | 1/2000 |
| WO | WO 00/55218 | 9/2000 |
| WO | WO 02/079127 | 10/2002 |
| WO | WO 03/040095 | 5/2003 |
| WO | WO 03/040233 | 5/2003 |
| WO | WO 03/040442 | 5/2003 |
| WO | WO 2004/031250 | 4/2004 |
| WO | WO 2004/046214 | 6/2004 |
| WO | WO 2005/090425 | 9/2005 |
| WO | WO 2005/090426 | 9/2005 |
| WO | WO 2005/090427 | 9/2005 |
| WO | WO 2005/092935 | 10/2005 |
| WO | WO 2006/127483 | 11/2006 |
| WO | WO 2007/003238 | 1/2007 |
| WO | WO 2008/027268 | 3/2008 |
| WO | WO 2008/080081 | 7/2008 |
| WO | WO 2008/141941 | 11/2008 |
| WO | WO 2009/009158 | 1/2009 |
| WO | WO 2009/155517 | 12/2009 |
| WO | WO 2010/037059 | 4/2010 |

OTHER PUBLICATIONS

Bhriain et al., "Polymeryl-Exchange Between Ansa-Zirconocene Catalysts for Norbornene-Ethene Copolymerization and Aluminum or Zinc Alkyls", Macromolecules, 2005, vol. 38, pp. 2056-2063.

Bielawski et al., "Synthesis of ABA Triblock Copolymers Via a Tandem Ring-Opening Metathesis Polymerization: Atom Transfer Radical Polymerization Approach", Macromolecules, 2000, vol. 33, pp. 678-680.

Brant et al., "Effect of Tacticity on the Dilute Solution Coil Dimensions of Poly(a-olefin)s", Macromolecules, 2005, vol. 38, pp. 7178-7183.

Cherian et al., "Synthesis of Allyl-Terminated Syndiotactic Polypropylene: Macromonomers for the Synthesis of Branched Polyolefins", Macromolecules, 2005, vol. 38, pp. 6259-6268.

Chung, "Synthesis of Functional Polyolefin Copolymers with Graft and Block Structures", Progress in Polymer Science, 2002, vol. 27, pp. 39-85.

Clerici et al., "Catalytic C-Alkylation of Secondary Amines With Alkenes", Synthesis, 1980, vol. 4, pp. 305-306.

Corey et al., "Reactions of Hydrosilanes and Olefins in the Presence of $Cp_2MCl_2/nBuLi$", Organometallics, 1992, vol. 11, pp. 672-683.

Crowther et al., "Group 4 Metal Dicarbollide Chemistry. Synthesis, Structure, and Reactivity of Electrophilie Alkyl Complexes $(Cp^*)(C2B9H_{11})M(R)$ ($M$=$Hf$, $Zr$)", JACS, 1991, vol. 113, pp. 1455-1457.

Eisenberger et al., "Tantalum-amidate Complexes for the Hydroaminoalkylation of Secondary Amines: Enhanced Substrate Scope and Enantioselective Chiral Amine Synthesis", Angewandte Chemie International Edition, 2009, vol. 48, pp. 8361-8365.

Eshuis et al., "Catalytic Olefin Oligomerization and Polymerization with Cationic Group IV Metal Complexes $[Cp^*_2Mme(THT)]^+[BPh_4]^-$, $M$=$Ti$, $Zr$ and $Hf$", Journal of Molecular Catalysis, 1990, vol. 62, pp. 277-287.

Frauenrath et al., "Polymerization of 1-Hexene Catalyzed by Bis(Cyclopentadienyl)Zirconium Dichloride/Methylaluminoxane; Effect of Temperature on the Molecular Weight and the Microstructure of Poly(1-Hexene)", Macromol. Rapid Commun., 1998, vol. 19, pp. 391-395.

Furuyama et al., "New High-Performance Catalysts Developed at Mitsui Chemicals for Polyolefins and Organic Synthesis", Catalysis Surveys from Asia, 2004, vol. 8, No. 1, pp. 61-71.

Galeotti et al., "Self-Functionalizing Polymer Film Surfaces Assisted by Specific Polystyrene End-Tagging" ,Chem. Mater., 2010, vol. 22, pp. 2764-2769.

Harney et al., "End-Group-Confined Chain Walking Within a Group 4 Living Polyolefin and Well-Defined Cationic Zirconium Alkyl Complexes for Modeling This Behavior", JACS, 2004, vol. 126, pp. 4536-4537.
Herzon et al., "Direct, Catalytic Hydroaminoalkylation of Unactivated Olefins with N-Alkyl Arylamines", JACS, 2007, vol. 129, pp. 6690-6691.
Herzon et al., "Hydroaminoalkylation of Unactivated Olefins with Dialkylamines", JACS, 2007, vol. 130, pp. 14940-14941.
Janiak et al., "Analyses of Propene and 1-Hexene Oligomers from Zirconium/MAO Catalysts—Mechanistic Implications by NMR, SEC, and MALDI-TOF MS", Macromol. Chem. Phys., 2002, vol. 203, pp. 129-138.
Janiak et al., "Metallocene Catalysts for Olefin Oligomerization", Macromol. Symp., 2006, vol. 236, pp. 14-22.
Janiak et al., "Metallocene and Related Catalysts for Olefin, Alkyne and Silane Dimerization and Oligomerization", Coordination Chemistry Reviews, 2006, vol. 250, pp. 66-94.
Jiang et al., "Highly Z-Selective Metathesis Homocoupling of Terminal Olefins", JACS, 2009, vol. 131, pp. 16630-16631.
Jones et al., "Synthesis and Reactive Blending of Amine and Anhydride End-Functional Polyolefins", Polymer, 2004, vol. 45, pp. 4189-4201.
Kaneyoshi et al., "Synthesis of Block and Graft Copolymers with Linear Polyethylene Segments by Combination of Degenerative Transfer Coordination Polymerization and Atom Transfer Radical Polymerization", Macromolecules, 2005, vol. 38, pp. 5425-5435.
Kesti et al., "Group 4 Metallocene Olefin Hydrosilyation Catalysts", Organometallics, 1992, vol. 11, pp. 1095-1103.
Kissin et al., "Post-Oligomerization of α-Olefin Oligomers: A Route to Single-Component and Multicomponent Synthetic Lubricating Oils", Journal of Applied Polymer Science, 2009, vol. 111, pp. 273-280.
Kobayashi, "Routes to Functionalized Polyolefins", The Dow Chemical Company.
Kolodka et al., "Copolymerization of Propylene with Poly(Ethylene-Co-Propylene) Macromonomer and Branch Chain-Length Dependence of Rheological Properties", Macromolecules, 2002, vol. 35, pp. 10062-10070.
Kolodka et al., "Synthesis and Characterization of Long-Chain-Branched Polyolefins with Metallocene Catalysts: Copolymerization of Ethylene with Poly(Ethylene-Co-Propylene) Macromonomer", Macromol. Rapid Commun., 2003, vol. 24, pp. 311-315.
Koo et al., "Efficient New Routes to Functionalized Polyolefins", ChemTech. 1999, pp. 13-19.
Kostalik et al., "Solvent Processable Tetraalkylammonium-Functionalized Polyethylene for Use as an Alkaline Anion Exchange Membrane", Macromolecules, 2010, vol. 43, pp. 7147-7150.
Kubiak et al., "Titanium-Catalyzed Hydroaminoalkylation of Alkenes by C-H Bond Activation at SP3 Centers in the Alpha-Position to a Nitrogen Atom", Angewandte Chemie International Edition, 2009, vol. 48, No. 6, pp. 1153-1156.
Langston et al., "One-Pot Synthesis of Long Chain Branch PP (LCBPP) Using Ziegler-Natta Catalyst and Branching Reagents", Macromol. Symp., 2007, vol. 260, pp. 34-41.
Lehmus et al., "Chain End Isomerization as a Side Reaction in Metallocene-Catalyzed Ethylene and Propylene Polymerizations", Macromolecules, 2000, vol. 33, pp. 8534-8540.
Lopez et al., "Synthesis of Well-Defined Polymer Architectures by Successive Catalytic Olefin Polymerization and Living/Controlled Polymerization Reactions", Progress in Polymer Science, 2007, vol. 32, pp. 419-454.
Lu et al., "Reactivity of Common Functional Groups with Urethanes: Models for Reactive Compatibilization of Thermoplastic Polyurethane Blends", Journal of Polymer Science: Part A: Polymer Chemistry, 2002, vol. 40, pp. 2310-2328.
Markel et al., "Metallocene-Based-Branch—Block Thermoplastic Elastomers", Macromolecules, 2000, vol. 33, pp. 8541-8548.
Mathers et al., "Cross Metathesis Functionalization of Polyolefins", Chem. Commun., 2004, pp. 422-423.
Moscardi et al., "Propene Polymerization with the Isospecific, Highly Regioselective rac-Me$_2$ C(3-t-Bu-1-Ind)2ZrCl$_2$/MAO Catalyst. 2. Combined DFT/MM Analysis of Chain Propagation and Chain Release Reactions", Organometallics, 2001, vol. 20, pp. 1918-1931.
Negishi et al., "Reaction of Zirconocene Dichloride with Alkyl-lithiums or Alkyl Grignard Reagents as a Convenient Method for Generating a "Zirconocene" Equivalent and its Use in Zirconium-Promoted Cyclization of Alkenes, Alkynes, Dienes, Enynes, and Diyness[1]", Tetrahedron Letters, 1986, vol. 27, No. 25, pp. 2829-2832.
Nilsson et al., "Structural Effects on Thermal Properties and Morphology in XLPE", European Polymer Journal, 2010, vol. 46, pp. 1759-1769.
Ornealis et al., "Cross Olefin Metathesis for the Selective Functionalization, Ferrocenylation, and Solubilization in Water of Olefin-Terminated Dendrimers, Polymers, and Gold Nanoparticles and for a Divergent Dendrimer Construction", JACS, 2008, vol. 130, pp. 1495-1506.
Ornealis et al., "Efficient Mono- and Bifunctionalization of Polyolefin Dendrimers by Olefin Metathesis", Angewandte Chemie International Edition, 2005, vol. 44, pp. 7399-7404.
Parks et al., "Studies on the Mechanism of $B(C_6F_5)_3$-Catalyzed Hydrosilation of Carbonyl Functions", J. Org. Chem., 2000, vol. 65, pp. 3090-3098.
Prochnow et al., "Tetrabenzyltitanium: An Improved Catalyst for the Activation of SP3 C-H Bonds Adjacent to Nitrogen Atoms", ChemCatChem, 2009, vol. 1, No. 1, pp. 162-172.
Resconi et al., "Chain Transfer Reactions in Propylene Polymerization with Zirconocene Catalysts", Topics in Catalysis, 1999, vol. 7, pp. 145-163.
Resconi et al., "Olefin Polymerization at Bis(pentamethylcyclopentadienyl)zirconium and -hafnium Centers: Chain-Transfer Mechanisms", JACS, 1992, vol. 114, pp. 1025-1032.
Reznichenko et al., "Group 5 Metal Binapthalate Complexes for Catalytic Asymmetric Hydroaminoalkylation and Hydroamination/Cyclization", Organometallics, 2011, vol. 30, pp. 921-924.
Roesky, "Catalytic Hydroaminoalkylation", Angewandte Chemie International Edition, 2009, vol. 48, pp. 4892-4894.
Rose et al., "Poly(Ethylene-Co-Propylene Macromonomer)s: Synthesis and Evidence for Starlike Conformations in Dilute Solution", Macromolecules, 2008, vol. 41, pp. 559-567.
Rossi et al., "End Groups in 1-Butene Polymerization Via Methylaluminoxane and Zirconocene Catalyst", Macromolecules, 1995, vol. 28, pp. 1739-1749.
Rulhoff et al., "Synthesis and Characterization of Defined Branched Poly(propylene)s with Different Microstructures by Copolymerization of Propylene and Linear Ethylene Oligomers ($C_n$=26-28) with Metallocenes/MAO Catalysts", Macromolecules, 2006, vol. 16, pp. 1450-1460.
Scherman et al., "Synthesis and Characterization of Stereoregular Ethylene-Vinyl Alcohol Copolymers Made by Ring-Opening Metathesis Polymerization", Macromolecules, 2005, vol. 38, pp. 9009-9014.
Seayed et al., "Hydroaminomethylation of Olefins Using a Rhodium Carbene Catalyst", Tetrahedron Letters, 2003, vol. 44, No. 8, pp. 1679-1683.
Segawa et al., "Catalytic Hydroaminoalkylation of Alkene", Yuki Gosei Kagaku Kyokaishi, 2009, vol. 67, No. 8, pp. 834-844. (Abstract only).
Shiono et al., "Additive Effects of Trialkylaluminum on Propene Polymerization with (t-BuNSiMe$_2$Flu)TiMe$_2$-Based Catalysts", Applied Catalysis A: General, 2000, vol. 200, pp. 145-152.
Shiono et al., "Copolymerization of Atactic Polypropene Macromonomer with Propene by an Isospecific Metallocene Catalyst", Macromolecules, 1999, vol. 32, pp. 5723-5727.
Sill et al., "Bis-Dendritic Polyethylene Prepared by Ring-Opening Metathesis Polymerization in the Presence of Bis-Dendritic Chain Transfer Agents", Journal of Polymer Science: Part A: Polymer Chemistry, 2005, vol. 43, pp. 5429-5439.
Small et al., "Polymerization of Propylene by a New Generation of Iron Catalysts: Mechanisms of Chain Initiation, Propagation, and Termination", Macromolecules, 1999, vol. 32, pp. 2120-2130.
Stadler et al., "Long-Chain Branches in Syndiotactic Polypropene Induced by Vinyl Chloride", Macromolecular Chemistry and Physics, 2010, vol. 211, pp. 1472-1481.

Sun et al., "Effect of Short Chain Branching on the Coil Dimensions of Polyolefins in Dilute Solution", Macromolecules, 2001, vol. 34, pp. 6812-6820.

Sunderhaus et al., "Oxidation of Carbon-Silicon Bonds: The Dramatic Advantage of Strained Siletanes", Organic Letters, 2003, vol. 5, No. 24, pp. 4571-4573.

Switek et al., "ABA Triblock Copolymers with a Ring-Opening Metathesis Polymerization/Macromolecular Chain-Transfer Agent Approach", Journal of Polymer Science: Part A: Polymer Chemistry, 2007, vol. 45, pp. 361-373.

Thomas et al., "Synthesis of Telechelic Polyisoprene via Ring-Opening Metathesis Polymerization in the Presence of Chain Transfer Agent", Macromolecules, 2010, vol. 43, pp. 3705-3709.

Wei et al., "Aufbaureaktion Redux: Scalable Production of Precision Hydrocarbons from $AlR_3$ (R=Et or iBu) by Dialkyl Zinc Mediated Ternary Living Coordinative Chain-Transfer Polymerization", Angewandte Chemie Inernational Edition, 2010, vol. 49, pp. 1768-1772.

Weng et al., "Long Chain Branched Isotactic Polypropylene", Macromolecules, 2002, vol. 35, pp. 3838-3843.

Weng et al., "Synthesis of Vinly-Terminated Isotactic Poly(Propylene)", Macromol. Rapid Commun., 2000, vol. 21, pp. 1103-1107.

Yang et al., "Catatonic Metallocene Polymerization Catalysts, Synthesis and Properties of the First Base-Free Zirconocene Hydride", Angewandte Chemie International Edition Engl., 1992, vol. 31, pp. 1375-1377.

Yin et al., "Scope and Mechanism of Allylic C-H Amination of Terminal Alkenes by the Palladium/PhL(OPiv)$_2$ Catalyst System: Insights into the Effect of Naphthoquinone", JACS, 2010, vol. 132, pp. 11978-11987.

Zhang et al., "Functionalization of Polyolefins Through Catalytic Hydrosilylation and Imidation Reactions", ANTEC, 2005, pp. 2686-2690.

Balboni et al., $C_2$-Symmetric Zirconocenes for High Molecular Weight Amorphous Poly(propylene), Macromolecular Chemistry and Physics, 2001, vol. 202, No. 10, pp. 2010-2028.

Brzezinska et al., "Synthesis of ABA Triblock Copolymers via Acyclic Diene Metathesis Polymerization and Living Polymerization of a-Amino Acid-N-Carboxyanhydrides", Macromolecules, 2001, vol. 34, pp. 4348-4354.

Bujadoux et al., Use of Bridged and Non-bridged Metallocene Catalysts in High Pressure/High Temperature Ethylene/α-olefin Copolymerization, Metallocene Polymers, 1995, pp. 377-402.

Koo et al., "Silicon-Modified Ziegler-Natta Polymerization. Catalytic Approaches to Silyl-Capped and Silyl-Linked Polyolefins Using "Single-Site" Cationic Ziegler-Natta Catalysts", JACS, 1999, vol. 121, pp. 8791-8802.

Passaglia et al., "Grafting of Diethyl Maleate and Maleic Anhydride Onto Styrene-b-(Ethylene-co-1-Butene)-b-Styrene Triblock Copolymer (SEBS)", Polymer, 2000, vol. 41, pp. 4389-4400.

Quirk et al., "Anionic Synthesis of Secondary Amine Functionalized Polymers by Reaction of Polymeric Organolithiums with N-Benzylidenemethylamine", Macromolecular Chemistry and Physics, 2002, vol. 203, pp. 1178-1187.

Rybak et al., "Acyclic Diene Metathesis with a Monomer with a Monomer from Renewable Resources: Control of Molecular Weight and One-Step Preparation of Block Copolymers", ChemSusChem, 2008, vol. 1, pp. 542-547.

Liu et al., Kinetics of Initiation, Propagation, a nd Termination for the [rac-($C_2H_4$(1-indenyl)$_2$)ZrMe] [$MeB(C_6F_5)_3$]—Catalyzed Polymerization of 1-Hexene, Journal of the American Chemical Society, 2001, vol. 123, No. 45, pp. 11193-11207.

Xu et al., Ethylene Copolymerization with 1-Octene Using a 2-Methylbenz[e] indenyl-Based ansa-Monocyclopentadienylamido Complex and Methylaluminoxane Catalyst, Macromolecules, 1998, vol. 31, No. 15, pp. 4724-4729.

Britovsek et al., Novel Olefin Polymerization Catalysts Based on Iron and Cobalt, Chemical Communications, 1998, No. 7, pp. 849-850.

Britovsek et al., Iron and Cobalt Ethylene Polymerization Catalysts Bearing 2,6- Bis(Imino)Pyridyl Ligands: Synthesis, Structures, and Polymerization Studies, Journal of the American Chemical Society, 1999, vol. 121, No. 38, pp. 8728-8740.

Chen et al., Preparation of Epoxy-modified Polyethylene by Graft Extrusion and its Applications to Polyphenylene Sulfide Alloys as a Compatibilizer, Reactive & Functional Polymers, 2008, vol. 68, No. 9, pp. 1307-1313.

Cossy et al., "Cross-Metathesis reaction. Generation of Highly Functionalized Olefins from Unsaturated Alcohols", Journal of Organometallic Chemistry, 2001, vol. 634, Issue 2, pp. 216-221.

Hansell et al., Additive-Free Clicking for Polymer Functionalization and Coupling by Tetrazine-Norbornene Chemistry, Journal of the American Chemical Society, 2011, vol. 133, No. 35, pp. 13828-13831.

Liu et al., Kinetics of Initiation, Propagation, and Termination for the [rac-(C2H4(1- indenyl)2)ZrMeHMeB(C6F5)3]-Catalyzed Polymerization of 1-Hexene, Journal of the American Chemical Society, 2001, vol. 123, pp. 11193-11207.

Nagai et al., Novel Well-defined Funcationalized Polyolefins and Polyolefin polar Polymer Block Copolymers: Formations and Their Features, Poly Preprints, 2008, vol. 49, No. 2, 776-777.

Nakatsuka et al., Creation and Application of New Materials by a Fusion of Fi-catalyst Technology and Fine Organic Synthesis Technology, Shokubai, 2010, vol. 52, No. 8, pp. 569-574.

Rodriguez et al., Poly(4-vinylpyridazine). First Synthesis, Characterization and Properties, Polymeric Materials Science and Engineering, Proceedings of the ACS Division of Polymeric Materials Science and Engineering, 1990, vol. 63, pp. 376-382 (Abstract).

Shiono et al., Copolymerization of poly(propylene) macromonomer with ethylene by (tertbutanamide)dimethyl(tetramethyl-qscyclopentadienyl) silane titanium dichloride/methylaluminoxane catalyst, Macromol. Chem. Phys., 1997, vol. 198, pp. 3229-3237.

Weng et al., Synthesis of Long-Chain Branched Propylene Polymers via Macromonomer Incorporation, Macromol. Rapid Commun , 2001, vol. 22, No. 18, pp. 1488-1492.

Wu et al., Synthesis of Polynorbornene-poly(ethylene-co-propylene) Diblock Copolymers, Polymeric Materials Science and Engineering, 1998, vol. 78, pp. 158-159.

Xu et al., Ethylene Copolymerization with 1-Octene Using a 2-Methylbenz[e] indenyl-Based ansa-Monocyclopentadienylamido Complex and Methylaluminoxane Catalyst, Macromolecules, 1998, vol. 31, pp. 4724-4729.

\* cited by examiner

Trends Observed In Mn and % Vinyls
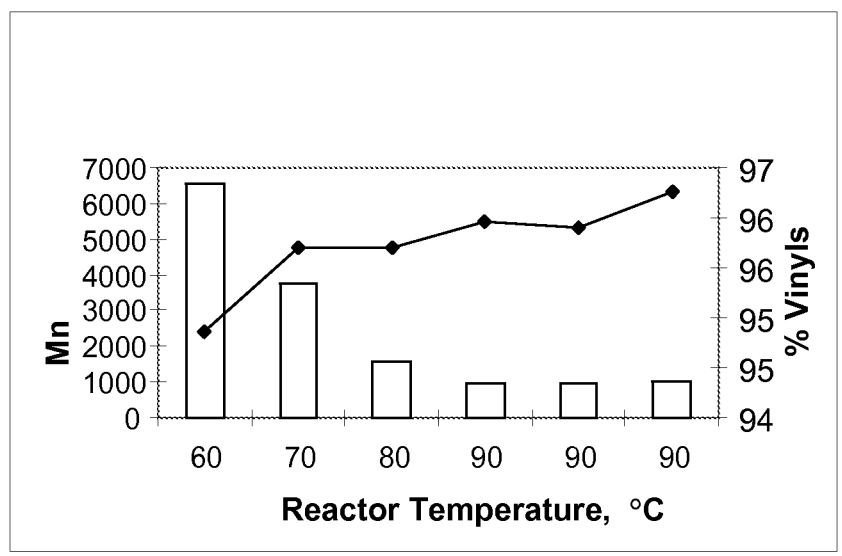

CATALYSTS AND METHODS OF USE THEREOF TO PRODUCE VINYL TERMINATED POLYMERS

STATEMENT OF RELATED CASES

This application is related to U.S. Ser. No. 12/143,663, filed on Jun. 20, 2008 (Published as WO 2009/155471); U.S. Ser. No. 12/487,739, filed on Jun. 19, 2009 (Published as WO 2009/155472); U.S. Ser. No. 12/488,066, filed on Jun. 19, 2009 (Published as WO 2009/155510); Ser. No. 12/488,093, filed on Jun. 19, 2009 (Published as WO 2009/155517); and U.S. Ser. No. 12/642,453, filed Dec. 18, 2009; which is a continuation-in-part application of U.S. Ser. No. 12/533,465 filed on Jul. 31, 2009, which claims priority to and the benefit of U.S. Ser. No. 61/136,172, filed on Aug. 15, 2008; which are all incorporated by reference herein.

This invention also relates to the following concurrently filed applications:

a) U.S. Ser. No. 13/072,189, filed Mar. 25, 2011, entitled "Amine Functionalized Polyolefin and Methods for Preparation Thereof";

b) U.S. Ser. No. 13/072,279, filed Mar. 25, 2011, entitled "Enhanced Catalyst Performance for Production of Vinyl Terminated Propylene and Ethylene/Propylene Macromers";

c) U.S. Ser. No. 13/072,383, filed Mar. 25, 2011, entitled "Diblock Copolymers Prepared by Cross Metathesis";

d) U.S. Ser. No. 13/072,261, filed Mar. 25, 2011, entitled "Amphiphilic Block Polymers Prepared by Alkene Metathesis";

e) U.S. Ser. No. 13/072,288, filed Mar. 25, 2011, entitled "Vinyl Terminated Higher Olefin Polymers and Methods to Produce Thereof";

f) U.S. Ser. No. 13/072,305, filed Mar. 25, 2011, entitled "Hydrosilylation of Vinyl Macromers with Metallocenes";

g) U.S. Ser. No 13/072,432, filed Mar. 25, 2011, entitled "Olefin Triblock Polymers via Ring-Opening Metathesis Polymerization";

h) U.S. Ser. No. 13/072,330, filed Mar. 25, 2011, entitled "Block Copolymers from Silylated Vinyl Terminated Macromers";

i) U.S. Ser. No. 13/072,249, filed Mar. 25, 2011, entitled "Vinyl Terminated Higher Olefin Copolymers and Methods to Produce Thereof"; and j) U.S. Ser. No. 61/467,681, filed Mar. 25, 2011, entitled "Branched Vinyl Terminated Polymers and Methods for Production Thereof".

FIELD OF THE INVENTION

This invention relates to olefin polymerization, particularly to produce vinyl terminated polymers.

BACKGROUND OF THE INVENTION

Alpha-olefins, especially those containing about 6 to about 20 carbon atoms, have been used as intermediates in the manufacture of detergents or other types of commercial products. Such alpha-olefins have also been used as monomers, especially in linear low density polyethylene. Commercially produced alpha-olefins are typically made by oligomerizing ethylene. Longer chain alpha-olefins, such as vinyl-terminated polyethylenes are also known and can be useful as building blocks following functionalization or as macromonomers.

Allyl terminated low molecular weight solids and liquids of ethylene or propylene have also been produced, typically for use as branches in polymerization reactions. See, for example, Rulhoff, Sascha, and Kaminsky, ("Synthesis and Characterization of Defined Branched Poly(propylene)s with Different Microstructures by Copolymerization of Propylene and Linear Ethylene Oligomers ($C_n$=26-28) with Metallocenes/MAO Catalysts," Macromolecules, 16, 2006, pp. 1450-1460), and Kaneyoshi, Hiromu et al. ("Synthesis of Block and Graft Copolymers with Linear Polyethylene Segments by Combination of Degenerative Transfer Coordination Polymerization and Atom Transfer Radical Polymerization," Macromolecules, 38, 2005, pp. 5425-5435).

Further, U.S. Pat. No. 4,814,540 discloses bis(pentamethyl cyclopentadienyl) hafnium dichloride, bis(pentamethyl cyclopentadienyl) zirconium dichloride and bis(tetramethyl n-butyl cyclopentadienyl) hafnium dichloride with methylalumoxane in toluene or hexane with or without hydrogen to make allylic vinyl terminated propylene homo-oligomers having a low degree of polymerization of 2-10. These oligomers do not have high Mn's and do not have at least 93% allylic vinyl unsaturation. Likewise, these oligomers lack comonomer and are produced at low productivities with a large excess of alumoxane (molar ratio 600 Al/M; M=Zr, Hf). Additionally, no less than 60 wt % solvent (solvent+propylene basis) is present in all of the examples.

Teuben et al. (J. Mol. Catal., 62, 1990, pp. 277-287) disclose the use of [Cp*$_2$MMe(THT)]+[BPh$_4$] (M=Zr and Hf; Cp*=pentamethylcyclopentadienyl; Me=methyl, Ph=phenyl; THT=tetrahydrothiophene), to make propylene oligomers. For M=Zr, a broad product distribution with oligomers up to $C_{24}$ (number average molecular weight (Mn) of 336) was obtained at room temperature. Whereas, for M=Hf, only the dimer 4-methyl-1-pentene and the trimer 4,6-dimethyl-1-heptene were formed. The dominant termination mechanism appeared to be beta-methyl transfer from the growing chain back to the metal center, as was demonstrated by deuterium labeling studies.

X. Yang et al. (Angew. Chem. Intl Ed. Engl., 31, 1992, pg. 1375-1377) disclose amorphous, low molecular weight polypropylene made at low temperatures where the reactions showed low activity and product having 90% allylic vinyls, relative to all unsaturations, by $^1$H NMR. Thereafter, Resconi et al. (J. Am. Chem. Soc., 114, 1992, pp. 1025-1032), discloses the use of bis(pentamethylcyclopentadienyl)zirconium and bis(pentamethylcyclopentadienyl)hafnium to polymerize propylene and obtained beta-methyl termination resulting in oligomers and low molecular weight polymers with "mainly allyl- and iso-butyl-terminated" chains. As is the case in U.S. Pat. No. 4,814,540, the oligomers produced do not have at least 93% allyl chain ends, an Mn of about 500 to about 20,000 g/mol (as measured by $^1$H NMR), and the catalyst has low productivity (1-12,620 g/mmol metallocene/hr; >3000 wppm Al in products).

Similarly, Small and Brookhart (Macromolecules, 32, 1999, pg. 2120-2130) disclose the use of a pyridylbisamido iron catalyst in a low temperature polymerization to produce low molecular weight amorphous propylene materials apparently having predominant or exclusive 2,1 chain growth, chain termination via beta-hydride elimination, and high amounts of vinyl end groups.

Weng et al. (Macromol Rapid Comm. 2000, 21, pp. 1103-1107) discloses materials with up to about 81 percent vinyl termination made using dimethylsilyl bis(2-methyl, 4-phenyl-indenyl) zirconium dichloride and methylalumoxane in toluene at about 120° C. The materials have a Mn of about 12,300 (measured with $^1$H NMR) and a melting point of about 143° C.

Macromolecules, 33, 2000, pp. 8541-8548) discloses preparation of branch-block ethylene-butene polymer by reincorporation of vinyl terminated polyethylene, said branch-block polymer made by a combination of $CP_2ZrCL_2$ and $(C_5Me_4SiMe_2NC_{12}H_{23})TiCl_2$ activated with methylalumoxane.

Moscardi et al. (Organometallics, 20, 2001, pp. 1918-1931) disclose the use of rac-dimethylsilylmethylenebis(3-t-butyl indenyl)zirconium dichloride with methylalumoxane in batch polymerizations of propylene to produce materials where "... allyl end group always prevails over any other end groups, at any [propene]." In these reactions, morphology control was limited and approximately 60% of the chain ends are allylic.

Coates et al. (Macromolecules, 38, 2005, pp. 6259-6268) disclose preparation of low molecular weight syndiotactic polypropylene ([rrr]=0.46-0.93) with about 100% allyl end groups using bis(phenoxyimine)titanium dichloride ($(PHI)_2TiCl_2$) activated with modified methyl alumoxane (MMAO; Al/Ti molar ratio=200) in batch polymerizations run between −20 and +20° C. for four hours. For these polymerizations, propylene was dissolved in toluene to create a 1.65 M toluene solution. Catalyst productivity was very low (0.95 to 1.14 g/mmol Ti/hr).

JP 2005-336092 A2 discloses the manufacture of vinyl-terminated propylene polymers using materials such as $H_2SO_4$ treated montmorillonite, triethylaluminum, triisopropyl aluminum, where the liquid propylene is fed into a catalyst slurry in toluene. This process produces substantially isotactic macromonomers that do not have a significant amount of amorphous material.

Rose et al. (Macromolecules, 41, 2008, pp. 559-567) disclose poly(ethylene-co-propylene) macromonomers not having significant amounts of iso-butyl chain ends. Those were made with bis(phenoxyimine) titanium dichloride ($(PHI)_2TiCl_2$) activated with modified methylalumoxane (MMAO; Al/Ti molar ratio range 150 to 292) in semi-batch polymerizations (30 psi propylene added to toluene at 0° C. for 30 min, followed by ethylene gas flow at 32 psi of over-pressure at about 0° C. for polymerization times of 2.3 to 4 hours to produce E-P copolymer having an Mn of about 4,800 to 23,300. In four reported copolymerizations, allylic chain ends decreased with increasing ethylene incorporation roughly according to the equation:

% allylic chain ends(of total unsaturations)=−0.95 (mol % ethylene incorporated)+100.

For example, 65% allyl (compared to total unsaturation) was reported for E-P copolymer containing 29 mol % ethylene. This is the highest allyl population achieved. For 64 mol % incorporated ethylene, only 42% of the unsaturations are allylic. Productivity of these polymerizations ranged from $0.78 \times 10^2$ g/mmol Ti/hr to $4.62 \times 10^2$ g/mmol Ti/hr. Prior to this work, Zhu et al. reported only low (~38%) vinyl terminated ethylene-propylene copolymer made with the constrained geometry metallocene catalyst $[C_5Me_4(SiMe_2N\text{-tert-butyl})TiMe_2$ activated with $B(C_6F_5)_3$ and MMAO (Macromolecules, 35, 2002, pp. 10062-10070 and Macromolecules Rap. Commun., 24, 2003, pp. 311-315).

Janiak and Blank summarize a variety of work related to oligomerization of olefins (Macromol. Symp., 236, 2006, pp. 14-22).

However, few catalysts have been shown to produce high allylic chain unsaturations in high yields, a wide range of molecular weight, and with high catalyst activity for propylene-based polymerizations, especially propylene-ethylene copolymerizations. Accordingly, there is need for new catalysts that produce vinyl terminated polymers in high yields, with a wide range of molecular weight, and with high catalyst activity. Further, there is a need for propylene based reactive materials having vinyl termination which can be functionalized and used in additive applications, or as macromonomers for the synthesis of poly(macromonomers).

SUMMARY OF THE INVENTION

The invention relates to a process, preferably a homogenous process, for making a vinyl terminated propylene polymer, wherein the process comprises: contacting, propylene, with a catalyst system, comprising an activator and at least one metallocene compound, where the metallocene compound is represented by the formula:

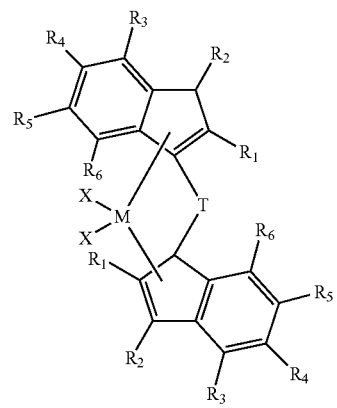

where:

M is hafnium or zirconium; each X is, independently, selected from the group consisting of hydrocarbyl radicals having from 1 to 20 carbon atoms, hydrides, amides, alkoxides, sulfides, phosphides, halides, dienes, amines, phosphines, ethers, and a combination thereof, (two X's may form a part of a fused ring or a ring system); each $R_1$ is, independently, a $C_1$ to $C_{10}$ alkyl group; each $R_2$ is, independently, a $C_1$ to $C_{10}$ alkyl group; each $R_3$ is hydrogen; each $R_4$, $R_5$, and $R_6$, is, independently, hydrogen or a substituted hydrocarbyl group or an unsubstituted hydrocarbyl group, or a heteroatom; T is a bridging group; and further provided that any of adjacent $R_4$, $R_5$, and $R_6$ groups may form a fused ring or multicenter fused ring system where the rings may be aromatic, partially saturated or saturated; wherein a propylene polymer having at least 35% allyl chain ends (relative to total unsaturations) is produced.

In other embodiments, the invention relates to a catalyst system comprising an activator and at least one metallocene compound, wherein the metallocene compound is represented by the formula:

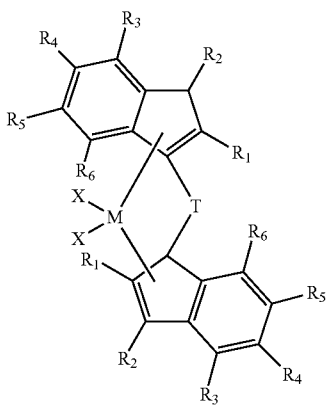

where:
M is hafnium or zirconium; each X is, independently, selected from the group consisting of hydrocarbyl radicals having from 1 to 20 carbon atoms, hydrides, amides, alkoxides, sulfides, phosphides, halides, dienes, amines, phosphines, ethers, and a combination thereof, (two X's may form a part of a fused ring or a ring system); each $R_1$ is, independently, a $C_1$ to $C_{10}$ alkyl group; each $R_2$ is, independently, a $C_1$ to $C_{10}$ alkyl group; each $R_3$ is hydrogen; each $R_4$, $R_5$, and $R_6$, is, independently, hydrogen or a substituted hydrocarbyl group, or unsubstituted hydrocarbyl group, or a heteroatom; T is a bridging group; and further provided that any of adjacent $R_4$, $R_5$, and $R_6$ groups may form a fused ring or multicenter fused ring system where the rings may be aromatic, partially saturated or saturated.

BRIEF DESCRIPTION OF THE FIGURES

FIG. 1 represents trends observed in Mn and % vinyls for exemplary vinyl terminated polymers (Runs 13-18) of the present invention (2.3M propylene).

DETAILED DESCRIPTION

The inventors have surprisingly discovered a new class of metallocene compounds used in catalyst systems and processes herein, where the catalyst systems are useful to produce vinyl terminated polymers. The catalyst systems demonstrate unexpectedly high activity, and in some embodiments, produce atactic propylene polymers. These vinyl terminated polymers may find utility as macromonomers for the synthesis of poly(macromonomer) block copolymers, and as additives. Advantageously, the vinyl group of these vinyl terminated polymers provides a path to functionalization. These functionalized polymers may be also useful as additives.

For the purposes of this invention and the claims thereto, the new numbering scheme for the Periodic Table Groups is used as in CHEMICAL AND ENGINEERING NEWS, 63(5), pg. 27 (1985). Therefore, a "Group 4 metal" is an element from Group 4 of the Periodic Table.

"Catalyst productivity" is a measure of how many grams of polymer (P) are produced using a polymerization catalyst comprising W g of catalyst (cat), over a period of time of T hours; and may be expressed by the following formula: P/(T×W) and expressed in units of gPgcat$^{-1}$ hr$^{-1}$. Conversion is the amount of monomer that is converted to polymer product, and is reported as mol % and is calculated based on the polymer yield and the amount of monomer fed into the reactor. Catalyst activity is a measure of how active the catalyst is and is reported as the mass of product polymer (P) produced per mole of catalyst (cat) used (kgP/molcat).

An "olefin," alternatively referred to as "alkene," is a linear, branched, or cyclic compound of carbon and hydrogen having at least one double bond. For purposes of this specification and the claims appended thereto, when a polymer or copolymer is referred to as comprising an olefin, including, but not limited to ethylene, propylene, and butene, the olefin present in such polymer or copolymer is the polymerized form of the olefin. For example, when a copolymer is said to have an "ethylene" content of 35 wt % to 55 wt %, it is understood that the mer unit in the copolymer is derived from ethylene in the polymerization reaction and said derived units are present at 35 wt % to 55 wt %, based upon the weight of the copolymer. A "polymer" has two or more of the same or different mer units. A "homopolymer" is a polymer having mer units that are the same. A "copolymer" is a polymer having two or more mer units that are different from each other. A "terpolymer" is a polymer having three mer units that are different from each other. "Different" as used to refer to mer units indicates that the mer units differ from each other by at least one atom or are different isomerically. Accordingly, the definition of copolymer, as used herein, includes terpolymers and the like. An oligomer is typically a polymer having a low molecular weight (such an Mn of less than 25,000 g/mol, preferably less than 2,500 g/mol) or a low number of mer units (such as 75 mer units or less).

For the purposes of this invention, ethylene shall be considered an α-olefin.

Catalyst Systems

A "catalyst system" is combination of at least one catalyst compound, at least one activator, an optional co-activator, and an optional support material. For the purposes of this invention and the claims thereto, when catalyst systems are described as comprising neutral stable forms of the components, it is well understood by one of ordinary skill in the art, that the ionic form of the component is the form that reacts with the monomers to produce polymers.

In the description herein, the metallocene catalyst may be described as a catalyst precursor, a pre-catalyst compound, or a transition metal compound, and these terms are used interchangeably. A polymerization catalyst system is a catalyst system that can polymerize monomers to polymer. An "anionic ligand" is a negatively charged ligand which donates one or more pairs of electrons to a metal ion. A "neutral donor ligand" is a neutrally charged ligand which donates one or more pairs of electrons to a metal ion.

A metallocene catalyst is defined as an organometallic compound with at least one π-bound cyclopentadienyl moiety (or substituted cyclopentadienyl moiety) and more frequently two π-bound cyclopentadienyl moieties or substituted cyclopentadienyl moieties. This includes other π-bound moieties such as indenyls or fluorenyls or derivatives thereof.

The invention relates to at least one metallocene catalyst, at least one activator, an optional co-activator, and an optional support material, and are discussed below.

(i) Metallocene Catalyst

For purposes of this invention and claims thereto, the term "substituted" means that a hydrogen group has been replaced with a hydrocarbyl group, a heteroatom, or a heteroatom containing group. For example, methyl cyclopentadiene (Cp) is a Cp group substituted with a methyl group, ethyl alcohol is an ethyl group substituted with an —OH group, and a "substituted hydrocarbyl" is a radical made of carbon and hydrogen where at least one hydrogen is replaced by a heteroatom or heteroatom containing group.

For purposes of this invention and claims thereto, "alkoxides" include those where the alkyl group is a $C_1$ to $C_{10}$ hydrocarbyl. The alkyl group may be straight chain, branched, or cyclic. The alkyl group may be saturated or unsaturated. In some embodiments, the alkyl group may comprise at least one aromatic group.

In embodiments herein, the invention relates to a catalyst system comprising an activator and at least one metallocene compound, wherein the metallocene compound is represented by the formula:

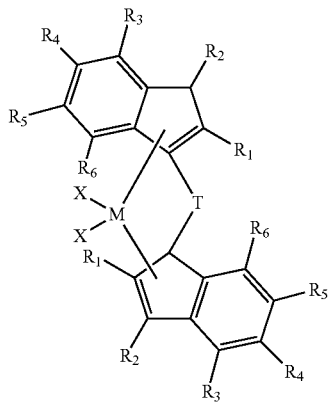

where:
M is hafnium or zirconium, preferably hafnium; each X is, independently, selected from the group consisting of hydrocarbyl radicals having from 1 to 20 carbon atoms, hydrides, amides, alkoxides, sulfides, phosphides, halides, dienes, amines, phosphines, ethers, and a combination thereof, (two X's may form a part of a fused ring or a ring system), preferably each X is independently selected from halides and $C_1$ to $C_5$ alkyl groups, preferably each X is a methyl group; each $R_1$ is, independently, a $C_1$ to $C_{10}$ alkyl group, preferably methyl, ethyl, propyl, butyl, pentyl, hexyl, or isomers thereof, preferably each $R_1$ is a methyl group; each $R_2$ is, independently, a $C_1$ to $C_{10}$ alkyl group, preferably methyl, ethyl, propyl, butyl, pentyl, hexyl, or isomers thereof, preferably each $R_2$ is a n-propyl group; each $R_3$ is hydrogen; each $R_4$, $R_5$, and $R_6$, is hydrogen or a substituted hydrocarbyl group or unsubstituted hydrocarbyl group, or a heteroatom, preferably each $R_4$, $R_5$, and $R_6$ is hydrogen; T is a bridging group, preferably T comprises Si, Ge, or C, preferably T is dialkyl silicon or dialkyl germanium, preferably T is dimethyl silicon; and further provided that any of adjacent $R_4$, $R_5$, and $R_6$ groups may form a fused ring or multicenter fused ring system where the rings may be aromatic, partially saturated or saturated.

Examples of bridging group T useful herein may be represented by R'$_2$C, R'$_2$Si, R'$_2$Ge, R'$_2$CCR'$_2$, R'$_2$CCR'$_2$CR'$_2$, R'$_2$CCR'$_2$CR'$_2$CR'$_2$, R'C=CR', R'C=CR'CR'$_2$, R'$_2$CCR'=CR'CR'$_2$, R'C=CR'CR'=CR', R'C=CR'CR'$_2$CR'$_2$, R'$_2$CSiR'$_2$, R'$_2$SiSiR'$_2$, R$_2$CSiR'$_2$CR'$_2$, R'$_2$SiCR'$_2$SiR'$_2$, R'C=CR'SiR'$_2$, R'$_2$CGeR'$_2$, R'$_2$GeGeR'$_2$, R'$_2$CGeR'$_2$CR'$_2$, R'$_2$GeCR'$_2$GeR'$_2$, R'$_2$SiGeR'$_2$, R'C=CR'GeR'$_2$, R'B, R'$_2$C—BR', R'$_2$C—BR'—CR'$_2$, R'$_2$C-β-CR'$_2$, R'$_2$CR'$_2$C—O—CR'$_2$CR'$_2$, R'$_2$C—O—CR'$_2$CR'$_2$, R'$_2$C—O—CR'=CR', R'$_2$C—S—CR'$_2$, R'$_2$CR'$_2$C—S—CR'$_2$CR'$_2$, R'$_2$C—S—CR'$_2$CR'$_2$, R'$_2$C—S—CR'=CR', R'$_2$C—Se—CR'$_2$, R'$_2$CR'$_2$C—Se—CR'$_2$CR'$_2$, R'$_2$C—Se—CR'$_2$CR'$_2$, R'$_2$C—Se—CR'=CR', R'$_2$C—N=CR', R'$_2$C—NR'—CR'$_2$, R'$_2$C—NR'—CR'$_2$CR'$_2$, R'$_2$C—NR'—CR'=CR', R'$_2$CR'$_2$C—NR'—CR'$_2$CR'$_2$, R'$_2$C—P=CR', and R'$_2$C—PR'—CR'$_2$ where R' is hydrogen or a $C_1$ to $C_{20}$ containing hydrocarbyl, substituted hydrocarbyl, halocarbyl, substituted halocarbyl, silylcarbyl or germylcarbyl substituent and optionally two or more adjacent R' may join to form a substituted or unsubstituted, saturated, partially unsaturated or aromatic, cyclic or polycyclic substituent. Preferably, T is a bridging group comprising carbon or silica, such as dialkylsilyl, preferably T is selected from CH$_2$, CH$_2$CH$_2$, C(CH$_3$)$_2$, SiMe$_2$, SiPh$_2$, SiMePh, silylcyclobutyl (Si(CH$_2$)$_3$), (Ph)$_2$C, (p-(Et)$_3$SiPh)$_2$C, and silylcyclopentyl (Si(CH$_2$)$_4$).

Preferably T is represented by the formula $R_2^a J$, where J is C, Si, or Ge, and each $R^a$ is, independently, hydrogen, halogen, $C_1$ to $C_{20}$ hydrocarbyl or a $C_1$ to $C_{20}$ substituted hydrocarbyl, and two $R^a$ can form a cyclic structure including aromatic, partially saturated, or saturated cyclic or fused ring system.

Metallocene compounds that are particularly useful in this invention include one or more of:
rac-dimethylsilyl bis(2-methyl,3-propylindenyl)hafniumdimethyl,
rac-dimethylsilyl bis(2-methyl,3-propylindenyl)zirconiumdimethyl,
rac-dimethylsilyl bis(2-ethyl,3-propylindenyl)hafniumdimethyl,
rac-dimethylsilyl bis(2-ethyl,3-propylindenyl)zirconiumdimethyl,
rac-dimethylsilyl bis(2-methyl,3-ethylindenyl)hafniumdimethyl,
rac-dimethylsilyl bis(2-methyl,3-ethylindenyl)zirconiumdimethyl,
rac-dimethylsilyl bis(2-methyl,3-isopropylindenyl)hafniumdimethyl,
rac-dimethylsilyl bis(2-methyl,3-isopropylindenyl)zirconiumdimethyl,
rac-dimethylsilyl bis(2-methyl,3-butylindenyl)hafniumdimethyl,
rac-dimethylsilyl bis(2-methyl,3-butylindenyl)zirconiumdimethyl,
rac-dimethylgermanyl bis(2-methyl,3-propylindenyl)hafniumdimethyl,
rac-dimethylgermanyl bis(2-methyl,3-propylindenyl)zirconiumdimethyl,
rac-dimethylgermanyl bis(2-ethyl,3-propylindenyl)hafniumdimethyl,
rac-dimethylgermanyl bis(2-ethyl,3-propylindenyl)zirconiumdimethyl,
rac-dimethylgermanyl bis(2-methyl,3-ethylindenyl)hafniumdimethyl,
rac-dimethylgermanyl bis(2-methyl,3-ethylindenyl)zirconiumdimethyl,
rac-dimethylgermanyl bis(2-methyl,3-isopropylindenyl)hafniumdimethyl,
rac-dimethylgermanyl bis(2-methyl,3-isopropylindenyl)zirconiumdimethyl,
rac-dimethylgermanyl bis(2-methyl,3-butylindenyl)hafniumdimethyl,
rac-dimethylgermanyl bis(2-methyl,3-propylindenyl)zirconiumdimethyl,
rac-dimethylsilyl bis(2-propyl,3-methylindenyl)hafniumdimethyl,
rac-dimethylsilyl bis(2-propyl,3-methylindenyl)zirconiumdimethyl,
rac-dimethylsilyl bis(2-propyl,3-ethylindenyl)hafniumdimethyl,
rac-dimethylsilyl bis(2-propyl,3-ethylindenyl)zirconiumdimethyl, rac-dimethylsilylbis(2-propyl,3-butylindenyl)hafniumdimethyl, rac-dimethylsilylbis(2-propyl,3-butylindenyl)zirconiumdimethyl, rac-dimethylsilyl bis(2-methyl,3-butylindenyl)hafniumdimethyl, rac-dimethylsilyl bis(2-methyl,3-butylindenyl)zirconiumdimethyl, rac-dimethylsilyl bis(2,3-dimethyl)hafniumdimethyl, rac-dimethylsilyl bis(2,3-dimethyl)zirconiumdimethyl, rac-dimethylgermanyl bis(2-propyl,3-methylindenyl)hafniumdimethyl, rac-dimethylgermanyl bis(2-propyl,3-methylindenyl)zirconiumdimethyl, rac-dimethylgermanyl bis(2-propyl,3-ethylindenyl)hafniumdimethyl, rac-dimethylgermanyl bis(2-propyl,3-ethylindenyl)zirconiumdimethyl, rac-dimethylgermanyl bis(2-propyl,3-butylindenyl)hafniumdimethyl, rac-dimethylgermanyl bis(2-propyl,3-butylindenyl)zirconiumdimethyl, rac-dimethylgermanyl bis(2-methyl,3-butylindenyl)hafniumdimethyl, rac-dimethylgermanyl bis(2-methyl,3-butylindenyl)zirconiumdimethyl, rac-dimethylgermanyl bis(2,3-dimethyl)hafniumdimethyl, and rac-dimethylgermanyl bis(2,3-dimethyl)zirconiumdimethyl.

In an alternate embodiment, the "dimethyl" after the transition metal in the list of catalyst compounds above is replaced with a dihalide (such as dichloride or difluoride) or a bisphenoxide, particularly for use with an alumoxane activator.

In particular embodiments, the metallocene compound is rac-dimethylsilylbis(2-methyl,3-propylindenyl)hafniumdimethyl (I), or rac-dimethylsilylbis(2-methyl,3-propylindenyl)zirconiumdimethyl (II), represented by the formulae below:

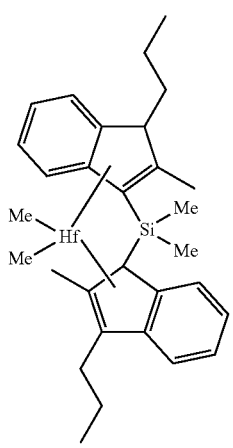

I

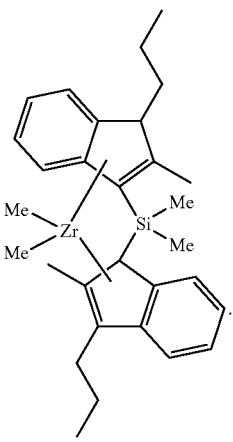

II

Activators

The terms "cocatalyst" and "activator" are used herein interchangeably and are defined to be any compound which can activate any one of the catalyst compounds described above by converting the neutral catalyst compound to a catalytically active catalyst compound cation. Non-limiting activators, for example, include alumoxanes, aluminum alkyls, ionizing activators, which may be neutral or ionic, and conventional-type cocatalysts. Preferred activators typically include alumoxane compounds, modified alumoxane compounds, and ionizing anion precursor compounds that abstract one reactive, σ-bound, metal ligand making the metal complex cationic and providing a charge-balancing noncoordinating or weakly coordinating anion.

In one embodiment, alumoxane activators are utilized as an activator in the catalyst composition. Alumoxanes are generally oligomeric compounds containing —Al($R^1$)—O— subunits, where $R^1$ is an alkyl group. Examples of alumoxanes include methylalumoxane (MAO), modified methylalumoxane (MMAO), ethylalumoxane and isobutylalumoxane. Alkylalumoxanes and modified alkylalumoxanes are suitable as catalyst activators, particularly when the abstractable ligand is an alkyl, halide, alkoxide or amide. Mixtures of different alumoxanes and modified alumoxanes may also be used. It may be preferable to use a visually clear methylalumoxane. A cloudy or gelled alumoxane can be filtered to produce a clear solution or clear alumoxane can be decanted from the cloudy solution. A useful alumoxane is a modified methyl alumoxane (MMAO) cocatalyst type 3A (commercially available from Akzo Chemicals, Inc. under the trade name Modified Methylalumoxane type 3A, covered under patent number U.S. Pat. No. 5,041,584).

When the activator is an alumoxane (modified or unmodified), some embodiments select the maximum amount of activator at a 5000-fold molar excess Al/M over the catalyst precursor (per metal catalytic site). The minimum activator-to-catalyst-precursor is a 1:1 molar ratio. Alternate preferred ranges include from 1:1 to 500:1, alternately from 1:1 to 200:1, alternately from 1:1 to 100:1, or alternately from 1:1 to 50:1.

In a preferred embodiment, little or no alumoxane is used in the process to produce the vinyl terminated polymers. Preferably, alumoxane is present at zero mol %, alternately the alumoxane is present at a molar ratio of aluminum to transition metal of less than 500:1, preferably less than 300:1, preferably less than 100:1, or preferably less than 1:1.

In an alternate embodiment, if an alumoxane is used to produce the vinyl terminated polymers then, the alumoxane has been treated to remove free alkyl aluminum compounds, particularly trimethyl aluminum.

Further, in a preferred embodiment, the activator used herein to produce the vinyl terminated polymer is discrete.

Aluminum alkyl or organoaluminum compounds which may be utilized as co-activators (or scavengers) include trimethylaluminum, triethylaluminum, triisobutylaluminum, tri-n-hexylaluminum, tri-n-octylaluminum, and the like.

In another embodiment, diethyl zinc is used in polymerizations comprising one, two, three or more catalysts, at least one of which is a metallocene of the types described herein.

In a preferred embodiment, little or no scavenger is used in the process to produce the vinyl terminated polymers. Preferably, scavenger is present at zero mol %, alternately the scavenger is present at a molar ratio of scavenger metal to transition metal of less than 100:1, preferably less than 50:1, preferably less than 15:1, or preferably less than 10:1.

Ionizing Activators

It is within the scope of this invention to use an ionizing or stoichiometric activator, neutral or ionic, such as tri (n-butyl) ammonium tetrakis (pentafluorophenyl) borate, a tris perfluorophenyl boron metalloid precursor or a tris perfluoronaphthyl boron metalloid precursor, polyhalogenated heteroborane anions (WO 98/43983), boric acid (U.S. Pat. No. 5,942,459), or combination thereof. It is also within the scope of this invention to use neutral or ionic activators alone or in combination with alumoxane or modified alumoxane activators. Much preferred activators are the ionic ones, not the neutral boranes.

Examples of neutral stoichiometric activators include trisubstituted boron, tellurium, aluminum, gallium, and indium, or mixtures thereof. The three substituent groups are each independently selected from alkyls, alkenyls, halogens, substituted alkyls, aryls, arylhalides, alkoxy, and halides. Preferably, the three groups are independently selected from halogen, mono or multicyclic (including halosubstituted) aryls, alkyls, and alkenyl compounds, and mixtures thereof, preferred are alkenyl groups having 1 to 20 carbon atoms, alkyl groups having 1 to 20 carbon atoms, alkoxy groups having 1 to 20 carbon atoms and aryl groups having 3 to 20 carbon atoms (including substituted aryls). More preferably, the three groups are alkyls having 1 to 4 carbon groups, phenyl, naphthyl, or mixtures thereof. Even more preferably, the three groups are halogenated, preferably fluorinated, aryl groups. Most preferably, the neutral stoichiometric activator is tris perfluorophenyl boron or tris perfluoronaphthyl boron.

Ionic stoichiometric activator compounds may contain an active proton, or some other cation associated with, but not coordinated to, or only loosely coordinated to, the remaining ion of the ionizing compound. Such compounds and the like are described in European publications EP 0 570 982 A; EP 0 520 732 A; EP 0 495 375 A; EP 0 500 944 B1; EP 0 277 003 A; EP 0 277 004 A; U.S. Pat. Nos. 5,153,157; 5,198,401; 5,066,741; 5,206,197; 5,241,025; 5,384,299; 5,502,124; and U.S. patent application Ser. No. 08/285,380, filed Aug. 3, 1994; all of which are herein fully incorporated by reference.

Ionic catalysts can be prepared by reacting a transition metal compound with neutral Lewis acids, such as $B(C_6F_6)_3$, which upon reaction with the hydrolyzable ligand (X) of the transition metal compound forms an anion, such as ([B $(C_6F_5)_3$ (X)]$^-$), which stabilizes the cationic transition metal species generated by the reaction. The catalysts can be, and preferably are, prepared with activator components which are ionic compounds or compositions.

Compounds useful as an activator component in the preparation of the ionic catalyst systems used in the process of this invention comprise a cation, which is preferably a Bronsted acid capable of donating a proton, and a compatible non-coordinating anion which anion is relatively large (bulky), capable of stabilizing the active catalyst species (the Group 4 cation) which is formed when the two compounds are combined and said anion will be sufficiently labile to be displaced by olefinic, diolefinic and acetylenically unsaturated substrates or other neutral Lewis bases, such as ethers, amines, and the like. Two classes of compatible non-coordinating anions have been disclosed in EP 0 277,003 A1, and EP 0 277,004 A1: 1) anionic coordination complexes comprising a plurality of lipophilic radicals covalently coordinated to and shielding a central charge-bearing metal or metalloid core; and 2) anions comprising a plurality of boron atoms such as carboranes, metallacarboranes, and boranes.

In a preferred embodiment, the stoichiometric activators include a cation and an anion component, and are preferably represented by the following formula (14):

$$(L-H)_d^+(A^{d-}) \tag{14}$$

wherein L is an neutral Lewis base; H is hydrogen; (L-H)$^+$ is a Bronsted acid; A$^{d-}$ is a non-coordinating anion having the charge d−; and d is an integer from 1 to 3.

The cation component, (L-H)$_d^+$ may include Bronsted acids such as protonated Lewis bases capable of protonating a moiety, such as an alkyl or aryl, from the bulky ligand metallocene containing transition metal catalyst precursor, resulting in a cationic transition metal species.

The activating cation (L-H)$_d^+$ is preferably a Bronsted acid, capable of donating a proton to the transition metal catalytic precursor resulting in a transition metal cation, including ammoniums, oxoniums, phosphoniums, silyliums, and mixtures thereof, preferably ammoniums of methylamine, aniline, dimethylamine, diethylamine, N-methylaniline, diphenylamine, trimethylamine, triethylamine, N,N-dimethylaniline, methyldiphenylamine, pyridine, p-bromo N,N-dimethylaniline, p-nitro-N,N-dimethylaniline, phosphoniums from triethylphosphine, triphenylphosphine, and diphenylphosphine, oxoniums from ethers, such as dimethyl ether diethyl ether, tetrahydrofuran, and dioxane, sulfoniums from thioethers, such as diethyl thioethers and tetrahydrothiophene, and mixtures thereof.

The anion component A$^{d-}$ include those having the formula [M$^{k+}$Q$_n$]$^{d-}$ wherein k is an integer from 1 to 3; n is an integer from 2 to 6; n−k=d; M is an element selected from Group 13 of the Periodic Table of the Elements, preferably boron or aluminum, and Q is independently a hydride, bridged or unbridged dialkylamido, halide, alkoxide, aryloxide, hydrocarbyl, substituted hydrocarbyl, halocarbyl, substituted halocarbyl, and halosubstituted-hydrocarbyl radicals, said Q having up to 20 carbon atoms with the proviso that in not more than one occurrence is Q a halide, and two Q groups may form a ring structure. Preferably, each Q is a fluorinated hydrocarbyl group having 1 to 20 carbon atoms, more preferably each Q is a fluorinated aryl group, and most preferably each Q is a pentafluoryl aryl group. Examples of suitable A$^{d-}$ also include diboron compounds as disclosed in U.S. Pat. No. 5,447,895, which is fully incorporated herein by reference.

Further examples of useful activators include those disclosed in U.S. Pat. Nos. 7,297,653 and 7,799,879.

Illustrative, but not limiting, examples of boron compounds which may be used as an activating cocatalyst in the preparation of the catalyst system of the processes of this invention are: trimethylammonium tetraphenylborate, triethylammonium tetraphenylborate, tripropylammonium tetraphenylborate, tri(n-butyl)ammonium tetraphenylborate, tri(t-butyl)ammonium tetraphenylborate, N,N-dimethylanilinium tetraphenylborate, N,N-diethylanilinium tetraphenylborate, N,N-dimethyl-(2,4,6-trimethylanilinium) tetraphenylborate, tropillium tetraphenylborate, triphenylcarbenium tetraphenylborate, triphenylphosphonium tetraphenylborate triethylsilylium tetraphenylborate, benzene(diazonium)tetraphenylborate, trimethylammonium tetrakis(pentafluorophenyl)borate, triethylammonium tetrakis(pentafluorophenyl)borate, tripropylammonium tetrakis(pentafluorophenyl)borate, tri(n-butyl)ammonium tetrakis(pentafluorophenyl)borate, tri(sec-butyl)ammonium tetrakis(pentafluorophenyl)borate, N,N-dimethylanilinium tetrakis(pentafluorophenyl)borate, N,N-diethylanilinium tetrakis(pentafluorophenyl)borate, N,N-dimethyl-(2,4,6-trimethylanilinium) tetrakis(pentafluorophenyl)borate, tropillium tetrakis(pentafluorophenyl)borate, triphenylcarbenium tetrakis(pentafluorophenyl)borate, triphenylphosphonium tetrakis(pentafluorophenyl)borate, triethylsilylium tetrakis(pentafluorophenyl)borate, benzene(diazonium) tetrakis(pentafluorophenyl)borate, trimethylammonium tetrakis-(2,3,4,6-tetrafluorophenyl) borate, triethylammonium tetrakis-(2,3,4,6-tetrafluorophenyl)borate, tripropylammonium tetrakis-(2,3,4,6-tetrafluorophenyl)borate, tri(n-butyl) ammonium tetrakis-(2,3,4,6-tetrafluoro-phenyl)borate, dimethyl(t-butyl)ammonium tetrakis-(2,3,4,6-tetrafluorophenyl)borate, N,N-dimethylanilinium tetrakis-(2,3,4,6-tetrafluorophenyl)borate, N,N-diethylanilinium tetrakis-(2,3,4,6-tetrafluorophenyl)borate, N,N-dimethyl-(2,4,6-trimethylanilinium) tetrakis-(2,3,4,6-tetrafluorophenyl)borate, tropillium tetrakis-(2,3,4,6-tetrafluorophenyl)borate, triphenylcarbenium tetrakis-(2,3,4,6-tetrafluorophenyl)borate, triphenylphosphonium tetrakis-(2,3,4,6-tetrafluorophenyl)borate, triethylsilylium tetrakis-(2,3,4,6-tetrafluorophenyl)borate, benzene(diazonium) tetrakis-(2,3,4,6-tetrafluorophenyl)borate, trimethylammonium tetrakis(perfluoronaphthyl)borate, triethylammonium tetrakis(perfluoronaphthyl)borate, tripropylammonium tetrakis(perfluoronaphthyl)borate, tri(n-butyl)ammonium tetrakis(perfluoronaphthyl)borate, tri(t-butyl)ammonium tetrakis(perfluoronaphthyl)borate, N,N-dimethylanilinium tetrakis(perfluoronaphthyl)borate, N,N-diethylanilinium tetrakis(perfluoronaphthyl)borate, N,N-dimethyl-(2,4,6-trimethylanilinium) tetrakis(perfluoronaphthyl)borate, tropillium tetrakis(perfluoronaphthyl)borate, triphenylcarbenium tetrakis(perfluoronaphthyl)borate, triphenylphosphonium tetrakis(perfluoronaphthyl)borate, triethylsilylium tetrakis(perfluoronaphthyl)borate, benzene(diazonium) tetrakis(perfluoronaphthyl)borate, trimethylammonium tetrakis(perfluorobiphenyl)borate, triethylammonium tetrakis(perfluorobiphenyl)borate, tripropylammonium tetrakis(perfluorobiphenyl)borate, tri(n-butyl)ammonium tetrakis(perfluorobiphenyl)borate, tri(t-butyl)ammonium tetrakis(perfluorobiphenyl)borate, N,N-dimethylanilinium tetrakis(perfluorobiphenyl)borate, N,N-diethylanilinium tetrakis(perfluorobiphenyl)borate, N,N-dimethyl-(2,4,6-trimethylanilinium) tetrakis(perfluorobiphenyl)borate, tropillium tetrakis(perfluorobiphenyl)borate, triphenylcarbenium tetrakis(perfluorobiphenyl)borate, triphenylphosphonium tetrakis(perfluorobiphenyl)borate, triethylsilylium tetrakis(perfluorobiphenyl)borate, benzene(diazonium) tetrakis(perfluorobiphenyl)borate, trimethylammonium tetrakis(3,5-bis(trifluoromethyl)phenyl)borate, triethylammonium tetrakis(3,5-bis(trifluoromethyl)phenyl)borate, tripropylammonium tetrakis(3,5-bis(trifluoromethyl)phenyl)borate, tri(n-butyl)ammonium tetrakis(3,5-bis(trifluoromethyl)phenyl)borate, tri(t-butyl)ammonium tetrakis(3,5-bis(trifluoromethyl)phenyl)borate, N,N-dimethylanilinium tetrakis(3,5-bis(trifluoromethyl)phenyl)borate, N,N-diethylanilinium tetrakis(3,5-bis(trifluoromethyl)phenyl)borate, N,N-dimethyl-(2,4,6-trimethylanilinium) tetrakis(3,5-bis(trifluoromethyl)phenyl)borate, tropillium tetrakis(3,5-bis(trifluoromethyl)phenyl)borate, triphenylcarbenium tetrakis(3,5-bis(trifluoromethyl)phenyl)borate, triphenylphosphonium tetrakis(3,5-bis(trifluoromethyl)phenyl)borate, triethylsilylium tetrakis(3,5-bis(trifluoromethyl)phenyl)borate, benzene(diazonium) tetrakis(3,5-bis(trifluoromethyl)phenyl)borate, and dialkyl ammonium salts, such as: di-(i-propyl)ammonium tetrakis(pentafluorophenyl)borate, and dicyclohexylammonium tetrakis(pentafluorophenyl)borate; and additional tri-substituted phosphonium salts, such as tri(o-tolyl)phosphonium tetrakis(pentafluorophenyl)borate, and tri(2,6-dimethylphenyl)phosphonium tetrakis(pentafluorophenyl)borate.

Most preferably, the activator is N,N-dimethylanilinium tetrakis(perfluoronaphthyl)borate, N,N-dimethylanilinium tetrakis(perfluorobiphenyl)borate, N,N-dimethylanilinium tetrakis(3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate, or triphenylcarbenium tetrakis(perfluorophenyl)borate.

In one embodiment, an activation method using ionizing ionic compounds not containing an active proton but capable of producing a bulky ligand metallocene catalyst cation and their non-coordinating anion are also contemplated, and are described in EP 0 426 637 A1, EP 0 573 403 A1, and U.S. Pat. No. 5,387,568, which are all herein incorporated by reference.

The term "non-coordinating anion" (NCA) means an anion which either does not coordinate to said cation or which is only weakly coordinated to said cation thereby remaining sufficiently labile to be displaced by a neutral Lewis base. "Compatible" non-coordinating anions are those which are not degraded to neutrality when the initially formed complex decomposes. Further, the anion will not transfer an anionic substituent or fragment to the cation so as to cause it to form a neutral four coordinate metallocene compound and a neutral by-product from the anion. Non-coordinating anions useful in accordance with this invention are those that are compatible, stabilize the metallocene cation in the sense of balancing its ionic charge at +1, yet retain sufficient lability to permit displacement by an ethylenically or acetylenically unsaturated monomer during polymerization.

In addition to these activator compounds or co-catalysts, scavengers may be used, such as trimethyl aluminum, triethyl aluminum, tri-isobutyl aluminum, and/or tri-octyl aluminum. Preferably, tri-isobutyl aluminum and/or tri-octyl aluminum are used.

Invention process also can employ cocatalyst compounds or activator compounds that are initially neutral Lewis acids but form a cationic metal complex and a noncoordinating anion, or a zwitterionic complex upon reaction with the invention compounds. For example, tris(pentafluorophenyl) boron or aluminum act to abstract a hydrocarbyl or hydride ligand to yield an invention cationic metal complex and stabilizing noncoordinating anion, see EP 0 427 697 A1 and EP 0 520 732 A1 for illustrations of analogous Group 4 metallocene compounds. Also, see the methods and compounds of EP 0 495 375 A1. For formation of zwitterionic complexes using analogous Group 4 compounds, see U.S. Pat. Nos. 5,624,878; 5,486,632; and 5,527,929.

Another suitable ion forming, activating cocatalyst comprises a salt of a cationic oxidizing agent and a noncoordinating, compatible anion represented by the formula (16):

$$(OX^{e+})_d(A^{d-})_e \qquad (16)$$

wherein $OX^{e+}$ is a cationic oxidizing agent having a charge of e+; e is an integer from 1 to 3; d is an integer from 1 to 3; and $A^{d-}$ is a non-coordinating anion having the charge of d−. Examples of cationic oxidizing agents include: ferrocenium, hydrocarbyl-substituted ferrocenium, $Ag^+$, or $Pb^{+2}$. Preferred embodiments of $A^{d-}$ are those anions defined above, especially tetrakis(pentafluorophenyl)borate.

The typical non-alumoxane activator-to-catalyst ratio, preferably NCA activator-to-catalyst ratio is a 1:1 molar ratio. Alternate preferred ranges include from 0.1:1 to 100:1, alternately from 0.5:1 to 200:1, alternately from 1:1 to 500:1 alternately from 1:1 to 1000:1. A particularly useful range is from 0.5:1 to 10:1, preferably 1:1 to 5:1.

Bulky Activators

The inventors have found that the hafnocene catalysts described herein typically produce vinyl terminated polymers with a greater amount of allyl chain ends than the analogous zirconocene, under the same polymerization conditions; however, the inventors also surprisingly found that in the presence of a bulky activator, the zirconocenes produced similar amounts of allyl chain ends as the hafnocenes.

"Bulky activator" as used herein refers to anionic activators represented by the formula:

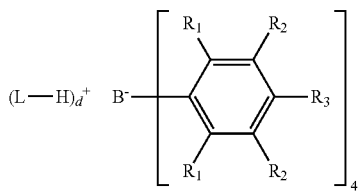

where:
each $R_1$ is, independently, a halide, preferably a fluoride;
each $R_2$ is, independently, a halide, a $C_6$ to $C_{20}$ substituted aromatic hydrocarbyl group or a siloxy group of the formula —O—Si—$R_a$, where $R_a$ is a $C_1$ to $C_{20}$ hydrocarbyl or hydrocarbylsilyl group (preferably $R_2$ is a fluoride or a perfluorinated phenyl group);
each $R_3$ is a halide, $C_6$ to $C_{20}$ substituted aromatic hydrocarbyl group or a siloxy group of the formula —O—Si—$R_a$, where $R_a$ is a $C_1$ to $C_{20}$ hydrocarbyl or hydrocarbylsilyl group (preferably $R_3$ is a fluoride or a $C_6$ perfluorinated aromatic hydrocarbyl group); wherein $R_2$ and $R_3$ can form one or more saturated or unsaturated, substituted or unsubstituted rings (preferably $R_2$ and $R_3$ form a perfluorinated phenyl ring);
L is an neutral Lewis base; $(L-H)^+$ is a Bronsted acid; d is 1, 2, or 3;
wherein the anion has a molecular weight of greater than 1020 g/mol; and
wherein at least three of the substituents on the B atom each have a molecular volume of greater than 250 cubic Å, alternately greater than 300 cubic Å, or alternately greater than 500 cubic Å.

"Molecular volume" is used herein as an approximation of spatial steric bulk of an activator molecule in solution. Comparison of substituents with differing molecular volumes allows the substituent with the smaller molecular volume to be considered "less bulky" in comparison to the substituent with the larger molecular volume. Conversely, a substituent with a larger molecular volume may be considered "more bulky" than a substituent with a smaller molecular volume.

Molecular volume may be calculated as reported in "A Simple "Back of the Envelope" Method for Estimating the Densities and Molecular Volumes of Liquids and Solids," Journal of Chemical Education, Vol. 71, No. 11, November 1994, pp. 962-964. Molecular volume (MV), in units of cubic Å, is calculated using the formula: $MV=8.3V_S$, where $V_S$ is the scaled volume. $V_S$ is the sum of the relative volumes of the constituent atoms, and is calculated from the molecular formula of the substituent using the following table of relative volumes. For fused rings, the $V_S$ is decreased by 7.5% per fused ring.

| Element | Relative Volume |
| --- | --- |
| H | 1 |
| $1^{st}$ short period, Li to F | 2 |
| $2^{nd}$ short period, Na to Cl | 4 |
| $1^{st}$ long period, K to Br | 5 |
| $2^{nd}$ long period, Rb to I | 7.5 |
| $3^{rd}$ long period, Cs to Bi | 9 |

Exemplary bulky substituents of activators suitable herein and their respective scaled volumes and molecular volumes are shown in the table below. The dashed bonds indicate binding to boron, as in the general formula above.

| Activator | Structure of boron substituents | Molecular Formula of each substituent | $V_s$ | MV Per subst. (Å$^3$) | Total MV (Å$^3$) |
| --- | --- | --- | --- | --- | --- |
| Dimethylanilinium tetrakis(perfluoronaphthyl)borate |  | $C_{10}F_7$ | 34 | 261 | 1044 |

| Activator | Structure of boron substituents | Molecular Formula of each substituent | $V_s$ | MV Per subst. (Å³) | Total MV (Å³) |
|---|---|---|---|---|---|
| Dimethylanilinium tetrakis(perfluorobiphenyl)borate | | $C_{12}F_9$ | 42 | 349 | 1396 |
| [4-tButyl-PhNMe₂H] [(C₆F₃(C₆F₅)₂)₄B] | | $C_{18}F_{13}$ | 62 | 515 | 2060 |

Exemplary bulky activators useful in catalyst systems herein include: trimethylammonium tetrakis(perfluoronaphthyl)borate, triethylammonium tetrakis(perfluoronaphthyl)borate, tripropylammonium tetrakis(perfluoronaphthyl)borate, tri(n-butyl)ammonium tetrakis(perfluoronaphthyl)borate, tri(t-butyl)ammonium tetrakis(perfluoronaphthyl)borate, N,N-dimethylanilinium tetrakis(perfluoronaphthyl)borate, N,N-diethylanilinium tetrakis(perfluoronaphthyl)borate, N,N-dimethyl-(2,4,6-trimethylanilinium) tetrakis(perfluoronaphthyl)borate, tropillium tetrakis(perfluoronaphthyl)borate, triphenylcarbenium tetrakis(perfluoronaphthyl)borate, triphenylphosphonium tetrakis(perfluoronaphthyl)borate, triethylsilylium tetrakis(perfluoronaphthyl)borate, benzene(diazonium) tetrakis(perfluoronaphthyl)borate, trimethylammonium tetrakis(perfluorobiphenyl)borate, triethylammonium tetrakis(perfluorobiphenyl)borate, tripropylammonium tetrakis(perfluorobiphenyl)borate, tri(n-butyl)ammonium tetrakis(perfluorobiphenyl)borate, tri(t-butyl)ammonium tetrakis(perfluorobiphenyl)borate, N,N-dimethylanilinium tetrakis(perfluorobiphenyl)borate, N,N-diethylanilinium tetrakis(perfluorobiphenyl)borate, N,N-dimethyl-(2,4,6-trimethylanilinium) tetrakis(perfluorobiphenyl)borate, tropillium tetrakis(perfluorobiphenyl)borate, triphenylcarbenium tetrakis(perfluorobiphenyl)borate, triphenylphosphonium tetrakis(perfluorobiphenyl)borate, triethylsilylium tetrakis(perfluorobiphenyl)borate, benzene(diazonium) tetrakis(perfluorobiphenyl)borate, [4-t-butyl-PhNMe₂H][(C₆F₃(C₆F₅)₂)₄B], and the types disclosed in U.S. Pat. No. 7,297,653.

Activator Combinations

It is within the scope of this invention that catalyst compounds can be combined with one or more activators or activation methods described above. For example, a combination of activators have been described in U.S. Pat. Nos. 5,153,157 and 5,453,410, European publication EP 0 573 120 B1, and PCT publications WO 94/07928 and WO 95/14044. These documents all discuss the use of an alumoxane in combination with an ionizing activator.

Optional Co-Activators and Scavengers

In addition to these activator compounds, scavengers or co-activators may be used. Aluminum alkyl or organoaluminum compounds which may be utilized as co-activators (or scavengers) include, for example, trimethylaluminum, triethylaluminum, triisobutylaluminum, tri-n-hexylaluminum, tri-n-octylaluminum, and diethyl zinc.

Optional Support Materials

In embodiments herein, the catalyst system may comprise an inert support material. Preferably the supported material is a porous support material, for example, talc, and inorganic oxides. Other support materials include zeolites, clays, organoclays, or any other organic or inorganic support material and the like, or mixtures thereof.

Preferably, the support material is an inorganic oxide in a finely divided form. Suitable inorganic oxide materials for use in metallocene catalyst systems herein include Groups 2, 4, 13, and 14 metal oxides, such as silica, alumina, and mixtures thereof. Other inorganic oxides that may be employed either alone or in combination with the silica, or alumina are magnesia, titania, zirconia, and the like. Other suitable support materials, however, can be employed, for example, finely divided functionalized polyolefins, such as finely divided polyethylene. Particularly useful supports include magnesia, titania, zirconia, montmorillonite, phyllosilicate, zeolites, talc, clays, and the like. Also, combinations of these support materials may be used, for example, silica-chromium, silica-alumina, silica-titania, and the like. Preferred support materials include $Al_2O_3$, $ZrO_2$, $SiO_2$, and combinations thereof, more preferably $SiO_2$, $Al_2O_3$, or $SiO_2/Al_2O_3$.

It is preferred that the support material, most preferably an inorganic oxide, has a surface area in the range of from about 10 to about 700 m$^2$/g, pore volume in the range of from about 0.1 to about 4.0 cc/g and average particle size in the range of from about 5 to about 500 µm. More preferably, the surface area of the support material is in the range of from about 50 to about 500 m$^2$/g, pore volume of from about 0.5 to about 3.5 cc/g and average particle size of from about 10 to about 200 µm. Most preferably the surface area of the support material is in the range is from about 100 to about 400 m$^2$/g, pore volume from about 0.8 to about 3.0 cc/g and average particle size is from about 5 to about 100 µm. The average pore size of the support material useful in the invention is in the range of from 10 to 1000 Å, preferably 50 to about 500 Å, and most preferably 75 to about 350 Å. In some embodiments, the support material is a high surface area, amorphous silica (surface area=300 m$^2$/gm; pore volume of 1.65 cm$^3$/gm). Preferred silicas are marketed under the tradenames of DAVISON 952 or DAVISON 955 by the Davison Chemical Division of W.R. Grace and Company. In other embodiments DAVISON 948 is used.

The support material should be dry, that is, free of absorbed water. Drying of the support material can be effected by heating or calcining at about 100° C. to about 1000° C., preferably at least about 600° C. When the support material is silica, it is heated to at least 200° C., preferably about 200° C. to about 850° C., and most preferably at about 600° C.; and for a time of about 1 minute to about 100 hours, from about 12 hours to about 72 hours, or from about 24 hours to about 60 hours. The calcined support material must have at least some reactive hydroxyl (OH) groups to produce supported catalyst systems of this invention. The calcined support material is then contacted with at least one polymerization catalyst comprising at least one metallocene compound and an activator.

Methods of Making the Supported Catalyst Systems

The support material, having reactive surface groups, typically hydroxyl groups, is slurried in a non-polar solvent and the resulting slurry is contacted with a solution of a metallocene compound and an activator. In some embodiments, the slurry of the support material is first contacted with the activator (preferably alumoxane) for a period of time in the range of from about 0.5 hours to about 24 hours, from about 2 hours to about 16 hours, or from about 4 hours to about 8 hours. The solution of the metallocene compound is then contacted with the isolated support/activator. In some embodiments, the supported catalyst system is generated in situ.

The mixture of the metallocene, activator, and support is heated to about 0° C. to about 70° C., preferably to about 23° C. to about 60° C., preferably at room temperature. Contact times typically range from about 0.5 hours to about 24 hours, from about 2 hours to about 16 hours, or from about 4 hours to about 8 hours.

Suitable non-polar solvents are materials in which all of the reactants used herein, i.e., the activator, and the metallocene compound, are at least partially soluble and which are liquid at reaction temperatures. Preferred non-polar solvents are alkanes, such as isopentane, hexane, n-heptane, octane, nonane, and decane, although a variety of other materials including cycloalkanes, such as cyclohexane, aromatics, such as benzene, toluene, and ethylbenzene, may also be employed.

In embodiments herein, the support material is contacted with a solution of a metallocene compound and an activator, such that the reactive groups on the support material are titrated, to form a supported polymerization catalyst. The period of time for contact between the metallocene compound, the activator, and the support material is as long as is necessary to titrate the reactive groups on the support material. To "titrate" is meant to react with available reactive groups on the surface of the support material, thereby reducing the surface hydroxyl groups by at least 80%, at least 90%, at least 95%, or at least 98%. The surface reactive group concentration may be determined based on the calcining temperature and the type of support material used. The support material calcining temperature affects the number of surface reactive groups on the support material available to react with the metallocene compound and an activator: the higher the drying temperature, the lower the number of sites. For example, where the support material is silica which, prior to the use thereof in the first catalyst system synthesis step, is dehydrated by fluidizing it with nitrogen and heating at about 600° C. for about 16 hours, a surface hydroxyl group concentration of about 0.7 millimoles per gram (mmols/gm) is typically achieved. Thus, the exact molar ratio of the activator to the surface reactive groups on the carrier will vary. Preferably, this is determined on a case-by-case basis to assure that only so much of the activator is added to the solution as will be deposited onto the support material without leaving excess of the activator in the solution.

The amount of the activator which will be deposited onto the support material without leaving excess in the solution can be determined in any conventional manner, e.g., by adding the activator to the slurry of the carrier in the solvent, while stirring the slurry, until the activator is detected as a solution in the solvent by any technique known in the art, such as by $^1$H NMR. For example, for the silica support material heated at about 600° C., the amount of the activator added to the slurry is such that the molar ratio of boron to the hydroxyl groups (OH) on the silica is about 0.5:1 to about 4:1, preferably about 0.8:1 to about 3:1, more preferably about 0.9:1 to about 2:1 and most preferably about 1:1. The amount of boron on the silica may be determined by using ICPES (Inductively Coupled Plasma Emission Spectrometry), which is described in J. W. Olesik, "Inductively Coupled Plasma-Optical Emission Spectroscopy," in the Encyclopedia of Materials Characterization, C. R. Brundle, C. A. Evans, Jr. and S. Wilson, Eds., Butterworth-Heinemann, Boston, Mass., 1992, pp. 633-644. In another embodiment, it is also possible to add such an amount of activator which is in excess of that which will be deposited onto the support, and then remove, e.g., by filtration and washing, any excess of the activator.

The inventors have surprisingly discovered that the catalyst systems described herein, particularly the hafnocenes, have a productivity of greater than 150 kg/g catalyst hr$^{-1}$, greater than 300 kg/g catalyst hr$^{-1}$, or greater than 450 kg/g catalyst hr$^{-1}$ at a temperature of 90° C. or greater.

Catalyst Processes

In embodiments herein, the invention relates to a process for making a vinyl terminated propylene polymer, wherein the process comprises: contacting, propylene, and an optional comonomer, with a catalyst system, comprising an activator and at least one metallocene compound, where the metallocene compound is any of the compounds described herein, typically represented by the formula:

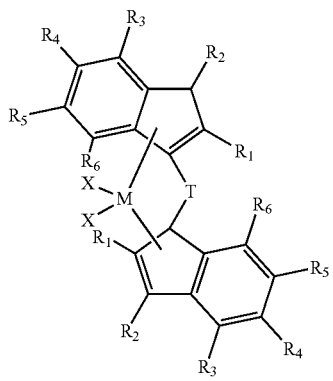

where:
M is hafnium or zirconium, preferably hafnium; each X is, independently, selected from the group consisting of hydrocarbyl radicals having from 1 to 20 carbon atoms, hydrides, amides, alkoxides, sulfides, phosphides, halides, dienes, amines, phosphines, ethers, and a combination thereof, (two X's may form a part of a fused ring or a ring system), preferably each X is independently selected from halides and $C_1$ to $C_5$ alkyl groups, preferably each X is a methyl group; each $R_1$ is, independently, a $C_1$ to $C_{10}$ alkyl group, preferably methyl, ethyl, propyl, butyl, pentyl, hexyl, or isomers thereof, preferably each $R_1$ is a methyl group; each $R_2$ is, independently, a $C_1$ to $C_{10}$ alkyl group, preferably methyl, ethyl, propyl, butyl, pentyl, hexyl, or isomers thereof, preferably each $R_2$ is a n-propyl group; each $R_3$ is hydrogen; each $R_4$, $R_5$, and $R_6$, is hydrogen or a substituted hydrocarbyl group or unsubstituted hydrocarbyl group, or a heteroatom, preferably each $R_4$, $R_5$, and $R_6$ is hydrogen; T is a bridging group, preferably T is dialkyl silicon or dialkyl germanium, preferably T is dimethyl silicon; and further provided that any of adjacent $R_4$, $R_5$, and $R_6$ groups may form a fused ring or multicenter fused ring system where the rings may be aromatic, partially saturated or saturated; wherein a propylene polymer having at least 35% allyl chain ends (relative to total unsaturations) (preferably at least 50%, at least 60%, at least 70%, at least 80%, at least 90%, or at least 95%) is produced.

Other additives may also be used, as desired, such as one or more scavengers, promoters, modifiers, chain transfer agents, reducing agents, oxidizing agents, hydrogen, aluminum alkyls, or silanes.

Optional comonomers useful herein to make vinyl terminated polymers include ethylene and/or $C_4$ to $C_{40}$ olefins, preferably ethylene and/or $C_5$ to $C_{25}$ olefins, or preferably ethylene and/or $C_6$ to $C_{18}$ olefins. The $C_4$ to $C_{40}$ olefin monomers may be linear, branched, or cyclic. The $C_4$ to $C_{40}$ cyclic olefins may be strained or unstrained, monocyclic or polycyclic, and may optionally include heteroatoms and/or one or more functional groups. Exemplary, $C_4$ to $C_{40}$ olefin monomers include butene, pentene, hexene, heptene, octene, nonene, decene, undecene, dodecene, norbornene, norbornadiene, dicyclopentadiene, cyclopentene, cycloheptene, cyclooctene, cyclooctadiene, cyclododecene, 7-oxanorbornene, 7-oxanorbornadiene, substituted derivatives thereof, and isomers thereof, preferably hexene, heptene, octene, nonene, decene, dodecene, cyclooctene, 1,5-cyclooctadiene, 1-hydroxy-4-cyclooctene, 1-acetoxy-4-cyclooctene, 5-methylcyclopentene, cyclopentene, dicyclopentadiene, norbornene, norbornadiene, and their respective homologs and derivatives, preferably norbornene, norbornadiene, and dicyclopentadiene, as shown below.

norbornene     norbornadiene     dicyclopentadiene

In some embodiments, where butene is the comonomer, the butene source may be a mixed butene stream comprising various isomers of butene. The 1-butene monomers are expected to be preferentially consumed by the polymerization process. Use of such mixed butene streams will provide an economic benefit, as these mixed streams are often waste streams from refining processes, for example, $C_4$ raffinate streams, and can therefore be substantially less expensive than pure 1-butene.

Processes of this invention can be carried out in any manner known in the art. Any suspension, homogeneous, bulk, solution, slurry, or gas phase polymerization process known in the art can be used. Such processes can be run in a batch, semi-batch, or continuous mode. Homogeneous polymerization processes and slurry processes are preferred. (A homogeneous polymerization process is defined to be a process where at least 90 wt % of the product is soluble in the reaction media.) A bulk homogeneous process is particularly preferred. (A bulk process is defined to be a process where monomer concentration in all feeds to the reactor is 70 volume % or more.) Alternately, no solvent or diluent is present or added in the reaction medium, (except for the small amounts used as the carrier for the catalyst system or other additives, or amounts typically found with the monomer; e.g., propane in propylene). In another embodiment, the process is a slurry process. As used herein the term "slurry polymerization process" means a polymerization process where a supported catalyst is employed and monomers are polymerized on the supported catalyst particles. At least 95 wt % of polymer products derived from the supported catalyst are in granular form as solid particles (not dissolved in the diluent).

Suitable diluents/solvents for polymerization include non-coordinating, inert liquids. Examples include straight and branched-chain hydrocarbons, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof, such as can be found commercially (Isopar™); perhalogenated hydrocarbons, such as perfluorinated $C_{4-10}$ alkanes, chlorobenzene, and aromatic and alkylsubstituted aromatic compounds, such as benzene, toluene, mesitylene, and xylene. Suitable solvents also include liquid olefins which may act as monomers or comonomers including ethylene, propylene, 1-butene, 1-hexene, 1-pentene, 3-methyl-1-pentene, 4-methyl-1-pentene, 1-octene, 1-decene, and mixtures thereof. In a preferred embodiment, aliphatic hydrocarbon solvents are used as the solvent, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof. In another embodiment, the solvent is not aromatic, preferably aromatics are present in the solvent at less than 1 wt %, preferably less than 0.5 wt %, preferably less than 0 wt % based upon the weight of the solvents.

In a preferred embodiment, the feed concentration of the monomers and comonomers for the polymerization is 60 vol % solvent or less, preferably 40 vol % or less, or preferably 20 vol % or less, based on the total volume of the feedstream. Preferably the polymerization is run in a bulk process.

In some embodiments, the productivity is 4500 g/mmol/hour or more, preferably 5000 g/mmol/hour or more, preferably 10,000 g/mmol/hr or more, preferably 50,000 g/mmol/hr or more. In other embodiments, the productivity is at least 80,000 g/mmol/hr, preferably at least 150,000 g/mmol/hr, preferably at least 200,000 g/mmol/hr, preferably at least 250,000 g/mmol/hr, preferably at least 300,000 g/mmol/hr.

Preferred polymerizations can be run at any temperature and/or pressure suitable to obtain the desired vinyl terminated polymers. Typical temperatures and/or pressures, such as at a temperature in the range of from about 0° C. to about 300° C., preferably about 20° C. to about 200° C., preferably about 35° C. to about 150° C., preferably from about 40° C. to about 120° C., preferably from about 45° C. to about 80° C.; and at a pressure in the range of from about 0.35 MPa to about 10 MPa, preferably from about 0.45 MPa to about 6 MPa, or preferably from about 0.5 MPa to about 4 MPa.

In a typical polymerization, the run time of the reaction is up to 300 minutes, preferably in the range of from about 5 to 250 minutes, or preferably from about 10 to 120 minutes.

In a preferred embodiment hydrogen is present in the polymerization reactor at a partial pressure of 0.001 to 50 psig (0.007 to 345 kPa), preferably from 0.01 to 25 psig (0.07 to 172 kPa), more preferably 0.1 to 10 psig (0.7 to 70 kPa). It has been found that in the present systems, hydrogen can be used to provide increased activity without significantly impairing the catalyst's ability to produce allylic chain ends. Preferably, the catalyst activity (calculated as g/mmol catalyst/hr) is at least 20% higher than the same reaction without hydrogen present, preferably at least 50% higher, preferably at least 100% higher.

In an alternate embodiment, the activity of the catalyst is at least 50 g/mmol/hour, preferably 500 or more g/mmol/hour, preferably 5000 or more g/mmol/hr, preferably 50,000 or more g/mmol/hr. In an alternate embodiment, the conversion of olefin monomer is at least 10%, based upon polymer yield and the weight of the monomer entering the reaction zone, preferably 20% or more, preferably 30% or more, preferably 50% or more, preferably 80% or more.

In a preferred embodiment, little or no alumoxane is used in the process to produce the vinyl terminated polymers. Preferably, alumoxane is present at zero mol %, alternately the alumoxane is present at a molar ratio of aluminum to transition metal less than 500:1, preferably less than 300:1, preferably less than 100:1, preferably less than 1:1.

In an alternate embodiment, if an alumoxane is used to produce the vinyl terminated polymers then, the alumoxane has been treated to remove free alkyl aluminum compounds, particularly trimethyl aluminum.

Further, in a preferred embodiment, the activator used herein to produce the vinyl terminated polymer is a bulky activator as defined herein and is discrete.

In a preferred embodiment, little or no scavenger is used in the process to produce the vinyl terminated polymer. Preferably, scavenger (such as tri alkyl aluminum) is present at zero mol %, alternately the scavenger is present at a molar ratio of scavenger metal to transition metal of less than 100:1, preferably less than 50:1, preferably less than 15:1, preferably less than 10:1.

In a preferred embodiment, the polymerization: 1) is conducted at temperatures of 0 to 300° C. (preferably 25 to 150° C., preferably 40 to 120° C., preferably 45 to 80° C.); 2) is conducted at a pressure of atmospheric pressure to 10 MPa (preferably 0.35 to 10 MPa, preferably from 0.45 to 6 MPa, preferably from 0.5 to 4 MPa); 3) is conducted in an aliphatic hydrocarbon solvent (such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof; preferably where aromatics are present in the solvent at less than 1 wt %, preferably less than 0.5 wt %, preferably at 0 wt % based upon the weight of the solvents); 4) wherein the catalyst system used in the polymerization comprises less than 0.5 mol %, preferably 0 mol % alumoxane, alternately the alumoxane is present at a molar ratio of aluminum to transition metal less than 500:1, preferably less than 300:1, preferably less than 100:1, preferably less than 1:1); 5) the polymerization occurs in one reaction zone; 6) the productivity of the catalyst compound is at least 80,000 g/mmol/hr (preferably at least 150,000 g/mmol/hr, preferably at least 200,000 g/mmol/hr, preferably at least 250,000 g/mmol/hr, preferably at least 300,000 g/mmol/hr); 7) optionally scavengers (such as trialkyl aluminum compounds) are absent (e.g. present at zero mol %, alternately the scavenger is present at a molar ratio of scavenger metal to transition metal of less than 100:1, preferably less than 50:1, preferably less than 15:1, preferably less than 10:1); and 8) optionally hydrogen is present in the polymerization reactor at a partial pressure of 0.001 to 50 psig (0.007 to 345 kPa) (preferably from 0.01 to 25 psig (0.07 to 172 kPa), more preferably 0.1 to 10 psig (0.7 to 70 kPa)). In a preferred embodiment, the catalyst system used in the polymerization comprises no more than one catalyst compound. A "reaction zone" also referred to as a "polymerization zone" is a vessel where polymerization takes place, for example a batch reactor. When multiple reactors are used in either series or parallel configuration, each reactor is considered as a separate polymerization zone. For a multi-stage polymerization in both a batch reactor and a continuous reactor, each polymerization stage is considered as a separate polymerization zone. In a preferred embodiment, the polymerization occurs in one reaction zone. Room temperature is 23° C. unless otherwise noted.

Vinyl Terminated Polymers

In embodiments herein, the homogenous process produces a vinyl terminated propylene polymer. In some embodiments, the vinyl terminated propylene polymer is a copolymer, for example of propylene and ethylene. In particular embodiments, the vinyl terminated propylene polymer is a terpolymer, for example, of propylene, ethylene, and a $C_4$ to $C_{40}$ olefin.

Useful vinyl terminated polymers produced herein include propylene homopolymers comprising propylene and less than 0.5 wt % comonomer, preferably 0 wt % comonomer, wherein the polymer has: (i) at least 93% allyl chain ends (preferably at least 95%, preferably at least 97%, preferably at least 98%); (ii) a number average molecular weight (Mn, as measured by $^1$H NMR) 100 g/mol or greater (preferably in the range of from about 150 to about 60,000 g/mol, preferably 200 to 45,000 g/mol, preferably 250 to 25,000 g/mol, preferably 300 to 10,000 g/mol, preferably 400 to 9,500 g/mol, preferably 500 to 9,000 g/mol, preferably 750 to 9,000 g/mol); (iii) an isobutyl chain end to allylic vinyl group ratio of 0.8:1 to 1.3:1.0; and (iv) less than 1400 ppm aluminum, (preferably less than 1200 ppm, preferably less than 1000 ppm, preferably less than 500 ppm, preferably less than 100 ppm).

Useful vinyl terminated polymers produced herein also include propylene copolymers having an Mn (as measured by ¹H NMR) of 100 g/mol or greater (preferably in the range of from about 150 to about 60,000 g/mol, preferably 200 to 45,000 g/mol, preferably 250 to 25,000 g/mol, preferably 300 to 10,000 g/mol, preferably 400 to 9,500 g/mol, preferably 500 to 9,000 g/mol, preferably 750 to 9,000 g/mol), comprising (i) 10 to 90 mol % propylene (preferably 15 to 85 mol %, preferably 20 to 80 mol %, preferably 30 to 75 mol %, preferably 50 to 90 mol %); and (ii) 10 to 90 mol % (preferably 85 to 15 mol %, preferably 20 to 80 mol %, preferably 25 to 70 mol %, preferably 10 to 50 mol %) of one or more alpha-olefin comonomers (preferably ethylene, butene, hexene, or octene, preferably ethylene), wherein the polymer has at least X % allyl chain ends (relative to total unsaturations), where: 1) X=(−0.94 (mol % ethylene incorporated)+100 {alternately 1.20 (−0.94 (mol % ethylene incorporated)+100), alternately 1.50 (−0.94 (mol % ethylene incorporated)+100)}), when 10 to 60 mol % ethylene is present in the copolymer, and 2) X=45 (alternately 50, alternately 60), when greater than 60 and less than 70 mol % ethylene is present in the co-polymer, and 3) X=(1.83*(mol % ethylene incorporated)−83, {alternately 1.20 [1.83*(mol % ethylene incorporated)-83], alternately 1.50[1.83*(mol % ethylene incorporated)-83]}), when 70 to 90 mol % ethylene is present in the copolymer. Alternately, X is 80% or more, preferably 85% or more, preferably 90% or more, preferably 95% or more.

In an alternate embodiment, the vinyl terminated polymer has at least 80% isobutyl chain ends (based upon the sum of isobutyl and n-propyl saturated chain ends), preferably at least 85% isobutyl chain ends, preferably at least 90% isobutyl chain ends. Alternately, the polymer has an isobutyl chain end to allylic vinyl group ratio of 0.8:1 to 1.35:1.0, preferably 0.9:1 to 1.20:1.0, preferably 0.9:1.0 to 1.1:1.0.

Useful vinyl terminated polymers produced herein further include propylene polymers comprising more than 90 mol % propylene (preferably 95 to 99 mol %, preferably 98 to 99 mol %) and less than 10 mol % ethylene (preferably 1 to 4 mol % or preferably 1 to 2 mol %), wherein the polymer has: (i) at least 93% allyl chain ends (preferably at least 95%, preferably at least 97%, preferably at least 98%); (ii) an Mn (measured by ¹H NMR) of 100 g/mol or greater (preferably in the range of from about 150 to about 60,000 g/mol, preferably 200 to 45,000 g/mol, preferably 250 to 25,000 g/mol, preferably 300 to 10,000 g/mol, preferably 400 to 9,500 g/mol, preferably 500 to 9,000 g/mol, or preferably 750 to 9,000 g/mol); and (iii) an isobutyl chain end to allylic vinyl group ratio of 0.8:1 to 1.35:1.0, and less than 1400 ppm aluminum, (preferably less than 1200 ppm, preferably less than 1000 ppm, preferably less than 500 ppm, or preferably less than 100 ppm).

Useful vinyl terminated polymers produced herein yet further include propylene polymers comprising: (i) at least 50 (preferably 60 to 90, preferably 70 to 90) mol % propylene and from 10 to 50 (preferably 10 to 40, preferably 10 to 30) mol % ethylene; wherein the polymer has: (ii) at least 90% allyl chain ends (preferably at least 91%, preferably at least 93%, preferably at least 95%, or preferably at least 98%); an Mn (measured by ¹H NMR) of 100 g/mol or greater (preferably in the range of from about 150 to about 60,000 g/mol, preferably 200 to 45,000 g/mol, preferably 250 to 25,000 g/mol, preferably 300 to 10,000 g/mol, preferably 400 to 9,500 g/mol, preferably 500 to 9,000 g/mol, or preferably 750 to 9,000 g/mol); and iii) an isobutyl chain end to allylic vinyl group ratio of 0.8:1 to 1.3:1.0, wherein monomers having four or more carbon atoms are present at from 0 to 3 mol % (preferably less than 1 mol %, preferably less than 0.5 mol %, or preferably at 0 mol %).

Useful vinyl terminated polymers produced herein also include propylene polymers comprising: (i) at least 50 (preferably at least 60, preferably 70 to 99.5, preferably 80 to 99, preferably 90 to 98.5) mol % propylene; (ii) from 0.1 to 45 (preferably at least 35, preferably 0.5 to 30, preferably 1 to 20, preferably 1.5 to 10) mol % ethylene; and (iii) from 0.1 to 5 (preferably 0.5 to 3, preferably 0.5 to 1) mol % $C_4$ to $C_{12}$ olefin (such as butene, hexene or octene, preferably butene), wherein the polymer has: (a) at least 90% allyl chain ends (preferably at least 91%, preferably at least 93%, preferably at least 95%, preferably at least 98%); (b) an Mn (measured by ¹H NMR) of 100 g/mol or greater (preferably in the range of from about 150 to about 60,000 g/mol, preferably 200 to 45,000 g/mol, preferably 250 to 25,000 g/mol, preferably 300 to 10,000 g/mol, preferably 400 to 9,500 g/mol, preferably 500 to 9,000 g/mol, preferably 750 to 9,000 g/mol); and (c) an isobutyl chain end to allylic vinyl group ratio of 0.8:1 to 1.35:1.0.

Useful vinyl terminated polymers produced herein also include propylene polymers comprising: (i) at least 50 (preferably at least 60, preferably 70 to 99.5, preferably 80 to 99, preferably 90 to 98.5) mol % propylene; (ii) from 0.1 to 45 (preferably at least 35, preferably 0.5 to 30, preferably 1 to 20, preferably 1.5 to 10) mol % ethylene; and (iii) from 0.1 to 5 (preferably 0.5 to 3, preferably 0.5 to 1) mol % diene (such as $C_4$ to $C_{12}$ alpha-omega dienes (such as butadiene, hexadiene, octadiene), norbornene, ethylidene norbornene, vinylnorbornene, norbornadiene, and dicyclopentadiene), wherein the polymer has: (a) at least 90% allyl chain ends (preferably at least 91%, preferably at least 93%, preferably at least 95%, preferably at least 98%); (b) an Mn (measured by ¹H NMR) of 100 g/mol or greater (preferably in the range of from about 150 to about 60,000 g/mol, preferably 200 to 45,000 g/mol, preferably 250 to 25,000 g/mol, preferably 300 to 10,000 g/mol, preferably 400 to 9,500 g/mol, preferably 500 to 9,000 g/mol, preferably 750 to 9,000 g/mol); and (c) an isobutyl chain end to allylic vinyl group ratio of 0.7:1 to 1.35:1.0.

Useful vinyl terminated polymers that may be produced using the catalyst system described herein include polymers having an Mn (measured by ¹H NMR) of 200 g/mol or more, (preferably 300 to 60,000 g/mol, 400 to 50,000 g/mol, preferably 500 to 35,000 g/mol, preferably 300 to 15,000 g/mol, preferably 400 to 12,000 g/mol, or preferably 750 to 10,000 g/mol); and comprising: (i) from about 20 to 99.9 mol % (preferably from about 25 to about 90 mol %, from about 30 to about 85 mol %, from about 35 to about 80 mol %, from about 40 to about 75 mol %, or from about 50 to about 95 mol %) of at least one $C_5$ to $C_{40}$ olefin (preferably $C_5$ to $C_{30}$ α-olefins, more preferably $C_5$ to $C_{20}$ α-olefins, preferably, $C_5$ to $C_{12}$ α-olefins, preferably pentene, hexene, heptene, octene, nonene, decene, undecene, dodecene, norbornene, norbornadiene, dicyclopentadiene, cyclopentene, cycloheptene, cyclooctene, cyclooctadiene, cyclododecene, 7-oxanorbornene, 7-oxanorbornadiene, substituted derivatives thereof, and isomers thereof, preferably hexene, heptene, octene, nonene, decene, dodecene, cyclooctene, 1,5-cyclooctadiene, 1-hydroxy-4-cyclooctene, 1-acetoxy-4-cyclooctene, 5-methylcyclopentene, cyclopentene, dicyclopentadiene, norbornene, norbornadiene, and their respective homologs and derivatives, preferably norbornene, norbornadiene, and dicyclopentadiene); and (ii) from about 0.1 to 80 mol % of propylene (preferably from about 5 to 70 mol %, from about 10 to about 65 mol %, from about 15 to about 55 mol %, from about 25 to about 50 mol %, or from about 30 to about 80 mol %); wherein the vinyl terminated polymer has at least 40% allyl chain ends (preferably at least 50%, at least 60%, at least 70%; at least 80%, at least 90%; at least 95%); and, optionally, an isobutyl chain end to allylic chain end ratio of less than 0.70:1 (preferably less than 0.65:1, less than 0.60:1, less than 0.50:1, or less than 0.25:1); and, further, optionally, an allyl chain end to vinylidene chain end (as determined by $^1$H NMR) ratio of more than 2:1 (preferably more than 2.5:1, more than 3:1, more than 5:1, or more than 10:1); and, further, optionally, an allyl chain end to vinylene chain end ratio of greater than 10:1 (preferably greater than 15:1, or greater than 20:1); and, even further, optionally, preferably substantially no isobutyl chain ends (preferably less than 0.1 wt % isobutyl chain ends). For further information on such vinyl terminated polymers please see concurrently filed U.S. Ser. No. 13/072,249, filed Mar. 25, 2011, entitled "Vinyl Terminated Higher Olefin Copolymers and Methods to Produce Thereof."

Useful vinyl terminated polymers that may be produced using the catalyst system described herein also include polymers having an Mn (measured by $^1$H NMR) of 200 g/mol or more (preferably 300 to 60,000 g/mol, 400 to 50,000 g/mol, preferably 500 to 35,000 g/mol, preferably 300 to 15,000 g/mol, preferably 400 to 12,000 g/mol, or preferably 750 to 10,000 g/mol) and comprises: (i) from about 80 to 99.9 mol % (preferably 85 to 99.9 mol %, more preferably 90 to 99.9 mol %) of at least one $C_4$ olefin (preferably 1-butene); and (ii) from about 0.1 to 20 mol % of propylene, preferably 0.1 to 15 mol %, more preferably 0.1 to 10 mol %; wherein the vinyl terminated polymer has at least 40% allyl chain ends, preferably at least 50%, at least 60%, at least 70%, or at least 80%; and, optionally, an isobutyl chain end to allylic chain end ratio of less than 0.70:1, less than 0.65:1, less than 0.60:1, less than 0.50:1, or less than 0.25:1; and, further, optionally, an allyl chain end to vinylidene chain end ratio of more than 2:1, more than 2.5:1, more than 3:1, more than 5:1, or more than 10:1; and, further, optionally, an allyl chain end to vinylene chain end ratio of greater than 10:1 (preferably greater than 15:1, or greater than 20:1); and, even further, optionally, preferably, substantially no isobutyl chain ends (preferably less than 0.1 wt % isobutyl chain ends). For further information on such vinyl terminated polymers please see concurrently filed U.S. Ser. No. 13/072,249, filed Mar. 25,2011, entitled "Vinyl Terminated Higher Olefin Copolymers and Methods to Produce Thereof"

Useful vinyl terminated polymers that may be produced using the catalyst system described herein also include polymers having an Mn of at least 200 g/mol, (preferably 200 to 100,000 g/mol, preferably 200 to 75,000 g/mol, preferably 200 to 60,000 g/mol, preferably 300 to 60,000 g/mol, or preferably 750 to 30,000 g/mol) (measured by $^1$H NMR) comprising of one or more (preferably two or more, three or more, four or more, and the like) $C_4$ to $C_{40}$ (preferably $C_4$ to $C_{30}$, $C_4$ to $C_{20}$, or $C_4$ to $C_{12}$, preferably butene, pentene, hexene, heptene, octene, nonene, decene, undecene, dodecene, norbornene, norbornadiene, dicyclopentadiene, cyclopentene, cycloheptene, cyclooctene, cyclooctadiene, cyclododecene, 7-oxanorbornene, 7-oxanorbornadiene, substituted derivatives thereof, and isomers thereof) $C_4$ to $C_{40}$ olefin derived units, where the vinyl terminated polymer comprising $C_4$ to $C_{40}$ olefin derived units comprises substantially no propylene derived units (preferably less than 0.1 wt % propylene); and wherein the polymer comprising $C_4$ to $C_{40}$ olefin derived units has at least 5% (at least 10%, at least 15%, at least 20%, at least 30%, at least 40%, at least 50%, at least 60%, at least 70% allyl; at least 80%, at least 90%, or at least 95%) allyl chain ends; and optionally, an allyl chain end to vinylidene chain end ratio of greater than 2:1 (preferably greater than 2.5:1, greater than 3:1, greater than 5:1, or greater than 10:1); and, further, optionally, an allyl chain end to vinylene chain end ratio of greater than 10:1 (preferably greater than 15:1, or greater than 20:1); and, even further, optionally, preferably substantially no isobutyl chain ends (preferably less than 0.1 wt % isobutyl chain ends). In some embodiments, these vinyl terminated polymers may comprise ethylene derived units, preferably at least 5 mol % ethylene (preferably at least 15 mol % ethylene, preferably at least 25 mol % ethylene, preferably at least 35 mol % ethylene, preferably at least 45 mol % ethylene, preferably at least 60 mol % ethylene, preferably at least 75 mol % ethylene, or preferably at least 90 mol % ethylene). For further information on such vinyl terminated polymers please see concurrently filed U.S. Ser. No 13/072,288, filed Mar. 25, 2011, entitled "Vinyl Terminated Higher Olefin Polymers and Methods to Produce Thereof."

The vinyl terminated propylene polymer produced herein preferably has an Mn (measured by $^1$H NMR) of 100 g/mol or greater (preferably in the range of from about 150 to about 60,000 g/mol, preferably 200 to 45,000 g/mol, preferably 250 to 25,000 g/mol, preferably 300 to 10,000 g/mol, preferably 400 to 9,500 g/mol, preferably 500 to 9,000 g/mol, preferably 750 to 9,000 g/mol). Further, a desirable molecular weight range can be any combination of any upper molecular weight limit with any lower molecular weight limit described above.

In another embodiment, the vinyl terminated propylene polymers produced herein have a Mw (measured using a GPC-DRI method) in the range of from about 1,000 to about 60,000 g/mol, preferably from about 2000 to 50,000 g/mol, preferably from about 3,000 to 35,000 g/mol and/or a Mz (measured using a GPC-DRI method, as described below) in the range of from about 1700 to about 150,000 g/mol, or preferably from about 800 to 100,000 g/mol.

Molecular weight distribution (Mw/Mn) is also determined by the GPC-DRI method below. In some embodiments, the copolymers of this invention have an Mw/Mn (both determined by GPC-DRI) in the range of from greater than 1.0 to 20 (alternately from about 1.2 to 20, alternately from about 1.5 to 10, or alternately from about 1.7 to 5.5).

In particular embodiments, the vinyl terminated propylene polymer produced herein has an Mn (measured by $^1$H NMR) of 100 g/mol or greater (preferably in the range of from about 150 to about 60,000 g/mol, preferably 200 to 45,000 g/mol, preferably 250 to 25,000 g/mol, preferably 300 to 10,000 g/mol, preferably 400 to 9,500 g/mol, preferably 500 to 9,000 g/mol, preferably 750 to 9,000 g/mol), a Mw in the range of from about 1,000 to about 60,000 g/mol (preferably from about 2000 to 50,000 g/mol, preferably from about 3,000 to 35,000 g/mol), and a Mz of from about 1700 to about 150,000 g/mol (or preferably from about 800 to 100,000 g/mol).

As used herein, Mn is number average molecular weight (measured by $^1$H NMR, unless stated otherwise), Mw is weight average molecular weight (measured by Gel Permeation Chromatography, GPC), and Mz is z average molecular weight (measured by GPC). Mn, Mw, and Mz are measured by using a GPC method using a High Temperature Size Exclusion Chromatograph (SEC, either from Waters Corporation or Polymer Laboratories), equipped with a differential refractive index detector (DRI). Experimental details, are described in: T. Sun, P. Brant, R. R. Chance, and W. W. Graessley, Macromolecules, Volume 34, Number 19, pp. 6812-6820, (2001) and references therein. Three Polymer Laboratories PLgel 10 mm Mixed-B columns are used. The nominal flow rate is 0.5 cm$^3$/min, and the nominal injection volume is 300 μL. The various transfer lines, columns and differential refractometer (the DRI detector) are contained in an oven maintained at 135° C. Solvent for the SEC experiment is prepared by dissolving 6 grams of butylated hydroxy toluene as an antioxidant in 4 liters of Aldrich reagent grade 1, 2, 4 trichlorobenzene (TCB). The TCB mixture is then filtered through a 0.7 μm glass pre-filter and subsequently through a 0.1 gm Teflon filter. The TCB is then degassed with an online degasser before entering the SEC. Polymer solutions are prepared by placing dry polymer in a glass container, adding the desired amount of TCB, then heating the mixture at 160° C. with continuous agitation for about 2 hours. All quantities are measured gravimetrically. The TCB densities used to express the polymer concentration in mass/volume units are 1.463 g/mL at room temperature and 1.324 g/mL at 135° C. The injection concentration is from 1.0 to 2.0 mg/mL, with lower concentrations being used for higher molecular weight samples. Prior to running each sample the DRI detector and the injector are purged. Flow rate in the apparatus is then increased to 0.5 mL/minute, and the DRI is allowed to stabilize for 8 to 9 hours before injecting the first sample. The concentration, c, at each point in the chromatogram is calculated from the baseline-subtracted DRI signal, $I_{DRI}$, using the following equation:

$$c = K_{DRI} I_{DRI}/(dn/dc)$$

where $K_{DRI}$ is a constant determined by calibrating the DRI, and (dn/dc) is the refractive index increment for the system. The refractive index, n=1.500 for TCB at 135° C. and λ=690 nm. For purposes of this invention and the claims thereto (dn/dc)=0.104 for propylene polymers and 0.1 otherwise. Units of parameters used throughout this description of the SEC method are: concentration is expressed in g/cm³, molecular weight is expressed in g/mol, and intrinsic viscosity is expressed in dL/g.

Vinyl terminated polymers, preferably vinyl terminated propylene polymers have a saturated chain end (or terminus) and/or an unsaturated chain end (or terminus). The unsaturated chain end comprises the "allyl chain end." An "allyl chain end" is represented by $CH_2CH-CH_2-$, as shown in formula:

where M represents the polymer chain.

The percentage of allyl chain ends is reported as the molar percentage of allylic vinyl groups, relative to total moles of unsaturated chain ends. In some embodiments, the vinyl terminated propylene polymer has at least 35% allyl chain ends, at least 50% allyl chain ends, at least 60% allyl chain ends, at least 70% allyl chain ends, at least 80% allyl chain ends, at least 90% allyl chain ends, or at least 95% allyl chain ends. The number of allyl chain ends is determined using ¹H NMR at 120° C. using deuterated tetrachloroethane as the solvent on a 250 MHz NMR spectrometer, and in selected cases, confirmed by ¹³C NMR. Resconi has reported proton and carbon assignments (neat perdeuterated tetrachloroethane used for proton spectra, while a 50:50 mixture of normal and perdeuterated tetrachloroethane was used for carbon spectra; all spectra were recorded at 100° C. on a Bruker spectrometer operating at 500 MHz for proton and 125 MHz for carbon) for vinyl terminated polymers in J. American Chemical Soc., 114, 1992, pp. 1025-1032 that are useful herein.

Vinyl terminated polymers, such as vinyl terminated propylene polymers also have a saturated chain end which may comprise an isobutyl chain end. An "isobutyl chain end" is defined to be an end or terminus of a polymer, represented as shown in the formula below:

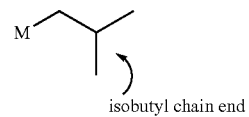

where M represents the polymer chain.

The structure of the polymer near the saturated chain end may differ, depending on the types and amounts of monomer(s) used, and method of insertion during the polymerization process. In some preferred embodiments, the structure of the polymer within four carbons of the isobutyl chain end is represented by one of the following formulae:

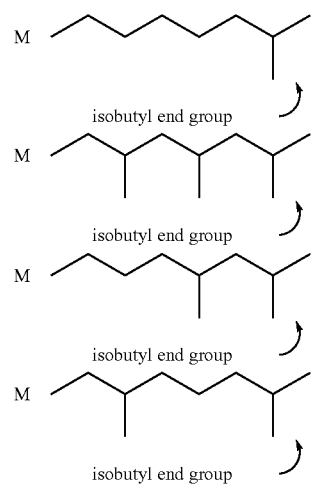

where M represents the polymer chain.

The percentage of isobutyl end groups is determined using ¹³C NMR (as described in the example section) and the chemical shift assignments in Resconi et al, J. Am. Chem. Soc. 1992, 114, pp. 1025-1032 for 100% propylene polymers and set forth in FIG. 2 of WO 2009/155471.

The percentage of isobutyl chain ends is determined using ¹³C NMR (as described in the Example section) and the chemical shift assignments in Resconi et al, J. Am. Chem. Soc. 114, 1992, pp. 1025-1032 for 100% propylene polymers and reported herein for vinyl terminated propylene polymers.

The "isobutyl chain end to allyl chain end ratio" is defined to be the ratio of the percentage of isobutyl chain ends to the percentage of allyl chain ends. In some embodiments, the isobutyl chain end to allyl chain end ratio is in the range of from about 0.8:1 to about 1.35:1. In other embodiments, the isobutyl chain end to allyl chain end ratio is in the range of from about 1:1 to about 1.2:1. The isobutyl chain end to allyl chain end ratio is a representation of the number of vinyl groups present per polymer chain. For example, an isobutyl chain end to allylic vinyl group ratio of about 1:1 indicates that there is, on average, about one allylic vinyl group present per polymer chain.

In some embodiments, the propylene polymer produced herein is atactic. The inventors have surprisingly found that the catalyst systems of the present invention produce atactic vinyl terminated propylene polymers. Although the metallocene compounds of the present invention are racemic isomers and, in theory, are capable of producing isotactic polypropylene, the inventors have found that inventive catalyst systems disclosed herein produce atactic propylene polymers with surprisingly high levels of vinyl chain ends. The atactic nature of the propylene polymer may be determined from $^{13}$C NMR by the absence of regularity in the chiral structures of the repeat units, where regularity is characterized by mm, mr, rm, and rr triads as described by Zambelli et al. in Macromolecules, 8, pp. 687-689 (1975) and Macromolecules, 13, pp. 267-270 (1980).

Any of the polymers prepared herein preferably have less than 1400 ppm aluminum, preferably less than 1000 ppm aluminum, preferably less than 500 ppm aluminum, preferably less than 100 ppm aluminum, preferably less than 50 ppm aluminum, preferably less than 20 ppm aluminum, preferably less than 5 ppm aluminum. ICPES (Inductively Coupled Plasma Emission Spectrometry), which is described in J. W. Olesik, "Inductively Coupled Plasma-Optical Emission Spectroscopy," in the Encyclopedia of Materials Characterization, C. R. Brundle, C. A. Evans, Jr. and S. Wilson, Eds., Butterworth-Heinemann, Boston, Mass., 1992, pp. 633-644, is used to determine the amount of an element in a material.

In a preferred embodiment, the vinyl terminated propylene polymer comprises less than 3 wt % of functional groups selected from hydroxide, aryls and substituted aryls, halogens, alkoxys, carboxylates, esters, acrylates, oxygen, nitrogen, and carboxyl, preferably less than 2 wt %, more preferably less than 1 wt %, more preferably less than 0.5 wt %, more preferably less than 0.1 wt %, more preferably 0 wt %, based upon the weight of the polymer.

In another embodiment, the vinyl terminated propylene polymer comprises at least 50 wt % (preferably at least 75 wt %, preferably at least 90 wt %, based upon the weight of the copolymer composition) olefins having at least 36 carbon atoms (preferably at least 51 carbon atoms, preferably at least 102 carbon atoms) as measured by $^1$H NMR, assuming one unsaturation per chain.

In another embodiment, the vinyl terminated propylene polymer comprises less than 20 wt % dimer and trimer (preferably less than 10 wt %, preferably less than 5 wt %, more preferably less than 2 wt %, based upon the weight of the copolymer composition), as measured by gas chromatograph (GC). Products are analyzed by gas chromatography (Agilent 6890N with auto-injector) using helium as a carrier gas at 38 cm/sec. A column having a length of 60 m (J & W Scientific DB-1, 60 m×0.25 mm I.D.×1.0 μm film thickness) packed with a flame ionization detector (FID), an Injector temperature of 250° C., and a Detector temperature of 250° C. are used. The sample was injected into the column in an oven at 70° C., then heated to 275° C. over 22 minutes (ramp rate 10° C./min to 100° C., 30° C./min to 275° C., hold). An internal standard, usually the monomer, is used to derive the amount of dimer or trimer product that is obtained. Yields of dimer and trimer product are calculated from the data recorded on the spectrometer. The amount of dimer or trimer product is calculated from the area under the relevant peak on the GC trace, relative to the internal standard.

In another embodiment, any of the vinyl terminated polyolefins described or useful herein have 3-alkyl vinyl end groups (where the alkyl is a $C_1$ to $C_{38}$ alkyl), also referred to as a "3-alkyl chain ends" or a "3-alkyl vinyl termination", represented by the formula:

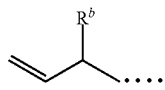

3-alkyl vinyl end group where "••••" represents the polyolefin chain and $R^b$ is a $C_1$ to $C_{38}$ alkyl group, preferably a $C_1$ to $C_{20}$ alkyl group, such as methyl, ethyl, propyl, butyl, pentyl, hexyl, heptyl, octyl, nonyl, decyl, undecyl, docecyl, and the like. The amount of 3-alkyl chain ends is determined using $^{13}$C NMR as set out below.

In a preferred embodiment, any of the vinyl terminated polyolefins described or useful herein have at least 5% 3-alkyl chain ends (preferably at least 10%, at least 20%, at least 30%; at least 40%, at least 50%, at least 60%, at least 70%; at least 80%, at least 90%; at least 95%), relative to total unsaturation.

In a preferred embodiment, any of the vinyl terminated polyolefins described or useful herein have at least 5% of 3-alkyl+allyl chain ends (e.g., all 3-alkyl chain ends plus all allyl chain ends), preferably at least 10%, at least 20%, at least 30%, at least 40%, at least 50%, at least 60%, at least 70%; at least 80%, at least 90%, at least 95%), relative to total unsaturation.

In another embodiment, the vinyl terminated propylene polymer contains less than 25 ppm hafnium or zirconium, preferably less than 10 ppm hafnium or zirconium, preferably less than 5 ppm hafnium or zirconium, based on the yield of polymer produced and the mass of catalyst employed, as determined by ICPES.

In yet other embodiments, the vinyl terminated propylene polymer is a liquid at 25° C.

In another embodiment, the vinyl terminated propylene polymers described herein have a melting temperature ($T_m$, DSC first melt) in the range of from 60° C. to 130° C., alternately 50° C. to 100° C. In another embodiment, the vinyl terminated propylene polymers described herein have no detectable melting temperature by DSC following storage at ambient temperature (23° C.) for at least 48 hours.

The vinyl terminated propylene polymer preferably has a glass transition temperature (Tg) of less than 0° C. or less (as determined by differential scanning calorimetry as described below), preferably –10° C. or less, more preferably –20° C. or less, more preferably –30° C. or less, more preferably –50° C. or less.

Melting temperature ($T_m$) and glass transition temperature (Tg) are measured using Differential Scanning calorimetry (DSC) using commercially available equipment such as a TA Instruments 2920 DSC. Typically, 6 to 10 mg of the sample, that has been stored at room temperature for at least 48 hours, is sealed in an aluminum pan and loaded into the instrument at room temperature. The sample is equilibrated at 25° C., then it is cooled at a cooling rate of 10° C./min to –80° C. The sample is held at –80° C. for 5 min and then heated at a heating rate of 10° C./min to 25° C. The glass transition temperature is measured from the heating cycle. Alternatively, the sample is equilibrated at 25° C., then heated at a heating rate of 10° C./min to 150° C. The endothermic melting transition, if present, is analyzed for onset of transition and peak temperature. The melting temperatures reported are the peak melting temperatures from the first heat unless otherwise specified. For samples displaying multiple peaks, the melting point (or melting temperature) is defined to be the peak melting temperature (i.e., associated with the largest endothermic calorimetric response in that range of temperatures) from the DSC melting trace.

In another embodiment, the vinyl terminated polymers described herein have a viscosity at 60° C. of greater than 1000 cP, greater than 12,000 cP, or greater than 100,000 cP. In other embodiments, the vinyl terminated polymers have a viscosity of less than 200,000 cP, less than 150,000 cP, or less than 100,000 cP. Viscosity is measured using a Brookfield Digital Viscometer.

Uses of Vinyl Terminated Polymers

The vinyl terminated polymers prepared herein may be functionalized by reacting a heteroatom containing group with the allyl group of the polymer, with or without a catalyst.

Examples include catalytic hydrosilylation, hydroformylation, hydroboration, epoxidation, hydration, dihydroxylation, hydroamination, or maleation with or without activators such as free radical generators (e.g., peroxides).

In some embodiments the vinyl terminated polymers produced herein are functionalized as described in U.S. Pat. No. 6,022,929; A. Toyota, T. Tsutsui, and N. Kashiwa, Polymer Bulletin 48, pp. 213-219, 2002; J. Am. Chem. Soc., 1990, 112, pp. 7433-7434; and U.S. Ser. No. 12/487,739 filed on Jun. 19, 2009 (Published as WO 2009/155472).

The functionalized polymers can be used in oil additivation and many other applications. Preferred uses include additives for lubricants and/or fuels. Preferred heteroatom containing groups include, amines, aldehydes, alcohols, acids, succinic acid, maleic acid, and maleic anhydride.

In particular embodiments herein, the vinyl terminated polymers disclosed herein, or functionalized analogs thereof, are useful as additives. In some embodiments, the vinyl terminated polymers disclosed herein, or functionalized analogs thereof, are useful as additives to a lubricant. Particular embodiments relate to a lubricant comprising the vinyl terminated polymers disclosed herein, or functionalized analogs thereof.

In other embodiments, the vinyl terminated polymers disclosed herein may be used as monomers for the preparation of polymer products. Processes that may be used for the preparation of these polymer products include coordinative polymerization and acid-catalyzed polymerization. In some embodiments, the polymeric products may be homopolymers. For example, if a vinyl terminated polymer (A) were used as a monomer, it is possible to form a homopolymer product with the formulation $(A)_n$, where n is the degree of polymerization.

In other embodiments, the polymer products formed from mixtures of monomer vinyl terminated polymers may be mixed polymers, comprising two or more repeating units that are different from each. For example, if a vinyl terminated polymer (A) and a different vinyl terminated polymer (B) were copolymerized, it is possible to form a mixed polymer product with the formulation $(A)_n(B)_m$, where n is the number of molar equivalents of vinyl terminated polymer (A) and m is the number of molar equivalents of vinyl terminated polymer (B) that are present in the mixed polymer product.

In yet other embodiments, polymer products may be formed from mixtures of the vinyl terminated polymer with another alkene. For example, if a vinyl terminated polymer (A) and alkene (B) were copolymerized, it is possible to form a mixed polymer product with the formulation $(A)_n(B)_m$, where n is the number of molar equivalents of vinyl terminated polymer and m is the number of molar equivalents of alkene that are present in the mixed polymer product.

In another embodiment, this invention relates to a functionalized polyolefin comprising the reaction product of a heteroatom containing group and any vinyl terminated polyolefin described herein, preferably where the functional group comprises one or more heteroatoms selected from the group consisting of P, O, S, N, Br, Cl, F, I, and/or B, and the functionalized polyolefin has 0.60 to 1.2, alternately, 0.75 to 1.10, functional groups per chain (preferably assuming that Mn has not altered by more than 15% as compared to the Mn of the vinyl terminated polyolefin prior to functionalization and optional derivatization). Number of functional groups per chain=F/Mn, is determined by $^1$H NMR as described in WO 2009/155472. (See pages 26 to 27, paragraphs [00111] to [00114], including that VDRA is VRDA, which is the normalized integrated signal intensity for the vinylidene resonances between from about 4.65 to 4.85 ppm and the vinylene resonances at from about 5.15 to 5.6 ppm.) Preferred heteroatom containing group comprise one or more of sulfonates, amines, aldehydes, alcohols, or acids, preferably the heteroatom containing group comprises an epoxide, succinic acid, maleic acid, or maleic anhydride, alternately the heteroatom containing group comprises one or more of acids, esters, anhydrides, acid-esters, oxycarbonyls, carbonyls, formyls, formylcarbonyls, hydroxyls, and acetyl halides.

Percent functionalization of the polyolefin=(F*100)/(F+VI+VE). The number of vinyl groups/1000 carbons (VI*) and number of vinylidene groups/1000 carbons (VE*) for the functionalized polyolefin are determined from the $^1$H NMR spectra of the functionalized polyolefin in the same manner as VI and VE for the unfunctionalized polymer. Preferably, the percent functionalization of the polyolefin is 75% or more, preferably 80% or more, preferably 90% or more, preferably 95% or more.

In another embodiment, the functionalized polyolefins described herein have the same Mn, and/or Mw, and/or Mz, or up to 15% greater than (preferably up to 10% greater than), as the starting vinyl terminated polyolefins, "same" is defined to mean within 5%.

In another embodiment, the vinyl terminated polyolefins described herein can be use in any process, blend or product disclosed in WO 2009/155472, which is incorporated by reference herein.

In another embodiment, this invention relates to:
1. A process for making a vinyl terminated propylene polymer, wherein the process comprises contacting:
   (i) propylene, under polymerization conditions; with
   (ii) a catalyst system, comprising:
      (a) an activator, comprising an anion and a cation (preferably a non-coordinating anion, preferably a boron compound, preferably a bulky activator represented by the formula:

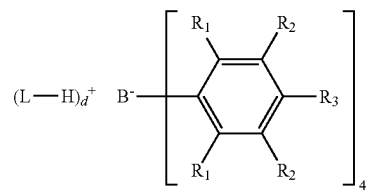

where:
each $R_1$ is, independently, a halide, preferably a fluoride;
each $R_2$ is, independently, a halide, a $C_6$ to $C_{20}$ substituted aromatic hydrocarbyl group, or a siloxy group of the formula —O—Si—$R_a$, where $R_a$ is a $C_1$ to $C_{20}$ hydrocarbyl or hydrocarbylsilyl group, preferably a fluoride or a $C_6$ perfluorinated aromatic hydrocarbyl group;

each R₃ is a halide, $C_6$ to $C_{20}$ substituted aromatic hydrocarbyl group, or a siloxy group of the formula —O—Si—$R_a$., where $R_a$ is a $C_1$ to $C_{20}$ hydrocarbyl or hydrocarbylsilyl group, preferably a fluoride or a $C_6$ perfluorinated aromatic hydrocarbyl group;

wherein L is an neutral Lewis base;

H is hydrogen;

B is boron;

$(L-H)^+$ is a Bronsted acid;

d is 1, 2, or 3;

wherein the anion of the activator has a molecular weight of greater than 1020 g/mol; and wherein at least three of the substituents on the B atom each have a molecular volume of greater than 250 cubic Å (alternately greater than 300 cubic Å, or alternately greater than 500 cubic Å); preferably the bulky activator is one or more of: trimethylammonium tetrakis(perfluoronaphthyl)borate, triethylammonium tetrakis(perfluoronaphthyl)borate, tripropylammonium tetrakis(perfluoronaphthyl)borate, tri(n-butyl)ammonium tetrakis(perfluoronaphthyl)borate, tri(t-butyl)ammonium tetrakis(perfluoronaphthyl)borate, N,N-dimethylanilinium tetrakis(perfluoronaphthyl)borate, N,N-diethylanilinium tetrakis(perfluoronaphthyl)borate, N,N-dimethyl-(2,4,6-trimethylanilinium) tetrakis(perfluoronaphthyl)borate, tropillium tetrakis(perfluoronaphthyl)borate, triphenylcarbenium tetrakis(perfluoronaphthyl)borate, triphenylphosphonium tetrakis(perfluoronaphthyl)borate, triethylsilylium tetrakis(perfluoronaphthyl)borate, benzene(diazonium) tetrakis(perfluoronaphthyl)borate, trimethylammonium tetrakis(perfluorobiphenyl)borate, triethylammonium tetrakis(perfluorobiphenyl)borate, tripropylammonium tetrakis(perfluorobiphenyl)borate, tri(n-butyl)ammonium tetrakis(perfluorobiphenyl)borate, tri(t-butyl)ammonium tetrakis(perfluorobiphenyl)borate, N,N-dimethylanilinium tetrakis(perfluorobiphenyl)borate, N,N-diethylanilinium tetrakis(perfluorobiphenyl)borate, N,N-dimethyl-(2,4,6-trimethylanilinium) tetrakis(perfluorobiphenyl)borate, tropillium tetrakis(perfluorobiphenyl)borate, triphenylcarbenium tetrakis(perfluorobiphenyl)borate, triphenylphosphonium tetrakis(perfluorobiphenyl)borate, triethylsilylium tetrakis(perfluorobiphenyl)borate, benzene(diazonium) tetrakis(perfluorobiphenyl)borate, [4-t-butyl-PhNMe₂H][($C_6F_3(C_6F_5)_2)_4$B], (where Ph is phenyl and Me is methyl));

(b) at least one metallocene compound, represented by the formula:

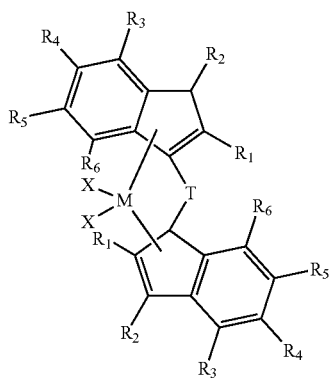

where:

M is hafnium or zirconium;

each X is, independently, selected from the group consisting of hydrocarbyl radicals having from 1 to 20 carbon atoms, hydrides, amides, alkoxides, sulfides, phosphides, halides, dienes, amines, phosphines, ethers, and a combination thereof, (two X's may form a part of a fused ring or a ring system);

each R₁ is, independently, a $C_1$ to $C_{10}$ alkyl group; (preferably methyl, ethyl, propyl, and butyl, and isomers thereof);

each R₂ is, independently, a $C_1$ to $C_{10}$ alkyl group; (preferably methyl, ethyl, propyl, and butyl, and isomers thereof);

each R₃ is hydrogen;

each R₄, R₅, and R₆, is, independently, hydrogen or a substituted hydrocarbyl or unsubstituted hydrocarbyl group, or a heteroatom;

T is a bridging group, preferably comprising silicon or germanium;

further provided that any of adjacent R₄, R₅, and R₆ groups may form a fused ring or multicenter fused ring system where the rings may be aromatic, partially saturated or saturated; (preferably, the metallocene compound is at least one of:

rac-dimethylsilyl bis(2-methyl,3-propylindenyl)hafniumdimethyl, rac-dimethylsilyl bis(2-methyl,3-propylindenyl)zirconiumdimethyl, rac-dimethylsilyl bis(2-ethyl,3-propylindenyl)hafniumdimethyl, rac-dimethylsilyl bis(2-ethyl,3-propylindenyl)zirconiumdimethyl, rac-dimethylsilyl bis(2-methyl,3-ethylindenyl)hafniumdimethyl, rac-dimethylsilyl bis(2-methyl,3-ethylindenyl)zirconiumdimethyl, rac-dimethylsilyl bis(2-methyl,3-isopropylindenyl)hafniumdimethyl, rac-dimethylsilyl bis(2-methyl,3-isopropylindenyl)zirconiumdimethyl, rac-dimethylsilyl bis(2-methyl,3-butylindenyl)hafniumdimethyl, rac-dimethylsilyl bis(2-methyl,3-butylindenyl)zirconiumdimethyl, rac-dimethylgermanyl bis(2-methyl,3-propylindenyl)hafniumdimethyl, rac-dimethylgermanyl bis(2-methyl,3-propylindenyl)zirconiumdimethyl, rac-dimethylgermanyl bis(2-ethyl,3-propylindenyl)hafniumdimethyl, rac-dimethylgermanyl bis(2-ethyl,3-propylindenyl)zirconiumdimethyl, rac-dimethylgermanyl bis(2-methyl,3-ethylindenyl)hafniumdimethyl, rac-dimethylgermanyl bis(2-methyl,3-ethylindenyl)zirconiumdimethyl, rac-dimethylgermanyl bis(2-methyl,3-isopropylindenyl)hafniumdimethyl, rac-dimethylgermanyl bis(2-methyl,3-isopropylindenyl)zirconiumdimethyl, rac-dimethylgermanyl bis(2-methyl,3-butylindenyl)hafniumdimethyl, rac-dimethylgermanyl bis(2-methyl,3-propylindenyl)zirconiumdimethyl, rac-dimethylsilyl bis(2-propyl,3-methylindenyl)hafniumdimethyl, rac-dimethylsilyl bis(2-propyl,3-methylindenyl)zirconiumdimethyl, rac-dimethylsilyl bis(2-propyl,3-ethylindenyl)hafniumdimethyl,
rac-dimethylsilyl bis(2-propyl,3-ethylindenyl)zirconiumdimethyl,
rac-dimethylsilylbis(2-propyl,3-butylindenyl)hafniumdimethyl,
rac-dimethylsilylbis(2-propyl,3-butylindenyl)zirconiumdimethyl,
rac-dimethylsilyl bis(2-methyl,3-butylindenyl)hafniumdimethyl,
rac-dimethylsilyl bis(2-methyl,3-butylindenyl)zirconiumdimethyl,
rac-dimethylsilyl bis(2,3-dimethyl)hafniumdimethyl,
rac-dimethylsilyl bis(2,3-dimethyl)zirconiumdimethyl,
rac-dimethylgermanyl bis(2-propyl,3-methylindenyl)hafniumdimethyl,
rac-dimethylgermanyl bis(2-propyl,3-methylindenyl)zirconiumdimethyl,
rac-dimethylgermanyl bis(2-propyl,3-ethylindenyl)hafniumdimethyl,
rac-dimethylgermanyl bis(2-propyl,3-ethylindenyl)zirconiumdimethyl,
rac-dimethylgermanyl bis(2-propyl,3-butylindenyl)hafniumdimethyl,
rac-dimethylgermanyl bis(2-propyl,3-butylindenyl)zirconiumdimethyl,
rac-dimethylgermanyl bis(2-methyl,3-butylindenyl)hafniumdimethyl,
rac-dimethylgermanyl bis(2-methyl,3-butylindenyl)zirconiumdimethyl,
rac-dimethylgermanyl bis(2,3-dimethyl)hafniumdimethyl, and
rac-dimethylgermanyl bis(2,3-dimethyl)zirconiumdimethyl);

(c) optionally, a support material; and
(d) optionally, a co-activator.

2. The process of paragraph 1, further comprising contacting a comonomer, preferably ethylene, with the propylene and the catalyst system, wherein a vinyl terminated propylene copolymer is produced, and wherein the vinyl terminated propylene copolymer has a comonomer content in the range of 0.1 to 50 mol %.

3. The process of paragraphs 1 and 2, where M is hafnium, the activator is dimethylaniliniumtetrakis(perfluoronaphthyl)borate, dimethylaniliniumtetrakis(perfluorobiphenyl)borate, or [4-t-butyl-PhNMe$_2$H][(C$_6$F$_3$(C$_6$F$_5$)$_2$)$_4$B], and the catalyst system has an activity of greater than 150 kg/g catalyst hr$^{-1}$ at a temperature of 90° C. or greater.

4. The process of paragraphs 1 to 3, where little or no alumoxane is present (preferably, alumoxane is present at 0 mol %, alternately the alumoxane is present at a molar ratio of aluminum to transition metal less than 500:1, preferably less than 300:1, preferably less than 100:1, preferably less than 1:1).

5. The process of paragraphs 1 to 4, where scavenger is present at 0 mol % (alternately the scavenger is present at a molar ratio of scavenger metal to transition metal of less than 100:1, preferably less than 50:1, preferably less than 15:1, preferably less than 10:1).

6. A catalyst system useful in the process of paragraphs 1 to 5.

7. The use of the catalyst system of paragraph 6 to polymerize olefinic monomers to produce polymers with allyl chain ends.

EXAMPLES

Product Characterization
Products were characterized by $^1$H NMR, $^{13}$C NMR, and GPC, as follows.

$^1$H NMR
$^1$H NMR data was collected at either room temperature or 120° C. (for purposes of the claims, 120° C. shall be used) in a 5 mm probe using a spectrometer with a $^1$H frequency of at least 400 MHz. Data was recorded using a maximum pulse width of 45° C., 8 seconds between pulses and signal averaging 120 transients. Spectral signals were integrated and the number of unsaturation species per 1000 carbons was calculated. Mn was calculated by multiplying the total number of unsaturated species per 1000 carbons by 14,000.

The chemical shift regions for the olefin types are defined to be between the following spectral regions.

| Unsaturation Type | Region (ppm) | Number of hydrogens per structure |
|---|---|---|
| Vinyl | 4.95-5.10 | 2 |
| Vinylidene | 4.70-4.84 | 2 |
| Vinylene | 5.31-5.55 | 2 |
| Trisubstituted | 5.11-5.30 | 1 |

$^{13}$C NMR
$^{13}$C NMR data was collected at 120° C. using a spectrometer with a $^{13}$C frequency of at least 100 MHz. A 90 degree pulse, an acquisition time adjusted to give a digital resolution between 0.1 and 0.12 Hz, at least a 10 second pulse acquisition delay time with continuous broadband proton decoupling using swept square wave modulation without gating was employed during the entire acquisition period. The spectra were acquired with time averaging to provide a signal to noise level adequate to measure the signals of interest. Samples were dissolved in tetrachloroethane-d$_2$ (TCE) at concentrations between 10 to 15 wt % prior to being inserted into the spectrometer magnet.

Prior to data analysis, spectra were referenced by setting the chemical shift of the TCE solvent signal to 74.39 ppm.

Chain ends for quantization were identified using the signals shown in the table below. N-butyl and n-propyl were not reported due to their low abundance (less than 5%) relative to the chain ends shown in the table below.

| Chain End | $^{13}$C NMR Chemical Shift |
|---|---|
| P~i-Bu | 23-5 to 25.5 and 25.8 to 26.3 ppm |
| E~i-Bu | 39.5 to 40.2 ppm |
| P~Vinyl | 41.5 to 43 ppm |
| E~Vinyl | 33.9 to 34.4 ppm |

GPC
Mn, Mw, and Mz were measured by using a GPC method using a High Temperature Size Exclusion Chromatograph (SEC, either from Waters Corporation or Polymer Laboratories), equipped with a differential refractive index detector (DRI). Experimental details, are described in: T. Sun, P. Brant, R. R. Chance, and W. W. Graessley, Macromolecules, Volume 34, Number 19, pp. 6812-6820, (2001) and references therein. Three Polymer Laboratories PLgel 10 mm Mixed-B columns were used. The nominal flow rate was 0.5 cm$^3$/min, and the nominal injection volume was 300 μL. The various transfer lines, columns and differential refractometer (the DRI detector) were contained in an oven maintained at 135° C. Solvent for the SEC experiment was prepared by dissolving 6 grams of butylated hydroxy toluene as an antioxidant in 4 liters of Aldrich reagent grade 1, 2, 4 trichlorobenzene (TCB). The TCB mixture was then filtered through a 0.7 µm glass pre-filter and subsequently through a 0.1 µm Teflon filter. The TCB was then degassed with an online degasser before entering the SEC. Polymer solutions were prepared by placing dry polymer in a glass container, adding the desired amount of TCB, then heating the mixture at 160° C. with continuous agitation for about 2 hours. All quantities were measured gravimetrically. The TCB densities used to express the polymer concentration in mass/volume units were 1.463 g/mL at room temperature and 1.324 g/mL at 135° C. The injection concentration was from 1.0 to 2.0 mg/mL, with lower concentrations being used for higher molecular weight samples. Prior to running each sample the DRI detector and the injector were purged. Flow rate in the apparatus was then increased to 0.5 mL/minute, and the DRI was allowed to stabilize for 8 to 9 hours before injecting the first sample.

The concentration, c, at each point in the chromatogram was calculated from the baseline-subtracted DRI signal, $I_{DRI}$, using the following equation:

$$c = K_{DRI} I_{DRI}/(dn/dc)$$

where $K_{DRI}$ is a constant determined by calibrating the DRI, and (dn/dc) is the refractive index increment for the system. The refractive index, n=1.500 for TCB at 135° C. and λ=690 nm. For purposes of this invention and the claims thereto (dn/dc)=0.104 for propylene polymers and 0.1 otherwise. Units of parameters used throughout this description of the SEC method are: concentration is expressed in g/cm$^3$, molecular weight is expressed in g/mol, and intrinsic viscosity is expressed in dL/g.

Metallocenes Used In Examples

The following metallocenes were used in the examples below.

| Metallocene | Structure |
| --- | --- |
| E | (structure) |
| F | (structure) |
| H | (structure) |

Activators Used

The following activators were used in the examples below.

| Activator | Chemical Name |
| --- | --- |
| I | Dimethylaniliniumtetrakis(pentafluorophenyl)borate |
| II | Dimethylaniliniumtetrakis(perfluorobiphenyl)borate |
| III | Dimethylaniliniumtetrakis(perfluoronaphthyl)borate |
| IV | Dimethylanilinium(perfluorophenyl)tris(perfluoronaphthyl)borate |
| V | [4-t-butyl-PhNMe$_2$H][(C$_6$F$_3$(C$_6$F$_5$)$_2$)$_4$B] (where Ph is phenyl and Me is methyl) |
| VI | Methylpyridinyltetrakis(pentafluorophenyl)borate |
| VII | Trimethylammoniumtetrakis(perfluoronaphthyl)borate |

Synthesis of Metallocene Component:

Synthesis of Metallocene E and Metallocene F:

Metallocenes E and F were synthesized from precursor Compound 5 (See Scheme 1). The synthesis of the precursor Compound 5 was achieved by three different synthetic routes as shown in Scheme 1, below: Route A (A→1a+1b→4+1b→5), Route B (A→1a+1b→2→3→4→5), and Route C (B→8→5).

SCHEME 1: Synthesis Of Precursor 5
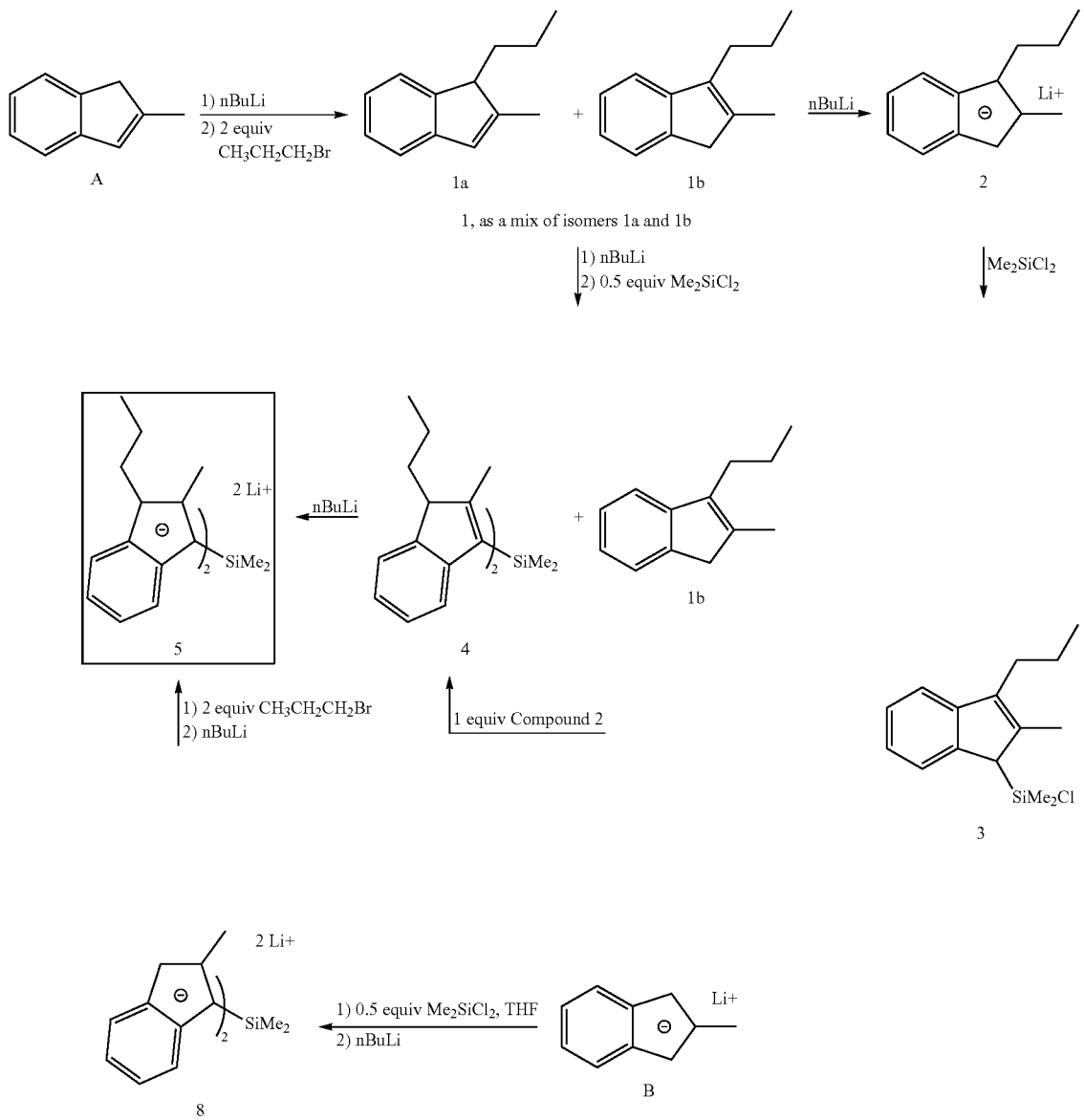
where nBu is n-butyl, Me is methyl, equiv is equivalent(s), and THF is tetrahydrofuran.
Synthetic Route A (A→1a+1b→4+1b→5)
Synthetic Route A is illustrated in Scheme 2, below:
SCHEME 2: Synthesis of Precursor 5 via Synthetic Route A
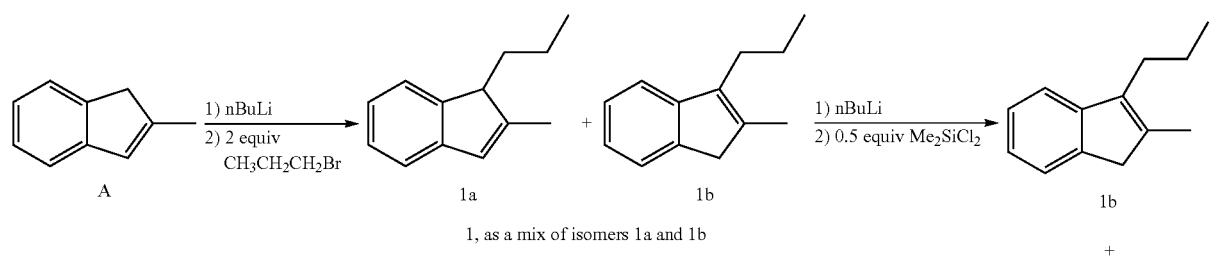

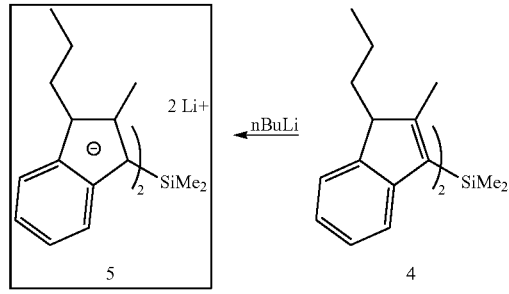

where nBu is n-butyl, Me is methyl, and equiv is equivalent(s).

Synthesis of Compounds 1a+1b:

Compound A (2-methyl indene, 10 g, 76.9 mmol) was dissolved in diethyl ether (150 mLs) and deprotonated with nBuLi (10 M, hexanes, 77 mmol). After 4 hrs propyl bromide (CH$_3$CH$_2$CH$_2$Br, 18 g, 146 mmol) was added to the reaction mixture followed by tetrahydrofuran (THF, 50 mLs) and the reaction was stirred for 12 additional hours at room temperature. The reaction was quenched with water and the organic layer dried over anhydrous magnesium sulfate (MgSO$_4$). Removal of volatiles gave an isomeric mixture of 1a and 1b as yellow oil (10.5 g, 83% yield). $^1$H NMR (C$_6$D$_6$, 500 MHz) δ ppm; Compound 1a: 6.22 (s), 3.05 (m), 1.79 (s) 0.75 (t). Compound 1b: 2.91 (s), 2.36 (t, 1.79 (s), 0.85 (t).

Synthesis of Compound 2:

The mixture of 1a and 1b was dissolved in hexane (200 mL) and deprotonated with n-butyl lithium (nBuLi, 6.1 mL of a 10 M solution in hexane, 61 mmol). After 12 hours at room temperature, solids were collected onto a glass frit, washed with additional hexane (2×50 mLs), and dried in vacuo to give Compound 2 as a white solid (10.8 g, quantitative yield). $^1$H NMR (THF-d8, 500 MHz) δ ppm; Compound 2: 7.09 (m, C$_6$H$_4$ ring), 6.30 (m, C$_6$H$_4$ ring), 5.47 (s, C$_5$H ring), 2.70 (t, C$_5$—CH$_2$—), 2.17 (s, C$_5$-Me), 1.50 (m, C$_5$—CH$_2$—CH$_2$—), 0.89 (t, —C$_2$H$_4$-Me).

Synthesis of Compounds 4+1b:

All of the lithiated ligand Compound 2 was dissolved in THF (100 mL) and reacted with dichlorodimethylsilane (Me$_2$SiCl$_2$, 3.8 g, 29 mmol) for 10 hours at room temperature. $^1$H NMR indicated the formation of 4 and 1b. Compound 4 was purified by column chromatography (75% hexane/25% ethyl acetate v/v) on silica gel (200-400 mesh).

Synthesis of Compound 5:

The hexane extracts containing Compound 4 were reacted with nBuLi (5 g, 10 M in hexanes) to afford a solid. The white solid product 5 was filtered onto a glass frit, washed with hexanes (2×30 mLs) and dried in vacuo (9.1 g, 84% based on 1a, 1b).

Compound 5; $^1$H NMR (THF-d8, 250 MHz) δ ppm; 7.57 (m), 7.12 (m), 6.30 (m), 3.55 (t), 2.70 (t), 2.34 (s), 1.46 (m), 0.85 (t), 0.59 (s).

Synthetic Route B (A→1a+1b→2→3→4→5)

Synthetic Route B is illustrated in Scheme 3, below.

SCHEME 3: Synthesis of Precursor 5 via Synthetic Route B

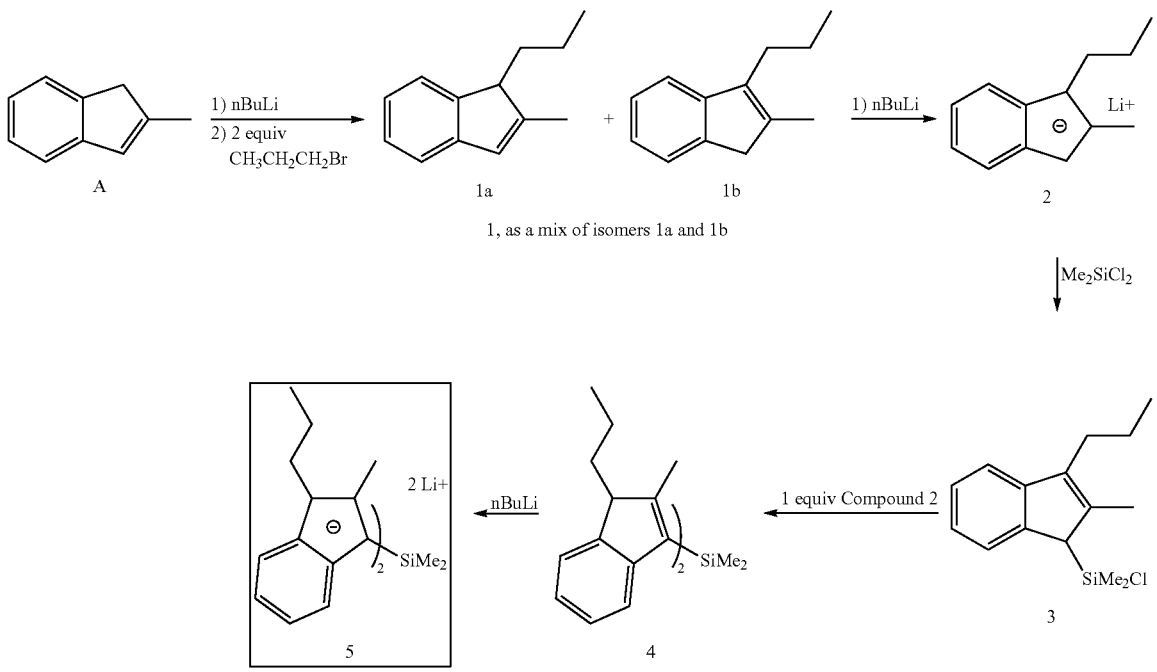

where nBu is n-butyl, Me is methyl, and equiv is equivalent(s).

Synthesis of Compounds 1a+1b:

2-Methylindene (20 g, 154. mmol) was dissolved in diethyl ether (200 mLs) and reacted with nBuLi (12.3 g, 10 M, hexane) for 12 hrs at room temperature. The ether was removed under a stream of nitrogen. The white deprotonated product (2-methylindenyl lithium) was filtered, washed with hexane and dried in vacuo, and was obtained in quantitative yield. 2-Methylindenyl lithium (5.4 g, 39.7 mmol) was slurried in diethyl ether (60 mLs) and reacted with propylbromide (10 g, 81 mmol) at room temperature for 12 hours. The volatiles were removed in vacuo and the crude reaction extracted with hexane (2×30 mLs). The extracts were reduced to Compounds 1a+1b as a yellow oil (4.5 g, 66% yield).

Synthesis of Compound 2:

Deprotonation with nBuLi as described above yielded Compound 2.

Synthesis of Compound 3:

Compound 2 was dissolved in diethyl ether (100 mLs) and reacted with excess $Me_2SiCl_2$ (6 g, 46.5 mmol). After 12 hrs, $^1H$ NMR analysis showed that Compound 3 had been synthesized. Compound 3 was carried to the next step without purification. Compound 3: $^1H$ NMR ($C_6D_6$, 500 MHz) δ ppm; 7.5 to 7.05 (complex d of multiplets, $C_6H_4$ ring), 3.22 (m, $C_5H$ ring), 2.40 (t, $C_5$—$CH_2$—), 1.95 (s, $C_5$-Me), 1.48 (m, $C_5$—$CH_2$—$CH_2$—), 0.85 (t, —$C_2H_4$-Me), 0.11, −0.13 (s, Si-Me, diastereotopic).

Synthesis of Compound 4:

All volatiles were removed from the crude mixture of Compound 3 (including unreacted $Me_2SiCl_2$) and fresh diethyl ether (100 mLs) was added to the reaction mixture. Additional Compound 2 (6.0 g, 33.7 mmol) was added and the reaction stirred for 2 days at room temperature. An aliquot was taken and analyzed by $^1H$ NMR which showed the formation of 4. The volatiles were removed and the crude reaction extracted with hexane (2×40 mL). The hexane extracts were used in the next step without further purification.

Synthesis of Compound 5:

The hexane extracts containing Compound 4 were reacted with nBuLi (5 g, 10 M in hexanes) at room temperature to afford a solid. The white solid product 5 was filtered onto a glass frit, washed with hexanes (2×30 mLs) and dried in vacuo (9.1 g, 84% based on 1a and 1b).

Synthetic Route C (B→8→5)

Synthetic route C is illustrated by Scheme 4, below.

-continued

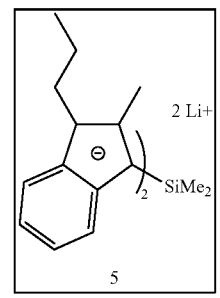

where nBu is n-butyl, Me is methyl, and equiv is equivalent(s).

Synthesis of Compound 8:

2-Methylindenyl lithium (2.0 g, 14.7 mmol) was dissolved in ether (60 mL) and cooled to −30° C. $Me_2SiCl_2$ (0.949 g, 7.35 mmol) was added and the reaction stirred overnight at room temperature. An aliquot analyzed by $^1H$ NMR showed a diastereomeric mixture of μ-dimethylsilyl,bis-2-methylindene (1.3 g, 4.1 mmol, 56% yield). All was dissolved in ether (30 mLs) and cooled to −30° C. n-Butyl lithium (2 equivalents, 4 mLs, 10 mmol, 2.5M in hexanes) was added to the reaction mixture and then the reaction mixture was allowed to warm to RT. The reaction mixture was stirred for 12 hrs at room temperature and the white solid product was filtered, washed with hexane (30 mLs), and dried in vacuo (1.8 g, quantitative yield).

Synthesis of Compound 5:

Compound 8 was re-dissolved in ether (100 mLs) and cooled to −30° C. 1-Bromopropane (4 equivalents, 2.2 g, 17.9 mmol) was added to the reaction mixture. An aliquot taken at 4 hours and analyzed by $^1H$ NMR indicated low conversion to the desired product. THF (100 mLs) was added and the reaction mixture stirred overnight at room temperature. After 12 hrs the volatiles were removed by $N_2$ purge. The reaction mixture was extracted with hexanes (100 mLs), filtered over a glass frit and dried in vacuuo (2.23 g, quantitative yield). The dried mixture was dissolved in 100 mLs ether, and cooled to −30° C. n-Butyl lithium (2 equivalents, 1.6M in hexanes, 8.5 mL, 13.6 mmol) was added and the solution allowed to warm to room temperature, and stirred for 12 hours at room temperature. Analysis of an aliquot of the reaction mixture by $^1H$ NMR showed Compound 5. The white solid product 5 was filtered onto a glass frit, washed with hexanes (2×30 mLs) and dried in vacuo to give a white solid in quantitative yield.

Synthesis of Metallocene E

The synthesis of Metallocene E is illustrated by Scheme 5, below.

SCHEME 4: Synthesis of Precursor 5 via Synthetic Route C

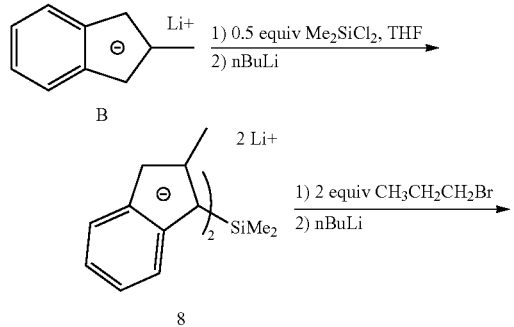

SCHEME 5: Synthesis of Metallocene E

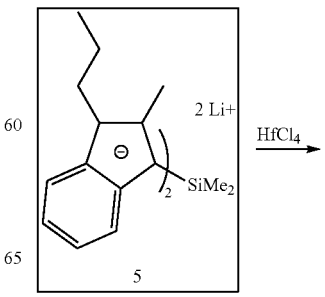

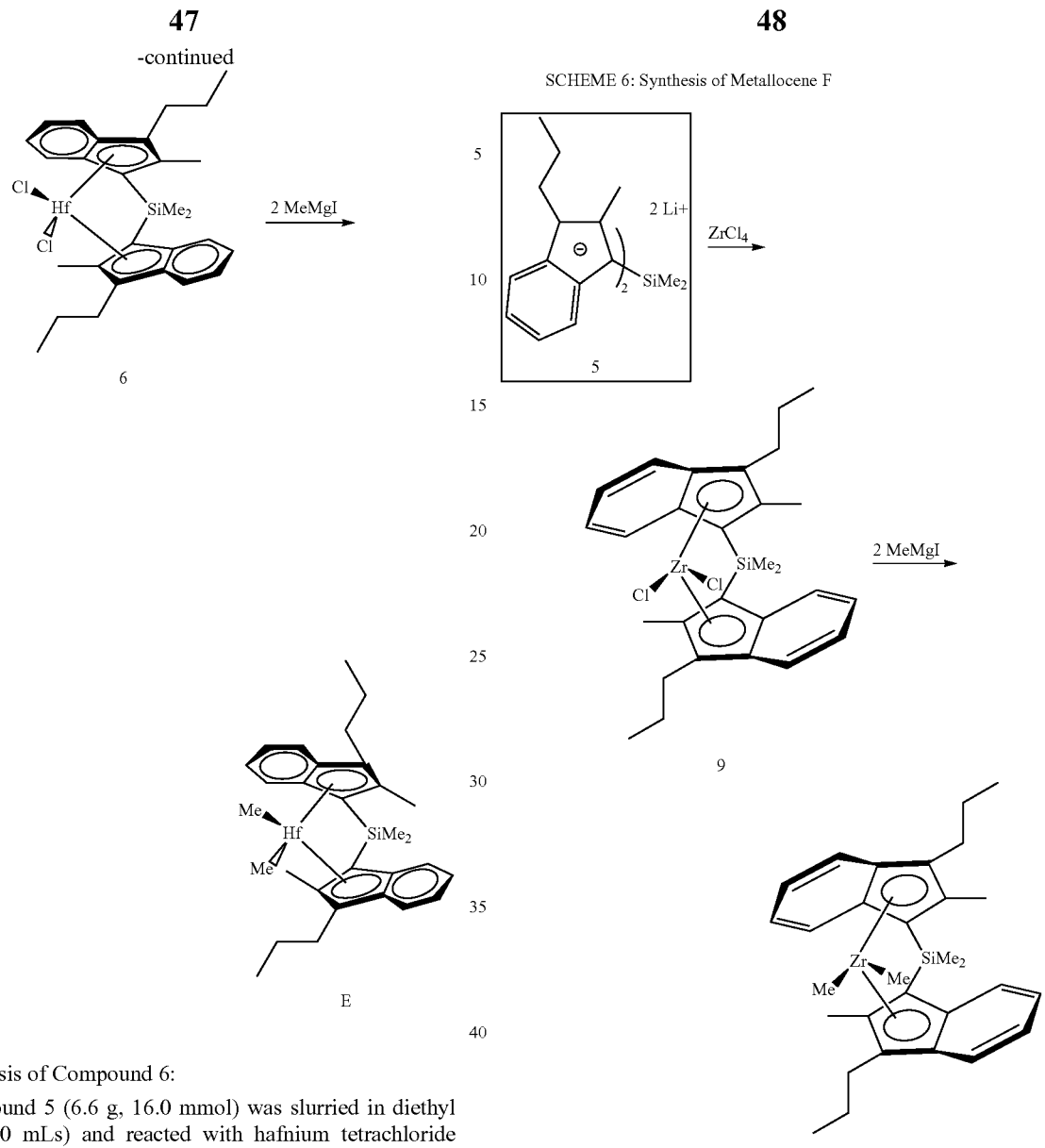

SCHEME 6: Synthesis of Metallocene F where Me is methyl.

Synthesis of Compound 6:

Compound 5 (6.6 g, 16.0 mmol) was slurried in diethyl ether (100 mLs) and reacted with hafnium tetrachloride (HfCl$_4$, 4.2 g, 13.1 mmol). After 1 hour about 50 mLs diethyl ether were removed and the metallocene Compound 6 (dimethylsilylbis(2-methyl,3-propylindenyl)hafniumdichloride) was collected as a bright yellow solid on a glass frit (4.2 g, 49.5%).

Synthesis of Metallocene E:

Compound 6 was slurried in diethyl ether (50 mL) and toluene (80 mL) and reacted with methyl magnesium iodide (MeMgI, 5.6 g, 3.0 M in diethyl ether) at room temperature for 16 hours. Dimethoxyethane (DME, 6 g) was added to the crude reaction mixture, the mixture filtered through a medium glass frit, and the filtrate collected. The volume of the filtrate was reduced, pentane added (30 mL), and the filtrate cooled to −35° C. Metallocene E, (rac-dimethylsilylbis(2-methyl,3-propylindenyl) hafnium dimethyl), was collected as a first crop of crystals (pure rac-E, 0.6 g, 16%) and as a second crop (5% meso-E and 95% rac-E, 0.7 g, 19%). Metallocene E; $^1$H NMR (CD$_2$Cl$_2$, 500 MHz) δ ppm; 7.4 (d), 7.3 (d), 7.08 (t), 6.75 (t), 2.68 to 2.22 (complex m), 1.87 (s), 1.41 (m), 0.97 (s), 0.81 (t), −1.95 (s).

Synthesis of Compound 9:

Compound 5 (8.2 g, 19.9 mmol) was slurried in diethyl ether (150 mLs) and reacted with ZrCl$_4$ (4.2 g, 17.9 mmol) at room temperature. After 4 hrs, an orange solid was collected on a medium frit and washed with additional diethyl ether (2×30 mLs). The product was dried in vacuo to yield pure rac-9 (3.8 g, 38%). $^1$H NMR (CD$_2$Cl$_2$, 500 MHz) δ ppm; 7.63 (d), 7.41 (d), 7.3 (m), 6.96 (m), 2.57 (d of m), 2.04 (s), 1.42 (m), 1.31 (s), 0.88 (t).

Synthesis of Metallocene F:

Compound 9 (1.12 g, 2.0 mmol) was slurried in diethyl ether (80 mL) and reacted with MeMgI (1.7 g, 4.5 mmol, 3.0 M) at room temperature. The reaction mixture was stirred for 48 hrs at room temperature. Volatiles were removed in vacuo and the crude reaction mixture extracted with hexane (3×20 mLs). Reduction of hexane solution to 20 mLs and cooling to −35° C. gave F as a yellow crystalline solid (0.8 g, 77%). $^1$H NMR (CD$_2$Cl$_2$, 500 MHz) δ ppm; 7.38 (m), 7.15 (t), 6.78 (t), 2.52 (d of m), 1.85 (s), 1.57 (m), 1.06 (s), 0.86 (t), −1.71 (s).

Synthesis of Metallocene H

2-Methylindene (15 g, 11.5 mmol) was dissolved in diethyl ether (300 mls) and reacted with butyllithium (13.8 mls, 1.2 equiv, 10 M) for 3 hrs. The white solid product was collected on a frit, washed with hexanes and slurried into fresh diethyl ether (300 mls). MeI (32.7 g, 23 mmol) was slowly added and the reaction mixture stirred for 2 hrs. The reaction mixture was washed with water, dried with $MgSO_4$ and reduced under $N_2$ flow to yield an oil (13.9 g, 96.5 mmol, 85% yield).

The oil was dissolved in hexane (300 ml) and deprotonated with excess nBuLi (10 mls, 1.2 equiv, 10 M) at room temperature. After 12 hrs, the product was filtered, washed with hexane (2×60 mls), and dried in vacuo to yield a white solid (11.6 g, 77.4 mmol, 80% yield). $^1$H NMR (THF-d8, 500 MHz) δ ppm; 7.1 (m, 2H), 6.36 (m, 2H), 5.52 (s, 1H), 2.24, 2.20 (s, 3H each).

The white solid was slurried in diethyl ether (200 mls) and reacted with $Me_2SiCl_2$ (4.5 g, 34.9 mmol) at room temperature for 48 hrs. The volatiles were removed in vacuo and the crude reaction extracted with hexane (2×60 mls). The extracts were reduced to an oil (9.1 g, 26.4 mmol). The oil was dissolved in diethyl ether (100 mls) and deprotonated with butyllithium (5.8 mls, 58 mmol, 10 M). After 2 hrs, 100 mls hexane was added and the solid filtered onto a frit, washed with hexanes and dried in vacuo to yield the solid dianion (7.5 g, 21.1 mmol).

The dianion (4.0 g) was slurried in $Et_2O$ (80 mls) and reacted with $HfCl_4$ (3.3 g, 10.3 mmol). A yellow solid was isolated on a glass frit after 20 minutes and recrystallized from $CH_2Cl_2$ (−30° C.) to yield rac-$Me_2Si$-bis(2,3-dimethylindenyl)$HfCl_2$ (2.7 g, 4.6 mmol). $^1$H NMR ($CD_2Cl_2$, 500 MHz) δ ppm; 7.65 (d), 7.46 (d), 7.37 (t), 6.97 (t), 2.17 (s), 2.07 (s), 1.42 (s).

rac-$Me_2Si$-bis(2,3-dimethylindenyl)$HfCl_2$ (1.4 g, 2.37 mmol) was slurried in toluene (40 mls) and reacted with 1.6 mls MeMgI (4.73 mmol, 3.0 M) for 48 hrs. The crude reaction mixture was filtered and the filtrate reduced and cooled to −30° C. to yield Metallocene H as a yellow solid (0.72 g, 1.3 mmol, 55% yield). $^1$H NMR ($CD_2Cl_2$, 500 MHz) δ ppm; 7.55 (m), 7.46 (m), 7.31 (m), 6.77 (m), 2.16 (s), 1.99 (s), 1.12 (s), −1.82(s).

Prophetic Synthetic Scheme to Produce Generic Precursor G5:

Compound 5 shall be made as shown in Scheme 7.

SCHEME 7: Prophetic Synthesis of Generic Precursor G5

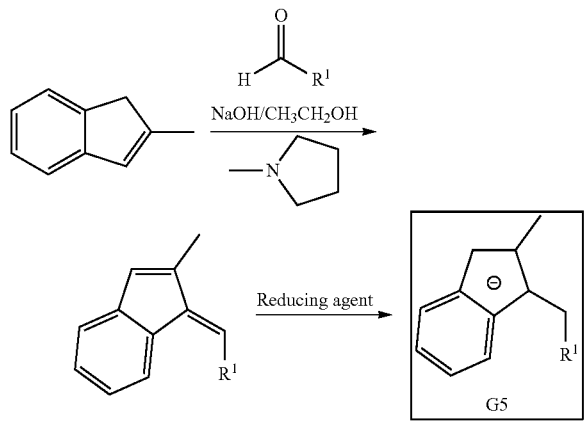

The reducing agent in Scheme 7, may be any known in the art, such as lithium aluminum hydride or a selectride, such as L-selectride, K-selectride or N-selectride. Selectrides have the formula:

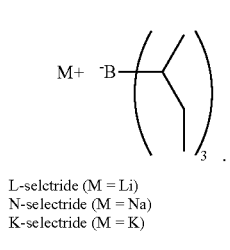

L-selectride (M = Li)
N-selectride (M = Na)
K-selectride (M = K)

Polymerization Reactions

Examples 1 & 2

Propylene polymer batch or continuous polymerizations were carried out using a 2 L stirred autoclave reactor.

Scavengers and Co-catalysts

Triisobutyl aluminum (TIBAL) was obtained from Akzo Chemicals, Inc. (Chicago, Ill.) and used without further purification. Tri n-octyl aluminum (TNOAL) was obtained from Akzo Chemicals, Inc. and used without further purification.

Catalyst solutions were prepared in a dry nitrogen purged Vacuum Atmospheres™ dry box by adding nearly equimolar (typically 1.00:1.05) quantities of metallocene and activator to 4 mL dry toluene in a 10 mL glass vial. The mixture was stirred for several minutes and then transferred to a clean, oven dried catalyst tube. An example of the basic polymerization procedure follows: 2 mL of 25 wt % TNOAL (0.037 g Al) in hexanes as scavenger and 100 mL propylene were added to the reactor. Next the reactor was heated to the selected polymerization temperature and catalyst/activator was flushed from the catalyst tube into the reactor with 100 mL propylene. Additional propylene was optionally added for a total of up to 1000 mL. Polymerization was carried out for 10 to 60 minutes, and then the reactor was cooled, depressurized, and opened. At this point the collected product typically contained some residual monomer. The residual monomer concentration in the product was initially reduced by "weathering." In many cases the sample was heated in the oven under nitrogen purge or for a short time with applied vacuum. Some of the lowest molecular weight polymer product may be lost along with the residual monomer. In some cases, residual monomer is still detected in the product in $^1$H NMR spectra recorded at 30° C. (but is not detected when spectra are recorded at 120° C.).

Example 1

Comparative Propylene Polymerization Results

Metallocenes E and F (at a concentration of $1.6 \times 10^{-6}$ M) were screened using Activator III (at a concentration of $1.6 \times 10^{-6}$ M) in a 2 liter batch reactor under solution propylene conditions. TIBAL ($2.5 \times 10^{-4}$ M) was used as a scavenger. The temperature of the reactor was varied among the polymerization runs 1 to 12 as shown in Table 1A, below.

TABLE 1A

Polymerization of Propylene Using Metallocenes E and F

| Run # | Metallocene | $C_3$ (mLs) | Isohexane (mLs) | Run Temp. (°C.) | Run Time (minutes) | Yield (g) | Activity (kg/g cat hr$^{-1}$) |
|---|---|---|---|---|---|---|---|
| 1 | F | 400 | 800 | 70 | 20 | 141 | 212 |
| 2 | F | 600 | 600 | 60 | 34 | 234 | 206 |
| 3 | F | 800 | 400 | 80 | 34 | 263 | 232 |
| 4 | F | 800 | 400 | 90 | 34 | 7 | 6 |
| 5 | F | 500 | 700 | 110 | 35 | 1 | 1 |
| 6 | F | 500 | 700 | 100 | 35 | 30 | 26 |
| 7 | F | 500 | 700 | 100 | 35 | 28 | 24 |
| 8 | E | 500 | 700 | 70 | 25 | 240 | 288 |
| 9 | E | 500 | 700 | 80 | 25 | 230 | 276 |
| 10 | E | 500 | 700 | 90 | 25 | 201 | 241 |
| 11 | E | 500 | 700 | 60 | 25 | 306 | 367 |
| 12 | E | 500 | 700 | 60 | 10 | 319 | 956 |

The polymer products of Runs 1 to 12 were characterized by $^1$H NMR and GPC, and the characterization results are reported in Table 1B, below:

TABLE 1B

Characterization of Polymer Products From Runs 1 to 12

| | GPC DATA | | | $^1$H NMR DATA | | | | | |
|---|---|---|---|---|---|---|---|---|---|
| | | | | | Unsaturations per 1000 carbons | | | | |
| Run # | Mw (g/mol) | Mn (g/mol) | Mw/Mn | Mn (g/mol) | Vinylene (mol) | Trisub.** (mol) | Vinyl (mol) | VYD* (mol) | mol % vinyls |
| 1 | 24,875 | 6,442 | 3.9 | 7,143 | 0.01 | 0.04 | 1.68 | 0.23 | 86 |
| 2 | 41,512 | 15,922 | 2.6 | 14,894 | 0.02 | 0.07 | 0.67 | 0.18 | 71 |
| 3 | 18,968 | 4,500 | 3.8 | 4,778 | 0.01 | 0.07 | 2.47 | 0.38 | 84 |
| 4 | 4,810 | 2,017 | 2.4 | 2,291 | 0 | 0.06 | 5.37 | 0.68 | 88 |
| 5 | — | — | — | 3,989 | 0 | 0.02 | 2.97 | 0.52 | 85 |
| 6 | 1,586 | 664 | 2.4 | 958 | 0.03 | 0.27 | 12.59 | 1.72 | 86 |
| 7 | 1,825 | 784 | 2.3 | 1,001 | 0.03 | 0.37 | 12.01 | 1.57 | 86 |
| 8 | 16,367 | 3,926 | 4.2 | 3,922 | 0.07 | 0.17 | 3.21 | 0.12 | 90 |
| 9 | — | — | — | 2,044 | 0.02 | 0.15 | 6.5 | 0.18 | 95 |
| 10 | — | — | — | 1,164 | 0.03 | 0.34 | 11.31 | 0.35 | 94 |
| 11 | 22,820 | 8,656 | 2.6 | 9,091 | 0.01 | 0.03 | 1.45 | 0.05 | 94 |
| 12 | 41,094 | 11,442 | 3.6 | 11,966 | 0 | 0.05 | 1.06 | 0.06 | 91 |

KEY:
*trisub. = trisubstituted unsaturated chain ends;
**VYD = vinylidene.

The hafnocene E produced vinyl terminated atactic propylene polymers with consistently higher vinyl levels (>90% vinyls) than the zirconocene F (71-88% vinyls), even under high propylene conversion conditions. Surprisingly, the hafnocene E also demonstrated both higher thermal stability and unusually higher activity, when compared to the zirconocene analogue F. The polymerizations using the hafnocene E investigated under continuous solution conditions, as shown in Example 2.

Example 2

Propylene Polymerizations Using Metallocene E

Continuous solution polymerization was carried out using Metallocene E as the catalyst, and Activator III as the activator. Metallocene E was premixed with Activator III in a 1:1 ratio and fed into the reactor at a rate of $3.3 \times 10^{-7}$ mols/minute. Propylene ($C_3$) was fed into the reactor at a rate of 15 g/minute, isohexane at a feed rate of 59.4 g/minute, and TNOAL at a feed rate of $5.2 \times 10^{-6}$ mols/minute.

The temperature of the reactor was varied among the polymerization runs as shown in Table 2A below.

TABLE 2A

Polymerization of Propylene Using Metallocene E

| Run # | Temperature (°C.) | Run Time (minutes) | Yield (g) | Conversion (mol %) | Catalyst Activity (kgP/molcat) |
|---|---|---|---|---|---|
| 13 | 60 | 45 | 243.4 | 36.1 | 16,367 |
| 14 | 70 | 35 | 173.8 | 33.1 | 15,048 |
| 15 | 80 | 35 | 198.6 | 37.8 | 17,195 |
| 16 | 90 | 35 | 140.4 | 26.7 | 12,156 |
| 17 | 90 | 200 | 1114.3 | 37.1 | 16,883 |
| 18 | 90 | 235 | 896 | 25.4 | 11,554 |

The polymer products of Runs 13 to 18 were characterized by $^1$H NMR and GPC. The characterization results are reported in Table 2B. below:

TABLE 2B

Characterization of Polymer Products From Runs 13 to 18

| | | $^1$H NMR DATA | | | | | | | | | |
|---|---|---|---|---|---|---|---|---|---|---|---|
| | | Unsaturations per 1000 carbons | | | | GPC DATA | | | | | |
| Run # | Mn | Vinylene (mol) | Trisub.* (mol) | Vinyl (mol) | VYD** (mol) | Mn | Mw | Mz | Mw/Mn | mol % vinyl | mol % VYD |
| 13 | 6,542 | 0.01 | 0.05 | 2.03 | 0.05 | 6,265 | 14,762 | 26,076 | 2.36 | 95 | 2 |
| 14 | 3,763 | 0 | 0.08 | 3.56 | 0.08 | 3,204 | 8,563 | 17,108 | 2.67 | 96 | 2 |
| 15 | 1,504 | 0.01 | 0.21 | 8.7 | 0.17 | 1,152 | 3,080 | 6,572 | 2.67 | 96 | 2 |

TABLE 2B

Characterization of Polymer Products From Runs 13 to 18

| | | $^1$H NMR DATA | | | | | | | | | |
|---|---|---|---|---|---|---|---|---|---|---|---|
| | | Unsaturations per 1000 carbons | | | | GPC DATA | | | | | |
| Run # | Mn | Vinylene (mol) | Trisub.* (mol) | Vinyl (mol) | VYD** (mol) | Mn | Mw | Mz | Mw/Mn | mol % vinyl | mol % VYD |
| 16 | 941 | 0.01 | 0.3 | 14.28 | 0.29 | 742 | 1,627 | 4,600 | 2.19 | 96 | 2 |
| 17 | 956 | 0.02 | 0.29 | 14.05 | 0.29 | 756 | 1,743 | 9,344 | 2.30 | 96 | 2 |
| 18 | 987 | 0 | 0.25 | 13.66 | 0.28 | 731 | 1,596 | 3,566 | 2.18 | 96 | 2 |

KEY:
*trisub. = trisubstituted unsaturated chain ends;
**VYD = vinylidene.

FIG. 1 represents trends observed in Mn and % vinyls as a function of temperature (Runs 13-18 of the Examples). The inventors observed a trend towards higher vinyls at higher reactor temperatures. The inventors also observed a decrease in Mn with increasing reactor temperature.

Example 3

Propylene Copolymerizations

Ethylene/Propylene Copolymerization Conditions:

Continuous polymerization of the polymer was conducted in a 1 liter internal volume continuous flow stirred tank reactor using isohexane as the solvent. The liquid full reactor had a variable residence time of approximately 15 to 45 minutes and the pressure was maintained at 320 psig (2,206 KPa). A mixed feed of isohexane, ethylene and propylene was pre-chilled to approximately −30° C., before entering the reactor. The pre-chilling temperature was adjusted to maintain the indicated solution polymerization temperature. The solution of catalyst/activator in toluene and the scavenger in isohexane were separately and continuously admitted into the reactor to initiate the polymerization.

Isohexane, ethylene, and propylene were fed to the reactor at the rates shown in Table 3A. The metallocene E was activated in vitro with 1:1.02 molar ratio with Activator III indicated below in the tables and introduced into the polymerization reactor at the rate of $3.298 \times 10^{-7}$ mol/min. A dilute solution of TNOAL was introduced into the reactor at a rate of approximately $5.16 \times 10^{-6}$ mol/min. After five residence times of steady polymerization, a representative sample of the polymer produced in this polymerization was collected. The solution of the polymer was withdrawn from the top, and then steam distilled to isolate the polymer. Product was collected for specified time and conversion calculated as reported in Table 3A. The polymer produced in this polymerization was also analyzed for ethylene content by FT-IR, reported in Table 3A below.

TABLE 3A

Copolymerization Conditions For Runs 19 to 25

| | | Run # | | | | | | |
|---|---|---|---|---|---|---|---|---|
| | | 19 | 20 | 21 | 22 | 23 | 24 | 25 |
| Temperature | ° C. | 60 | 60 | 60 | 60 | 60 | 60 | 90 |
| Ethylene | g/min | 1.00 | 2.00 | 3.00 | 4.00 | 5.00 | 6.00 | 6.00 |
| Propylene | g/min | 15.00 | 15.00 | 15.00 | 15.00 | 15.00 | 15.00 | 15.00 |
| Isohexane | g/min | 59.40 | 59.40 | 59.40 | 59.40 | 59.40 | 59.40 | 59.40 |
| Metallocene E | mol/min (×10$^{-7}$) | 3.298 | 3.298 | 2.198 | 1.649 | 1.649 | 1.649 | 1.649 |
| Activator III | mol/min (×10$^{-7}$) | 3.365 | 3.365 | 2.243 | 1.682 | 1.682 | 1.682 | 1.682 |

TABLE 3A-continued

Copolymerization Conditions For Runs 19 to 25

| | | Run # | | | | | | |
|---|---|---|---|---|---|---|---|---|
| | | 19 | 20 | 21 | 22 | 23 | 24 | 25 |
| Cement concentration | wt % | 5.6% | 8.0% | 7.1% | 6.4% | 7.7% | 8.6% | 8.1% |
| Collection time | Min | 110.0 | 90.0 | 90.0 | 90.0 | 70.0 | 45.0 | 15.0 |
| Yield | G | 1335.2 | 836.5 | 675.9 | 454.0 | 456.0 | 474.8 | 160.0 |
| Conversion | mol % | 75.9% | 54.7% | 41.7% | 32.3% | 32.6% | 50.2% | 50.8% |
| Ethylene content (FTIR) | wt % | 17.1% | 28.8% | 32.3% | 45% | 44.6% | 39.5% | 39.9% |

The polymers produced in this polymerization were analyzed for molecular weight (Mw, Mn, and Mz) by GPC. The number and type of unsaturated chain ends were determined by $^1$H NMR. This characterization data is reported in Table 3B, below.

cylinders from Labelear followed by two 500 cc columns packed with dried 3 Å mole sieves purchased from Aldrich Chemical Company, and two 500 cc columns packed with dried 5 Å mole sieves purchased from Aldrich Chemical Company, and used.

TABLE 3B

Characterization of Copolymer Products From Runs 19 to 25

| | | $^1$H NMR DATA | | | | | GPC DATA | | | | |
|---|---|---|---|---|---|---|---|---|---|---|---|
| | | Unsaturations per 1000 carbons | | | | | | | | | |
| Run # | Mn | Vinylene (mol) | Trisub* (mol) | Vinyl (mol) | VYD** (mol) | mol % vinyl | CI*** ($C_2$) % | Mn | Mw | Mz | Mw/Mn |
| 19 | 7,865 | 0.03 | 0.11 | 1.35 | 0.29 | 75.8 | 17.1 | 7,274 | 19,489 | 42,780 | 2.68 |
| 20 | 8,000 | 0.02 | 0.12 | 1.19 | 0.42 | 68.0 | 28.8 | 6,321 | 21,286 | 62,757 | 3.37 |
| 21 | 9,859 | 0.02 | 0.08 | 0.83 | 0.49 | 58.5 | 32.3 | 6,981 | 20,932 | 58,948 | 3.00 |
| 22 | 14,141 | 0 | 0.03 | 0.39 | 0.57 | 39.4 | 45.0 | 10,808 | 37,114 | 73,448 | 3.43 |
| 23 | 13,592 | 0.02 | 0.05 | 0.41 | 0.55 | 39.8 | 44.6 | 12,586 | 37,954 | 75,776 | 3.02 |
| 24 | 13,725 | 0.01 | 0.04 | 0.46 | 0.51 | 45.1 | 39.5 | 12,977 | 37,786 | 75,420 | 2.91 |
| 25 | 5,426 | 0.02 | 0.1 | 1.86 | 0.6 | 72.1 | 39.9 | 4,193 | 21,132 | 92,228 | 5.04 |

KEY:
*Trisub = trisubstituted unsaturated chain ends,
**VYD = vinylidene;
***CI = comonomer incorporation; $C_2$ = ethylene Example 4 & 5

Polymerization Conditions

Polymerization grade propylene was used and further purified by passing it through a series of columns: 2250 cc Oxyclear cylinder from Labelear (Oakland, Calif.), followed by a 2250 cc column packed with dried 3 Å mole sieves purchased from Aldrich Chemical Company (St. Louis, Mich.), two 500 cc columns packed with dried 5 Å mole sieves purchased from Aldrich Chemical Company, one 500 cc column packed with ALCOA Selexsorb CD (7×14 mesh) purchased from Coastal Chemical Company (Abbeville, La.), and one 500 cc column packed with ALCOA Selexsorb COS (7×14 mesh) purchased from Coastal Chemical Company.

Polymerization grade hexanes was further purified by passing it through a series of columns: two 500 cc Oxyclear Reactor Description and Preparation Polymerizations were conducted in an inert atmosphere ($N_2$) drybox using 48 Cell Parallel Pressure Reactors (PPR) equipped with external heaters for temperature control, glass inserts (internal volume of reactor=22.5 mL), septum inlets, regulated supply of nitrogen, propylene, and equipped with disposable PEEK (PolyEtherEtherKetone) mechanical stirrers (800 RPM). The PPRs were prepared for polymerization by purging with dry nitrogen at 150° C. for 5 hours and then at 25° C. for 5 hours.

Example 4

Comparison of Activators

Run time was varied, as indicated in Table 4A-I; run time was 5 minutes;
Activator to metallocene ratio=1:1; Reaction temperature was 85° C.; Metallocene (MCN)=$8\times10^{-5}$ mol/L; and TNOAL=$1.2\times10^{-4}$ mol/L.

TABLE 4A-I

Comparison of Activators

| Run | MCN | Activator | [C3], mol/L | Rxn Time, s | Yield, mg | mol % vinyls | mol % VYD* | mol % Other** | Mn $^1$HNMR | PDTVY*** Kg/mol hr$^{-1}$ |
|---|---|---|---|---|---|---|---|---|---|---|
| A1 | E | I | 2.87 | 560 | 136.3 | 89.4 | 10.6 | 0 | 928 | 22 |
| A2 | E | III | 2.87 | 195.1 | 106.3 | 95.9 | 4.1 | 0 | 827 | 49 |
| A3 | E | IV | 2.87 | 151.6 | 134.1 | 96.6 | 3.4 | 0 | 867 | 80 |
| A4 | E | V | 2.87 | 602.1 | 306 | 98.7 | 1.3 | 0 | 844 | 46 |
| A5 | E | VI | 2.87 | 285.2 | 104.3 | 89.7 | 10.3 | 0 | 1,144 | 33 |
| A6 | E | VII | 2.87 | 252.6 | 90.8 | 97.6 | 1.7 | 0.7 | 916 | 32 |
| B1 | E | I | 2.87 | 177.5 | 155.8 | — | — | — | — | 79 |
| B2 | E | III | 2.87 | 169.4 | 142.4 | — | — | — | — | 76 |
| B3 | E | IV | 2.87 | 174 | 133.8 | — | — | — | — | 69 |
| B4 | E | V | 2.87 | 207.8 | 124.9 | — | — | — | — | 54 |
| B5 | E | VI | 2.87 | 415.9 | 94.2 | — | — | — | — | 20 |
| B6 | E | VII | 2.87 | 284 | 112.9 | — | — | — | — | 36 |
| C1 | F | I | 2.87 | 210.4 | 129.3 | 53.9 | 46.1 | 0 | 1,015 | 55 |
| C2 | F | III | 2.87 | 184.1 | 140.6 | 93.2 | 6.8 | 0 | 1,443 | 69 |
| C3 | F | IV | 2.87 | 195 | 131.4 | 83.8 | 15.6 | 0.6 | 1,287 | 61 |
| C4 | F | V | 2.87 | 302.6 | 126.8 | 95.9 | 3.4 | 0.8 | 1,497 | 38 |
| C5 | F | VI | 2.87 | 237.7 | 127.6 | 53.5 | 46.5 | 0 | 1,026 | 48 |
| C6 | F | VII | 2.87 | 220.4 | 129.5 | 93.7 | 6.1 | 0.2 | 1,499 | 53 |
| D1 | F | I | 2.87 | 178 | 141.3 | — | — | — | — | 71 |
| D2 | F | III | 2.87 | 222 | 133.1 | — | — | — | — | 54 |
| D3 | F | IV | 2.87 | 193.6 | 126.7 | — | — | — | — | 59 |
| D4 | F | V | 2.87 | 361.6 | 110.9 | — | — | — | — | 28 |
| D5 | F | VI | 2.87 | 250.9 | 124.9 | — | — | — | — | 45 |
| D6 | F | VII | 2.87 | 235.9 | 137.3 | — | — | — | — | 52 |

KEY:
*VYD = vinylidene,
**Other means other unsaturated chain ends,
***PDTVY = productivity.

TABLE 4A-II

Comparison of Activators

| Run | MCN | Activator | [C3], mol/L | Yield, g | mol % Vinyls | mol % VYD* | mol % Other* | Mn by $^1$HNMR |
|---|---|---|---|---|---|---|---|---|
| A1 | E | I | 1.4 | 0.0627 | 88 | 12 | 0 | 655 |
| A3 | E | III | 1.4 | 0.0800 | 98.6 | 1.4 | 0 | 642 |
| A5 | E | II | 1.4 | 0.0796 | 99.2 | 0.8 | 0 | 786 |
| B1 | F | I | 1.4 | 0.1035 | 52.2 | 47.8 | 0 | 683 |
| B3 | F | III | 1.4 | 0.0991 | 92.4 | 7.6 | 0 | 1,018 |
| B5 | F | II | 1.4 | 0.1049 | 95.7 | 4.3 | 0 | 1,073 |

KEY:
*VYD = vinylidene,
**Other means other unsaturated chain ends.

The inventors have surprisingly found that bulky activators, where the molecular volume of at least three of the substituents on the boron atom each have a molecular volume of greater than 250 cubic Å, such as Activators V and II, produced vinyl terminated propylene polymers with higher vinyls than with activators where the molecular volume of at least three of the substituents on the boron atom each have a molecular volume of less than 250 cubic Å, such as Activators I, II, IV, VI, and VII.

The inventors have also surprisingly found that catalyst systems comprising zirconocene catalysts (such as Metallocene F) and bulky activators produced higher % vinyls as comparative catalysts systems comprising the zirconocene catalyst and less bulky activators. The inventors further surprisingly noticed that catalyst systems comprising zirconocene catalysts of the present invention (such as Metallocene F) and bulky activators produce comparatively similar % vinyls as catalyst systems comprising the hafnocene analogs (such as Metallocene E) and a bulky activator.

Example 5

Propylene Polymerizations Using Metallocene H

Run time was varied, as indicated in Table 4A-I; run time was 5 minutes; Activator III to Metallocene H ratio=1:1; Metallocene (MCN)=8×10$^{-5}$ mol/L; and TNOAL=1.2×10$^{-4}$ mol/L.

TABLE 5

Propylene Polymerizations Using Metallocene H

| Run | Temperature ° C. | [C3], mol/L | Run Time, s | Yield, mg | Mol % Vinyls | Mol % VYD* | mol % Other* | Mn by $^1$HNMR |
|---|---|---|---|---|---|---|---|---|
| 1 | 60 | 0.94 | 301 | 38 | 96 | 4 | 0 | 2983 |
| 2 | 60 | 0.94 | 73 | 11 | — | — | — | — |
| 3 | 85 | 0.94 | 300 | 20 | 99 | 1 | 0 | 753 |
| 4 | 85 | 0.94 | 72 | 8 | — | — | — | — |
| 5 | 110 | 0.94 | 303 | 2 | — | — | — | — |
| 6 | 110 | 0.94 | 75 | 1 | — | — | — | — |
| 7 | 60 | 0.94 | 302 | 41 | — | — | — | — |
| 8 | 60 | 0.94 | 74 | 13 | — | — | — | — |
| 9 | 85 | 0.94 | 302 | 24 | — | — | — | — |
| 10 | 85 | 0.94 | 75 | 7 | — | — | — | — |
| 11 | 110 | 0.94 | 301 | 2 | — | — | — | — |
| 12 | 110 | 0.94 | 74 | 1 | — | — | — | — |
| 13 | 60 | 2.2 | 301 | 96 | — | — | — | — |
| 14 | 60 | 2.2 | 75 | 34 | 99 | 1 | 0 | 5884 |
| 15 | 85 | 2.2 | 303 | 62 | 99 | 1 | 0 | 1008 |
| 16 | 85 | 2.2 | 72 | 18 | — | — | — | — |
| 17 | 110 | 2.2 | 301 | 3 | 97 | 3 | 0 | 421 |
| 18 | 110 | 2.2 | 74 | 4 | — | — | — | — |
| 19 | 60 | 2.2 | 301 | 116 | — | — | — | — |
| 20 | 60 | 2.2 | 74 | 31 | — | — | — | — |
| 21 | 85 | 2.2 | 302 | 52 | — | — | — | — |
| 22 | 85 | 2.2 | 74 | 20 | — | — | — | — |
| 23 | 110 | 2.2 | 302 | 4 | — | — | — | — |
| 24 | 110 | 2.2 | 75 | 4 | — | — | — | — |
| 25 | 60 | 3.5 | 241 | 154 | — | — | — | — |
| 26 | 60 | 3.5 | 73 | 62 | — | — | — | — |
| 27 | 85 | 3.5 | 303 | 98 | — | — | — | — |
| 28 | 85 | 3.5 | 73 | 28 | — | — | — | — |
| 29 | 110 | 3.5 | 301 | 12 | 98 | 2 | 0 | 470 |
| 30 | 110 | 3.5 | 74 | 6 | — | — | — | — |
| 31 | 60 | 3.5 | 227 | 148 | — | — | — | — |
| 32 | 60 | 3.5 | 75 | 52 | — | — | — | — |
| 33 | 85 | 3.5 | 301 | 77 | — | — | — | — |
| 34 | 85 | 3.5 | 73 | 24 | — | — | — | — |
| 35 | 110 | 3.5 | 301 | 15 | — | — | — | — |
| 36 | 110 | 3.5 | 73 | 4 | — | — | — | — |
| 37 | 60 | 4.8 | 207 | 185 | — | — | — | — |
| 38 | 60 | 4.8 | 75 | 51 | — | — | — | — |
| 39 | 85 | 4.8 | 261 | 100 | — | — | — | — |
| 40 | 85 | 4.5 | 73 | 39 | — | — | — | — |
| 41 | 110 | 4.8 | 300 | 16 | — | — | — | — |
| 42 | 110 | 4.8 | 74 | 7 | — | — | — | — |
| 43 | 60 | 4.8 | 198 | 187 | — | — | — | — |
| 44 | 60 | 4.8 | 73 | 64 | — | — | — | — |
| 45 | 85 | 4.8 | 271 | 111 | — | — | — | — |
| 46 | 85 | 4.8 | 73 | 44 | — | — | — | — |
| 47 | 110 | 4.8 | 302 | 16 | — | — | — | — |
| 48 | 110 | 4.8 | 74 | 5 | — | — | — | — |

The inventors have surprisingly found that Metallocene H produced very high % allyl chain ends, here 96% and greater.

All documents described herein are incorporated by reference herein for purposes of all jurisdictions where such practice is allowed, including any priority documents, related application and/or testing procedures to the extent they are not inconsistent with this text, provided however that any priority document not named in the initially filed application or filing documents is NOT incorporated by reference herein. As is apparent from the foregoing general description and the specific embodiments, while forms of the invention have been illustrated and described, various modifications can be made without departing from the spirit and scope of the invention. Accordingly, it is not intended that the invention be limited thereby. Likewise, the term "comprising" is considered synonymous with the term "including" for purposes of Australian law. Likewise whenever a composition, an element or a group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

What is claimed is:

1. A process for making a vinyl terminated propylene polymer, wherein the process comprises:
contacting propylene, under polymerization conditions, with a catalyst system comprising an activator and at least one metallocene compound represented by the formula:

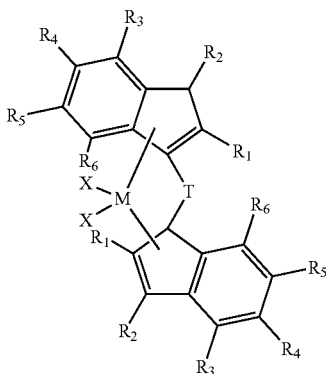

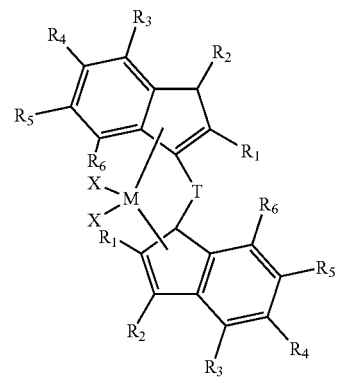

where:

M is hafnium or zirconium;

each X is, independently, selected from the group consisting of hydrocarbyl radicals having from 1 to 20 carbon atoms, hydrides, amides, alkoxides, sulfides, phosphides, halides, dienes, amines, phosphines, ethers, and a combination thereof, (two X's may form a part of a fused ring or a ring system);

each $R_1$ is, independently, methyl, ethyl, n-propyl, n-butyl, n-pentyl, isopentyl, n-hexyl, or isohexyl;

each $R_2$ is, independently, methyl, ethyl, n-propyl, n-butyl, n-pentyl, isopentyl, n-hexyl, or isohexyl;

each $R_3$ is hydrogen;

each $R_4$, $R_5$, and $R_6$, is, independently, hydrogen or a substituted hydrocarbyl or unsubstituted hydrocarbyl group, or a heteroatom;

T is a bridging group represented by the formula $R_2{}^a J$, where J is Si, or Ge, and each $R^a$ is, independently, hydrogen, halogen, $C_1$ to $C_{20}$ hydrocarbyl or a $C_1$ to $C_{20}$ substituted hydrocarbyl, and two $R^a$ can form a cyclic structure including aromatic, partially saturated, or saturated cyclic or fused ring system;

further provided that any of adjacent $R_4$, $R_5$, and $R_6$ groups may form a fused ring or multicenter fused ring system where the rings may be aromatic, partially saturated or saturated; and obtaining a propylene polymer having at least 50% allyl chain ends (relative to total unsaturations) and a Tg of 0° C. or less, wherein the activator comprises a non-coordinating anion.

2. The process of claim 1, wherein the catalyst system further comprises a support material.

3. The process of claim 1, wherein the catalyst system further comprises a co-activator.

4. The process of claim 1, wherein the activator is a non-coordinating anion comprising boron.

5. A process for making a vinyl terminated propylene polymer, wherein the process comprises:

contacting propylene, under polymerization conditions, with a catalyst system comprising an activator and at least one metallocene compound represented by the formula:

where:

M is hafnium or zirconium;

each X is, independently, selected from the group consisting of hydrocarbyl radicals having from 1 to 20 carbon atoms, hydrides, amides, alkoxides, sulfides, phosphides, halides, dienes, amines, phosphines, ethers, and a combination thereof, (two X's may form a part of a fused ring or a ring system);

each $R_1$ is, independently, methyl, ethyl, n-propyl, n-butyl, n-pentyl, isopentyl, n-hexyl, or isohexyl;

each $R_2$ is, independently, methyl, ethyl, n-propyl, n-butyl, n-pentyl, isopentyl, n-hexyl, or isohexyl;

each $R_3$ is hydrogen;

each $R_4$, $R_5$, and $R_6$, is, independently, hydrogen or a substituted hydrocarbyl or unsubstituted hydrocarbyl group, or a heteroatom;

T is a bridging group represented by the formula $R_2{}^a J$, where J is Si, or Ge, and each $R^a$ is, independently, hydrogen, halogen, $C_1$ to $C_{20}$ hydrocarbyl or a $C_1$ to $C_{20}$ substituted hydrocarbyl, and two $R^a$ can form a cyclic structure including aromatic, partially saturated, or saturated cyclic or fused ring system;

further provided that any of adjacent $R_4$, $R_5$, and $R_6$ groups may form a fused ring or multicenter fused ring system where the rings may be aromatic, partially saturated or saturated; and obtaining a propylene polymer having at least 50% allyl chain ends (relative to total unsaturations) and a Tg of 0° C. or less, wherein the activator is a bulky activator comprising an anion and a cation, the activator being represented by the formula:

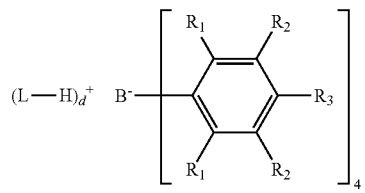

where:

each $R_1$ is, independently, a halide;

each $R_2$ is, independently, a halide, a $C_6$ to $C_{20}$ substituted aromatic hydrocarbyl group or a siloxy group of the formula —O—Si—$R_a$, where $R_a$ is a $C_1$ to $C_{20}$ hydrocarbyl or hydrocarbylsilyl group;

each $R_3$ is a halide, $C_6$ to $C_{20}$ substituted aromatic hydrocarbyl group, or a siloxy group of the formula —O—Si—$R_a$, where $R_a$ is a $C_1$ to $C_{20}$ hydrocarbyl or hydrocarbylsilyl group;

wherein L is a neutral Lewis base;
H is hydrogen;
B is boron;
(L-H)⁺ is a Bronsted acid;
d is 1, 2, or 3;
wherein the anion has a molecular weight of greater than 1020 g/mol; and
wherein at least three of the substituents on the B atom each have a molecular volume of greater than 250 cubic Å, alternately greater than 300 cubic Å, or alternately greater than 500 cubic Å.

6. A process for making a vinyl terminated propylene polymer, wherein the process comprises:
contacting propylene, under polymerization conditions, with a catalyst system comprising an activator and at least one metallocene compound represented by the formula:

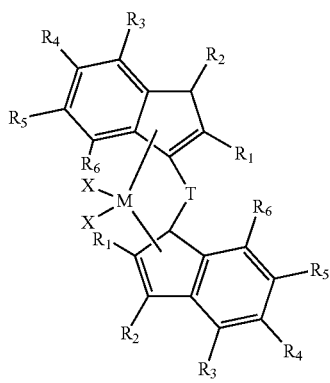

where:
M is hafnium or zirconium;
each X is, independently, selected from the group consisting of hydrocarbyl radicals having from 1 to 20 carbon atoms, hydrides, amides, alkoxides, sulfides, phosphides, halides, dienes, amines, phosphines, ethers, and a combination thereof, (two X's may form a part of a fused ring or a ring system);
each $R_1$ is, independently, methyl, ethyl, n-propyl, n-butyl, n-pentyl, isopentyl, n-hexyl, or isohexyl;
each $R_2$ is, independently, methyl, ethyl, n-propyl, n-butyl, n-pentyl, isopentyl, n-hexyl, or isohexyl;
each $R_3$ is hydrogen;
each $R_4$, $R_5$, and $R_6$, is, independently, hydrogen or a substituted hydrocarbyl or unsubstituted hydrocarbyl group, or a heteroatom;
T is a bridging group represented by the formula $R_2^aJ$, where J is Si, or Ge, and each $R^a$ is, independently, hydrogen, halogen, $C_1$ to $C_{20}$ hydrocarbyl or a $C_1$ to $C_{20}$ substituted hydrocarbyl, and two $R^a$ can form a cyclic structure including aromatic, partially saturated, or saturated cyclic or fused ring system;
further provided that any of adjacent $R_4$, $R_5$, and $R_6$ groups may form a fused ring or multicenter fused ring system where the rings may be aromatic, partially saturated or saturated; and
obtaining a propylene polymer having at least 50% allyl chain ends (relative to total unsaturations) and a Tg of 0° C. or less, wherein the activator is one or more of:
trimethylammonium tetrakis(perfluoronaphthyl)borate, triethylammonium tetrakis(perfluoronaphthyl)borate, tripropylammonium tetrakis(perfluoronaphthyl)borate, tri(n-butyl)ammonium tetrakis(perfluoronaphthyl)borate, tri(t-butyl)ammonium tetrakis(perfluoronaphthyl)borate, N,N-dimethylanilinium tetrakis(perfluoronaphthyl)borate, N,N-diethylanilinium tetrakis(perfluoronaphthyl)borate, N,N-dimethyl-(2,4,6-trimethylanilinium) tetrakis(perfluoronaphthyl)borate, tropillium tetrakis(perfluoronaphthyl)borate, triphenylcarbenium tetrakis(perfluoronaphthyl)borate, triphenylphosphonium tetrakis(perfluoronaphthyl)borate, triethylsilylium tetrakis(perfluoronaphthyl)borate, benzene(diazonium) tetrakis(perfluoronaphthyl)borate, trimethylammonium tetrakis(perfluorobiphenyl)borate, triethylammonium tetrakis(perfluorobiphenyl)borate, tripropylammonium tetrakis(perfluorobiphenyl)borate, tri(n-butyl)ammonium tetrakis(perfluorobiphenyl)borate, tri(t-butyl)ammonium tetrakis(perfluorobiphenyl)borate, N,N-dimethylanilinium tetrakis(perfluorobiphenyl)borate, N,N-diethylanilinium tetrakis(perfluorobiphenyl)borate, N,N-dimethyl-(2,4,6-trimethylanilinium) tetrakis(perfluorobiphenyl)borate, tropillium tetrakis(perfluorobiphenyl)borate, triphenylcarbenium tetrakis(perfluorobiphenyl)borate, triphenylphosphonium tetrakis(perfluorobiphenyl)borate, triethylsilylium tetrakis(perfluorobiphenyl)borate, benzene(diazonium) tetrakis(perfluorobiphenyl)borate, [4-t-butyl-PhNMe$_2$H][(C$_6$F$_3$(C$_6$F$_5$)$_2$)$_4$B], (where Ph is phenyl, and Me is methyl).

7. The process of claim 1, further comprising contacting a comonomer with the propylene and catalyst system, wherein a vinyl terminated propylene copolymer is produced, and wherein the vinyl terminated propylene copolymer has a comonomer content in the range of 0.1 to 50 mol%.

8. The process of claim 7, wherein the comonomer is ethylene.

9. The process of claim 1, wherein the metallocene compound is one or more of:
rac-dimethylsilyl bis(2-methyl-3-propylindenyl)hafniumdimethyl,
rac-dimethylsilyl bis(2-methyl-3-propylindenyl)zirconiumdimethyl,
rac-dimethylsilyl bis(2-ethyl-3-propylindenyl)hafniumdimethyl,
rac-dimethylsilyl bis(2-ethyl-3-propylindenyl)zirconiumdimethyl,
rac-dimethylsilyl bis(2-methyl-3-ethylindenyl)hafniumdimethyl,
rac-dimethylsilyl bis(2-methyl-3-ethylindenyl)zirconiumdimethyl,
rac-dimethylsilyl bis(2-methyl-3-butylindenyl)hafniumdimethyl,
rac-dimethylsilyl bis(2-methyl-3-butylindenyl)zirconiumdimethyl,
rac-dimethylgermanyl bis(2-methyl-3-propylindenyl) hafniumdimethyl,
rac-dimethylgermanyl bis (2-methyl-3-propylindenyl)zirconiumdimethyl,
rac-dimethylgermanyl bis(2-ethyl-3-propylindenyl) hafniumdimethyl,
rac-dimethylgermanyl bis(2-ethyl-3-propylindenyl)zirconiumdimethyl,
rac-dimethylgermanyl bis(2-methyl-3-ethylindenyl) hafniumdimethyl,
rac-dimethylgermanyl bis(2-methyl-3-ethylindenyl)zirconiumdimethyl,
rac-dimethylgermanyl bis(2-methyl-3-butylindenyl) hafniumdimethyl, rac-dimethylgermanyl bis(2-methyl-3-propylindenyl)zirconiumdimethyl,
rac-dimethylsilyl bis(2-propyl-3-methylindenyl)hathiumdimethyl,
rac-dimethylsilyl bis(2-propyl-3-methylindenyl)zirconiumdimethyl,
rac-dimethylsilyl bis(2-propyl-3-ethylindenyl)zirconiumdimethyl
rac-dimethylsilylbis(2-propyl-3-butylindenyl)hafniumdimethyl,
rac-dimethylsilylbis(2-propyl-3-butylindenyl)zirconiumdimethyl,
rac-dimethylsilyl bis(2-methyl-3-butylindenyl)hafniumdimethyl,
rac-dimethylsilyl bis(2-methyl-3-butylindenyl)zirconiumdimethyl,
rac-dimethylsilyl bis(2,3-dimethyl)hafniumdimethyl,
rac-dimethylsilyl bis(2,3-dimethyl)zirconiumdimethyl,
rac-dimethylgermanyl bis(2-propyl-3-methylindenyl) hafniumdimethyl,
rac-dimethylgermanyl bis(2-propyl-3-methylindenyl)zirconiumdimethyl,
rac-dimethylgermanyl bis(2-propyl-3-ethylindenyl)hafniumdimethyl,
rac-dimethylgermanyl bis(2-propyl-3-ethylindenyl)zirconiumdimethyl,
rac-dimethylgermanyl bis(2-propyl-3-butylindenyl)hafniumdimethyl,
rac-dimethylgermanyl bis(2-propyl-3-butylindenyl)zirconiumdimethyl,
rac-dimethylgermanyl bis(2-methyl-3-butylindenyl) hafniumdimethyl,
rac-dimethylgermanyl bis(2-methyl-3-butylindenyl)zirconiumdimethyl,
rac-dimethylgermanyl bis(2,3-dimethyl)hafniumdimethyl, and
rac-dimethylgermanyl bis(2,3-dimethyl)zirconiumdimethyl.

10. The process of claim 1, where M is hafnium, the activator is dimethylaniliniumtetrakis(perfluoronaphthyl)borate, dimethylaniliniumtetrakis(perfluorobiphenyl)borate, or [4-t-butyl-PhNMe$_2$H][(C$_6$F$_3$(C$_6$F$_5$)$_2$)$_4$B], (where Ph is phenyl, and Me is methyl) and the catalyst system has an activity of greater than 150 kg/g catalyst hr$^{-1}$ at a temperature of 90° C. or greater.

11. A catalyst system comprising an activator and at least one metallocene compound, wherein the metallocene compound is represented by the formula:

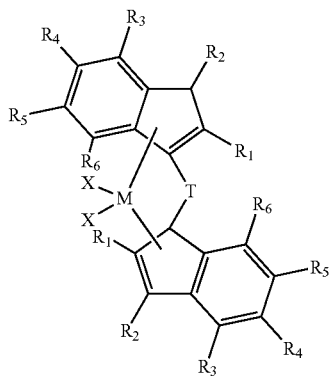

where:
M is hafnium or zirconium;
each X is, independently, selected from the group consisting of hydrocarbyl radicals having from 1 to 20 carbon atoms, hydrides, amides, alkoxides, sulfides, phosphides, halides, dienes, amines, phosphines, ethers, and a combination thereof, (two X's may form a part of a fused ring or a ring system);
each R$_1$ is, independently, methyl, ethyl, n-propyl, n-butyl, n-pentyl, isopentyl, n-hexyl, or isohexyl;
each R$_2$ is, independently, methyl, ethyl, n-propyl, n-butyl, n-pentyl, isopentyl, n-hexyl, or isohexyl;
each R$_3$ is hydrogen;
each R$_4$, R$_5$, and R$_6$, is, independently, hydrogen or a substituted hydrocarbyl or unsubstituted hydrocarbyl group, or a heteroatom;
T is a bridging group represented by the formula R$_2^a$J, where J is Si, or Ge, and each R$^a$ is, independently, hydrogen, halogen, C$_1$ to C$_{20}$ hydrocarbyl or a C$_1$ to C$_{20}$ substituted hydrocarbyl, and two R$^a$ can form a cyclic structure including aromatic, partially saturated, or saturated cyclic or fused ring system;
further provided that any of adjacent R$_4$, R$_5$, and R$_6$ groups may form a fused ring or multicenter fused ring system where the rings may be aromatic, partially saturated or saturated, wherein the activator comprises a non-coordinating anion.

12. The catalyst system of claim 11, wherein M is hafnium.

13. The catalyst system of claim 11, wherein each R$_1$ and R$_2$ are, independently, one or more of methyl, ethyl, propyl, and n-butyl.

14. The catalyst system of claim 11, wherein the metallocene compound is at least one of:
rac-dimethylsilyl bis(2-methyl-3-propylindenyl)hafniumdimethyl,
rac-dimethylsilyl bis(2-methyl-3-propylindenyl)zirconiumdimethyl,
rac-dimethylsilyl bis(2-ethyl-3-propylindenyl)hafniumdimethyl,
rac-dimethylsilyl bis(2-ethyl-3-propylindenyl)zirconiumdimethyl,
rac-dimethylsilyl bis(2-methyl-3-ethylindenyl)hafniumdimethyl,
rac-dimethylsilyl bis(2-methyl-3-ethylindenyl)zirconiumdimethyl,
rac-dimethylsilyl bis(2-methyl-3-butylindenyl)hafniumdimethyl,
rac-dimethylsilyl bis(2-methyl-3-butylindenyl)zirconiumdimethyl,
rac-dimethylgermanyl bis(2-methyl-3-propylindenyl) hafniumdimethyl,
rac-dimethylgermanyl bis (2-methyl-3-propylindenyl)zirconiumdimethyl,
rac-dimethylgermanyl bis(2-ethyl-3-propylindenyl)hafniumdimethyl,
rac-dimethylgermanyl bis(2-ethyl-3-propylindenyl)zirconiumdimethyl,
rac-dimethylgermanyl bis(2-methyl-3-ethylindenyl)hafniumdimethyl,
rac-dimethylgermanyl bis(2-methyl-3-ethylindenyl)zirconiumdimethyl,
rac-dimethylgermanyl bis(2-methyl-3-butylindenyl) hafniumdimethyl,
rac-dimethylgermanyl bis(2-methyl-3-propylindenyl)zirconiumdimethyl,
rac-dimethylsilyl bis(2-propyl-3-methylindenyl)hafniumdimethyl, rac-dimethylsilyl bis(2-propyl-3-methylindenyl)zirconiumdimethyl,
rac-dimethylsilyl bis(2-propyl-3-ethylindenyl)hafniumdimethyl,
rac-dimethylsilyl bis(2-propyl-3-ethylindenyl)zirconiumdimethyl,
rac-dimethylsilylbis(2-propyl-3-butylindenyl)hafniumdimethyl,
rac-dimethylsilylbis(2-propyl-3-butylindenyl)zirconiumdimethyl,
rac-dimethylsilyl bis(2-methyl-3-butylindenyl)hafniumdimethyl,
rac-dimethylsilyl bis(2-methyl-3-butylindenyl)zirconiumdimethyl,
rac-dimethylsilyl bis(2,3-dimethyl)hafniumdimethyl,
rac-dimethylsilyl bis(2,3-dimethyl)zirconiumdimethyl,
rac-dimethylgermanyl bis(2-propyl-3-methylindenyl) hafniumdimethyl,
rac-dimethylgermanyl bis(2-propyl-3-methylindenyl)zirconiumdimethyl,
rac-dimethylgermanyl bis(2-propyl-3-ethylindenyl)hafniumdimethyl,
rac-dimethylgermanyl bis(2-propyl-3-ethylindenyl)zirconiumdimethyl,
rac-dimethylgermanyl bis(2-propyl-3-butylindenyl)hafniumdimethyl,
rac-dimethylgermanyl bis(2-propyl-3-butylindenyl)zirconiumdimethyl,
rac-dimethylgermanyl bis(2-methyl-3-butylindenyl) hafniumdimethyl,
rac-dimethylgermanyl bis(2-methyl-3-butylindenyl)zirconiumdimethyl,
rac-dimethylgermanyl bis(2,3-dimethyl)hafniumdimethyl, and
rac-dimethylgermanyl bis(2,3-dimethyl)zirconiumdimethyl.

15. The catalyst system of claim 11, further comprising a support material.

16. The catalyst system of claim 11, further comprising a co-activator.

17. The catalyst system of claim 11, wherein the activator is a non-coordinating anion comprising boron.

18. A catalyst system comprising an activator and at least one metallocene compound, wherein the metallocene compound is represented by the formula:

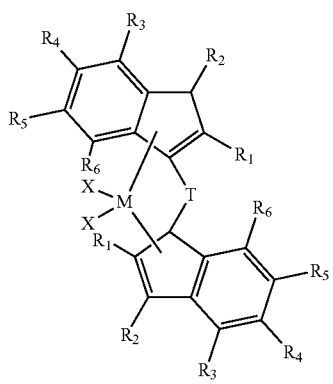

where:
M is hafnium or zirconium;
each X is, independently, selected from the group consisting of hydrocarbyl radicals having from 1 to 20 carbon atoms, hydrides, amides, alkoxides, sulfides, phosphides, halides, dienes, amines, phosphines, ethers, and a combination thereof, (two X's may form a part of a fused ring or a ring system);

each $R_1$ is, independently, methyl, ethyl, n-propyl, n-butyl, n-pentyl, isopentyl, n-hexyl, or isohexyl;

each $R_2$ is, independently, methyl, ethyl, n-propyl, n-butyl, n-pentyl, isopentyl, n-hexyl, or isohexyl;

each $R_3$ is hydrogen;

each $R_4$, $R_5$, and $R_6$, is, independently, hydrogen or a substituted hydrocarbyl or unsubstituted hydrocarbyl group, or a heteroatom;

T is a bridging group represented by the formula $R_2^a J$, where J is Si or Ge, and each $R^a$ is, independently, hydrogen, halogen, $C_1$ to $C_{20}$ hydrocarbyl or a $C_1$ to $C_{20}$ substituted hydrocarbyl, and two $R^a$ can form a cyclic structure including aromatic, partially saturated, or saturated cyclic or fused ring system;

further provided that any of adjacent $R_4$, $R_5$, and $R_6$ groups may form a fused ring or multicenter fused ring system where the rings may be aromatic, partially saturated or saturated, wherein the activator is a bulky activator, comprising an anion and a cation, the bulky activator being represented by the formula:

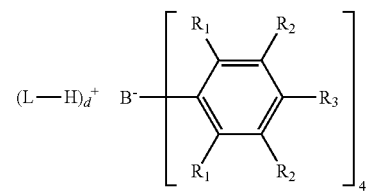

where:
each $R_1$ is, independently, a halide;
each $R_2$ is, independently, a halide, a $C_6$ to $C_{20}$ substituted aromatic hydrocarbyl group or a siloxy group of the formula —O—Si—$R_a$, where $R_a$ is a $C_1$ to $C_{20}$ hydrocarbyl or hydrocarbylsilyl group;
each $R_3$ is a halide, $C_6$ to $C_{20}$ substituted aromatic hydrocarbyl group, or a siloxy group of the formula —O—Si—$R_a$, where $R_a$ is a $C_1$ to $C_{20}$ hydrocarbyl or hydrocarbylsilyl group;
wherein L is an neutral Lewis base;
H is hydrogen;
B is boron;
$(L-H)^+$ is a Bronsted acid;
d is 1, 2, or 3;
wherein the anion has a molecular weight of greater than 1020 g/mol; and
wherein at least three of the substituents on the B atom each have a molecular volume of greater than 250 cubic Å.

19. A catalyst system comprising an activator and at least one metallocene compound, wherein the metallocene compound is represented by the formula:

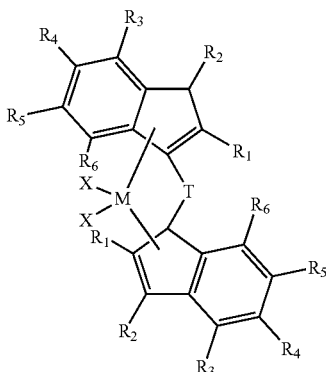

where:

M is hafnium or zirconium;

each X is, independently, selected from the group consisting of hydrocarbyl radicals having from 1 to 20 carbon atoms, hydrides, amides, alkoxides, sulfides, phosphides, halides, dienes, amines, phosphines, ethers, and a combination thereof, (two X's may form a part of a fused ring or a ring system);

each $R_1$ is, independently, methyl, ethyl, n-propyl, n-butyl, n-pentyl, isopentyl, n-hexyl, or isohexyl;

each $R_2$ is, independently, a methyl, ethyl, n-propyl, n-butyl, n-pentyl, isopentyl, n-hexyl, or isohexyl;

each $R_3$ is hydrogen;

each $R_4$, $R_5$, and $R_6$, is, independently, hydrogen or a substituted hydrocarbyl or unsubstituted hydrocarbyl group, or a heteroatom;

T is a bridging group represented by the formula $R_2{}^a J$, where J is Si, or Ge, and each $R^a$ is, independently, hydrogen, halogen, $C_1$ to $C_{20}$ hydrocarbyl or a $C_1$ to $C_{20}$ substituted hydrocarbyl, and two $R^a$ can form a cyclic structure including aromatic, partially saturated, or saturated cyclic or fused ring system;

further provided that any of adjacent $R_4$, $R_5$, and $R_6$ groups may form a fused ring or multicenter fused ring system where the rings may be aromatic, partially saturated or saturated, wherein the activator is at least one of: trimethylammonium tetrakis(perfluoronaphthyl)borate, triethylammonium tetrakis(perfluoronaphthyl)borate, tripropylammonium tetrakis(perfluoronaphthyl)borate, tri(n-butyl)ammonium tetrakis(perfluoronaphthyl)borate, tri(t-butyl)ammonium tetrakis(perfluoronaphthyl)borate, N,N-dimethylanilinium tetrakis(perfluoronaphthyl)borate, N,N-diethylanilinium tetrakis (perfluoronaphthyl)borate, N,N-dimethyl-(2,4,6-trimethylanilinium) tetrakis(perfluoronaphthyl)borate, tropillium tetrakis(perfluoronaphthyl)borate, triphenylcarbenium tetrakis(perfluoronaphthyl)borate, triphenylphosphonium tetrakis(perfluoronaphthyl)borate, triethylsilylium tetrakis(perfluoronaphthyl)borate, benzene(diazonium) tetrakis(perfluoronaphthyl)borate, trimethylammonium tetrakis(perfluorobiphenyl)borate, triethylammonium tetrakis(perfluorobiphenyl)borate, tripropylammonium tetrakis(perfluorobiphenyl)borate, tri(n- butyl)ammonium tetrakis(perfluorobiphenyl)borate, tri(t-butyl)ammonium tetrakis(perfluorobiphenyl)borate, N,N-dimethylanilinium tetrakis(perfluorobiphenyl)borate, N,N-diethylanilinium tetrakis (perfluorobiphenyl)borate, N,N-dimethyl-(2,4,6-trimethylanilinium) tetrakis(perfluorobiphenyl)borate, tropillium tetrakis(perfluorobiphenyl)borate, triphenylcarbenium tetrakis(perfluorobiphenyl)borate, triphenylphosphonium tetrakis(perfluorobiphenyl)borate, triethylsilylium tetrakis(perfluorobiphenyl)borate, benzene(diazonium) tetrakis(perfluorobiphenyl)borate, [4-t-butyl-PhNMe$_2$H][(C$_6$F$_3$(C$_6$F$_5$)$_2$)$_4$B], (where Ph is phenyl, and Me is methyl).

20. The process of claim 1, where J is Si, and each $R^a$ is, independently, a $C_1$ to $C_{20}$ hydrocarbyl.

21. The catalyst system of claim 11, where J is Si, and each $R^a$ is, independently, a $C_1$ to $C_{20}$ hydrocarbyl.

22. The process of claim 1, wherein each $R_1$ is, independently, methyl, ethyl, n-propyl, or n-butyl.

23. The catalyst system of claim 11, wherein each $R_1$ is, independently, methyl, ethyl, n-propyl, or n-butyl.

24. The process of claim 1, wherein each $R_1$ is a methyl group; each $R_2$ is a n-propyl group.

25. The catalyst system of claim 11, wherein each $R_1$ is a methyl group; each $R_2$ is a n-propyl group.

26. The process of claim 1, wherein the vinyl terminated propylene polymer has no detectable melting temperature by DSC following storage at 23° C. for at least 48 hours.

27. The process of claim 1, wherein the vinyl terminated propylene polymer has a viscosity at 60° C. of greater than 1000 cP and less than 200,000 cP.

28. The process of claim 1, wherein the vinyl terminated propylene polymer is atactic where the atactic nature of the propylene polymer is determined from $^{13}$C NMR by the absence of regularity in the chiral structures of the repeat units.

29. The process of claim 1, wherein the vinyl terminated propylene polymer has at least 70% allyl chain ends (relative to total unsaturations).

30. The process of claim 1, wherein the vinyl terminated propylene polymer has at least 80% allyl chain ends (relative to total unsaturations).

31. The process of claim 1, wherein the vinyl terminated propylene polymer has at least 90% allyl chain ends (relative to total unsaturations).

32. The process of claim 1, wherein the vinyl terminated propylene polymer has at least 95% allyl chain ends (relative to total unsaturations).

33. The process of claim 1, wherein the vinyl terminated propylene polymer has an Mn of 150 to 60,000 g/mol.

* * * * *